(12) United States Patent
Phillips et al.

(10) Patent No.: US 12,231,478 B2
(45) Date of Patent: Feb. 18, 2025

(54) SYSTEMS AND METHODS FOR ENABLING A VIRTUAL ASSISTANT IN DIFFERENT ENVIRONMENTS

(71) Applicant: Adeia Guides Inc., San Jose, CA (US)

(72) Inventors: Christopher Phillips, Hartwell, GA (US); Reda Harb, Issaquah, WA (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/079,227

(22) Filed: Dec. 12, 2022

(65) Prior Publication Data

US 2024/0195851 A1 Jun. 13, 2024

(51) Int. Cl.
*H04L 65/403* (2022.01)
*G10L 15/22* (2006.01)
(Continued)

(52) U.S. Cl.
CPC ............ *H04L 65/403* (2013.01); *G10L 15/22* (2013.01); *H04L 51/02* (2013.01); *H04L 65/1093* (2013.01)

(58) Field of Classification Search
CPC ............... H04L 63/0442; H04L 63/045; H04L 63/0457; H04L 63/061; H04L 63/062; H04L 63/101; H04L 63/126; H04L 65/403; H04L 12/1822; H04L 65/4015; H04L 65/1093; H04L 65/1083; H04L 12/1818; H04L 12/1827; H04L 65/1069; H04L 65/1089; H04L 12/1831; H04L 65/4038; H04L 67/535; H04L 63/0861; H04L 65/4046; H04L 67/306; H04L 63/102; H04L 65/1104; H04L 67/52; H04L 65/1073; H04L 65/80; H04L 9/3247; H04L 65/4061; H04L 67/12; H04L 67/75; H04L 9/0833; H04L 12/1813; H04L 51/10; H04L 63/0428; H04L 63/12; H04L 51/08; H04L 51/58; H04L 67/131; H04L 12/18; H04L 12/1863; H04L 45/16; H04L 49/201; H04L 49/90; H04L 67/1095; H04L 43/16; H04L 47/32; H04L 5/06; H04L 61/5069; H04L 65/611; H04L 69/24; H04L 9/40;
(Continued)

(56) References Cited

U.S. PATENT DOCUMENTS

| 7,478,129 B1 * | 1/2009 | Chemtob ............ H04L 65/4038 709/204 |
| 7,734,692 B1 | 6/2010 | Kaplan et al. |

(Continued)

OTHER PUBLICATIONS

U.S. Appl. No. 18/079,224, filed Dec. 12, 2022, Christopher Phillips.

*Primary Examiner* — Djenane M Bayard
(74) *Attorney, Agent, or Firm* — HALEY GUILIANO LLP

(57) ABSTRACT

Systems and methods are provided for managing related conferences. A first conference is initiated between a first computing device and a first group of one or more computing devices. Input to join a second conference is received at the first computing device and the second conference is initiated between the first computing device and a second group of computing devices. The first conference is associated with the second conference and the second group of one or more computing devices comprises the first group of one or more computing devices and at least one additional computing device.

20 Claims, 34 Drawing Sheets

(51) Int. Cl.
*H04L 51/02* (2022.01)
*H04L 65/1093* (2022.01)

(58) Field of Classification Search
CPC ............... H04L 12/189; H04L 2209/16; H04L 41/0866; H04L 47/11; H04L 47/12; H04L 47/19

See application file for complete search history.

(56) References Cited

U.S. PATENT DOCUMENTS

| | | | |
|---|---|---|---|
| 11,336,865 B1* | 5/2022 | Han | H04N 7/152 |
| 2001/0053212 A1* | 12/2001 | Mark | H04M 3/562 |
| | | | 379/202.01 |
| 2005/0160176 A1* | 7/2005 | Seales | H04W 12/033 |
| | | | 709/229 |
| 2009/0296608 A1* | 12/2009 | Khan | H04L 12/1822 |
| | | | 370/260 |
| 2015/0088514 A1 | 3/2015 | Typrin | |
| 2015/0186154 A1 | 7/2015 | Brown et al. | |
| 2015/0273340 A1* | 10/2015 | Cudak | A63F 13/00 |
| | | | 463/42 |
| 2018/0062911 A1 | 3/2018 | Park | |
| 2018/0107839 A1 | 4/2018 | Clement et al. | |
| 2019/0082211 A1 | 3/2019 | Vats | |
| 2020/0145616 A1* | 5/2020 | Nassar | G06F 9/45533 |
| 2021/0075632 A1 | 3/2021 | Kapinos et al. | |
| 2021/0365972 A1* | 11/2021 | Cuppari | G06Q 40/06 |
| 2022/0383871 A1* | 12/2022 | Kumar | G06F 3/167 |
| 2024/0195646 A1 | 6/2024 | Phillips et al. | |

\* cited by examiner

US 12,231,478 B2

SYSTEMS AND METHODS FOR ENABLING A VIRTUAL ASSISTANT IN DIFFERENT ENVIRONMENTS

BACKGROUND

The present disclosure is directed towards systems and methods for enhancing conferences. In particular, systems and methods are provided herein that enable the protection of user privacy when adding a virtual assistant to a conference and/or enable the enhanced management of related conferences.

SUMMARY

With the proliferation of computing devices, such as laptops, smartphones and tablets, comprising integrated cameras and microphones, as well as high-speed internet connections, audio conferencing and video conferencing have become commonplace and are no longer restricted to dedicated hardware and/or audio/video conferencing rooms. In addition, many of these computing devices also comprise a virtual assistant to aid with day-to-day tasks, such as adding events to calendars and/or ordering items via the internet. An example of a computing device for making video calls is the Facebook Portal with Alexa built in. Many virtual assistants are activated by wake words or phrases, for example "Hey Siri," or manually, for example, by pressing a button on the computing device. However, a virtual assistant may have access to private information that is associated with a user profile. For example, the virtual assistant may have access to a calendar, emails, texts and/or contacts associated with the user profile. However, when a user interacts with a virtual assistant on a conference, they may not want the private information to be shared with other conference participants. In addition, a group of conference participants may wish to discuss something in private, away from the main conference. This may be in a work environment where, for example, a group of managers wish to discuss the performance of other employees. In another example, users of a game may wish to discuss tactics with only their team members.

To overcome these problems, systems and methods are provided herein that enable the protection of user privacy when adding a virtual assistant to a conference and/or enable the enhanced management of related conferences.

Systems and methods are provided for enhancing conferences. In accordance with some aspects of the disclosure, a method is provided. The method includes initiating a conference between a first computing device and at least a second computing device and adding a virtual assistant to the conference. At the virtual assistant, it is identified that the virtual assistant is in the conference, and a guest mode is activated in response. A query is received at the virtual assistant, and based on the query and the guest mode, an action is identified. The identified action is performed via the virtual assistant.

In an example system, a conference is initiated via a conferencing platform. Users may dial into the conference via applications running on computing devices such as laptops, smartphones, tablets and/or dedicated conferencing hardware. A user adds a virtual assistant, such as Alexa, to the conference, and the virtual assistant detects via, for example, an application programming interface (API) that it is in the conference. In response to detecting that it is in the conference, the virtual assistant activates a guest mode. The guest mode prevents, for example, information that is associated with a user profile logged in to the virtual assistant being shared with the rest of the conference. In one example, a user may ask the virtual assistant to book an appointment for tomorrow at 15:00. The virtual assistant may identify that the user has an appointment with a doctor already booked at that time; however, as the virtual assistant is in guest mode, the virtual assistant may simply reply "There is a conflict," without detailing the nature of the conflict. If the virtual assistant is not in guest mode, then the virtual assistant may reply "You have an appointment with a doctor at that time."

The virtual assistant may be configured to access data associated with one or more user profiles and identifying the action may further comprise identifying the action without accessing the data associated with the one or more user profiles. The virtual assistant may be configured to access data associated with one or more user profiles and receiving the query may further comprise receiving a query via an audio input. A voice profile may be identified based on the audio input, and it may be determined whether the voice profile is associated with a virtual assistant user profile. If the voice profile is associated with a virtual assistant user profile, identifying the action may further comprise identifying the action based on the data associated with the one or more user profiles. If the voice profile is not associated with a virtual assistant user profile, identifying the action may further comprise identifying the action without accessing the data associated with the one or more user profiles.

The query may be a first query, the audio input may be a first audio input, and the action may be a first action. If the voice profile is associated with a virtual assistant user profile, the method may further comprise the following actions. An identifier associated with the first audio input may be identified, a second audio input may be received via a second query, and it may be determined whether the identifier is associated with the second audio input. If the identifier is associated with the second audio input, a second action may be identified based on the second query and the data associated with the one or more user profiles, and the identified second action may be performed via the virtual assistant. If the identifier is not associated with the second audio input, a second action may be identified based on the second query and without accessing the data associated with the one or more user profiles, and the identified second action may be performed via the virtual assistant.

A profile associated with the conference may be initiated at the virtual assistant, and the conference profile may be personalized based on one or more conference participants. The virtual assistant may be configured to access data associated with one or more user profiles, and a first participant of the conference may be associated with the first computing device and a virtual assistant user profile. A second participant of the conference may be associated with the second computing device and may not be associated with a virtual assistant user profile. Identifying the action may further comprise identifying, based on the query and the user profile, a first action for the first participant and identifying, based on the query and the guest mode, a second action for the second participant. Performing the action may further comprise performing, at the first computing device, the first action and performing, at the second computing device, the second action.

The first computing device may be associated with the virtual assistant, and an input to activate a private mode may be received at the virtual assistant. In response to the input to activate the private mode, the conference may be muted at the first computing device. It may be indicated to the other computing devices participating in the conference that the private mode has been activated. The conference may be a video conference and indicating that the private mode has been activated may further comprise blurring the video that is transmitted from the first computing device to the other computing devices participating in the video conference. In another example, indicating that the private mode has been activated may further comprise stopping transmission of a video component of the video conference from the first computing device to the other computing devices participating in the video conference and transmitting a text banner in place of the video component from the first computing device to the other computing devices participating in the video conference. Indicating that the private mode has been activated may also comprise receiving a video component of the video conference from the first computing device, identifying a face in the video component, identifying one or more facial features on the face, identifying a rest position of the one or more facial features, generating a processed video component, where the video component is processed to apply the rest position to the one or more facial features of the identified face, and transmitting the processed video component in place of the video component to the other computing devices participating in the video conference.

In accordance with a second aspect of the disclosure, a method is provided. The method includes initiating a first conference between a first computing device and a first group of one or more computing devices and receiving an input to join a second conference at the first computing device. The second conference is initiated between the first computing device and a second group of computing devices. The first conference is associated with the second conference, and the second group of one or more computing devices comprises the first group of one or more computing devices and at least one additional computing device.

In an example system, a group of users are invited to a main video conference; however, before joining the main conference a subgroup of the users joins a huddle, side conversation or breakout room, in the form of a video conference that is related to the main video conference. For example, an identification of the huddle, side conversation or breakout room, may be a child of the identification of the main video conference. Once the users have finished the huddle, side conversation or with the breakout room, they, for example, click on a link associated with the main video conference and join the main video conference.

An invite for the first conference and the second conference may be received at the first computing device and the first group of one or more computing devices, and an invite for the second conference may be received only at the at least one additional computing device. Initiating the first conference may further comprise initiating the first conference in response to receiving input accepting the invite for the first conference at the first computing device. Associating the first conference with the second conference may further comprise assigning a first session identification to the first conference and assigning a second session identification to the second conference, where the second session identification is a child of the first session identification.

A virtual assistant may be associated with the first computing device and initiating the second conference may further comprise initiating a gaming session via input provided to the virtual assistant. The first computing device and the first group of one or more computing devices may be concurrent participants in the first conference and the gaming session.

A social media profile associated with the first computing device may be identified, and one or more friends associated with the game of the gaming session may be identified via the social media profile. The first group of one or more computing devices may comprise computing devices associated with one or more friends identified via the social media profile. The first computing device and the first group of one or more computing devices may be associated with a first team in the gaming session. The second group may comprise a plurality of additional computing devices and the additional computing devices may be associated with a second team in the gaming session. A third conference may be initiated between the additional computing devices, where the third conference is associated with the first and second conferences.

A plurality of second virtual assistants may be associated with at least a subset of the computing devices of the first group, and a provider of each of the plurality of second virtual assistants may be identified. A virtual assistant of each provider may be invited to the gaming session, where the invited virtual assistant may be based on the identified provider and from the plurality of second virtual assistants. Third and additional conferences may be initiated between the second group of computing devices via the invited virtual assistants of each provider. An input that enables a volume associated with the invited virtual assistants to be independently controlled from the volume of the first or second conferences may be received, via a user interface element, at one of the computing devices of the first and second groups of computing devices.

Audio may be transmitted from the gaming session to a first audio mixer, audio may be transmitted from the first conference to a second audio mixer, audio may be transmitted from the second conference to a third audio mixer and audio may be transmitted from the virtual assistant to a fourth audio mixer. A command for activating the virtual assistant in an output from one of the first, second, third and fourth audio mixers may be identified. In response to identifying the command, the output from the respective first, second, third or fourth audio mixer may be transmitted, based on the command, to a virtual assistant service. A query may be received, the query may be transmitted via the virtual assistant service to the virtual assistant, and an action may be performed, based on the query, via the personal assistant.

A user interface may be generated for output at the first computing device. The user interface may comprise first, second and third user interface elements. The first user interface element may be for selecting one or more computing devices in the second group, generating an invite for a third conference between the selected one or more computing devices and the first computing device. The third conference may be associated with the first and second conferences, and transmitting, from the first computing device to the selected computing devices, the invite. The second user interface element may be for accepting or rejecting an invite to a conference. The third user interface element may be for adding a virtual assistant to one of the first, second or third conferences and enabling input at the virtual assistant from a sub-selection of the computing devices in the conference associated with the virtual assistant.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Figure 1:
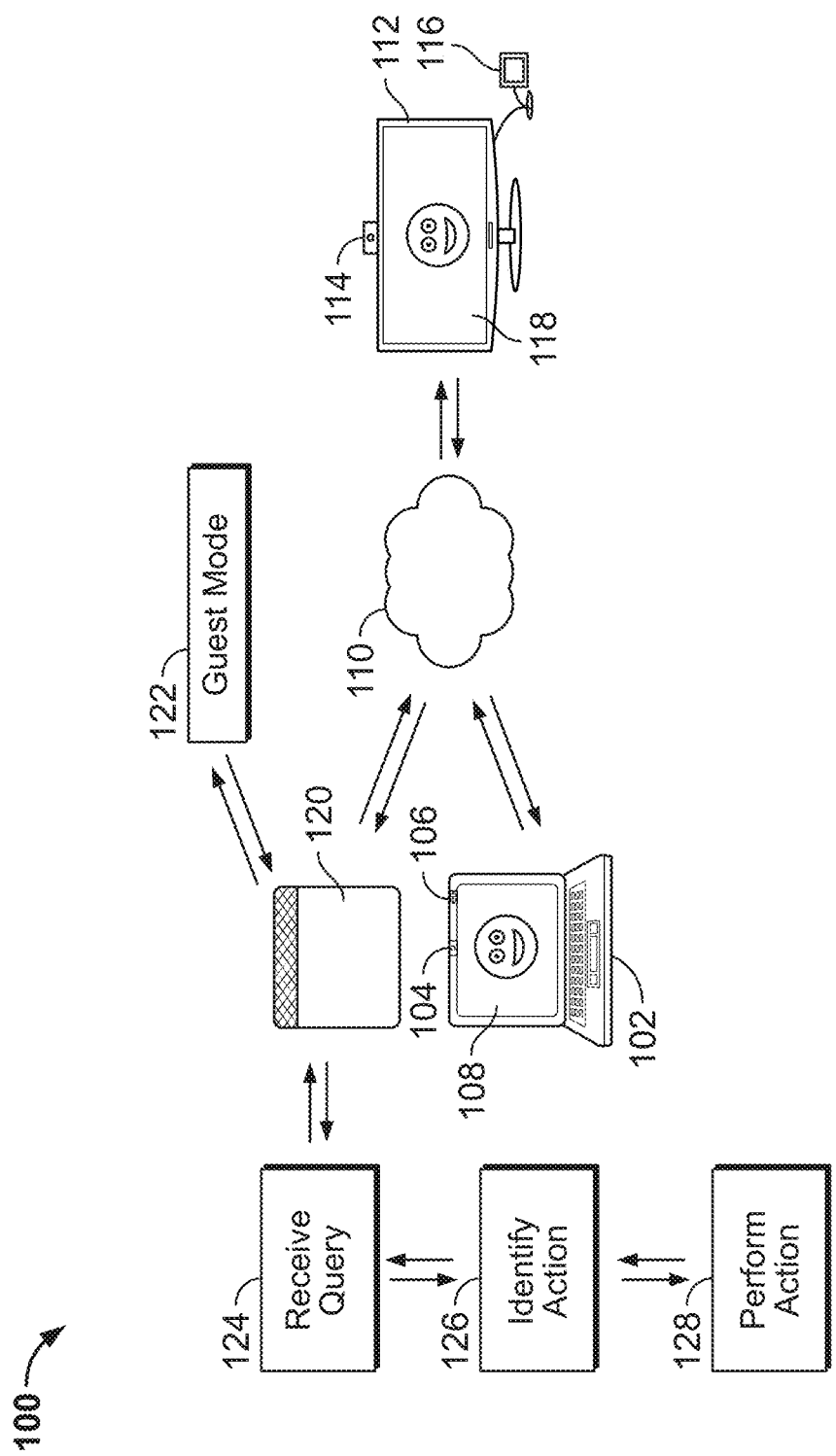
FIG. 1 shows an example environment for enabling the protection of user privacy when adding a virtual assistant to a conference, in accordance with some embodiments of the disclosure.

Systems and methods are provided herein that enable the protection of user privacy when adding a virtual assistant to a conference and/or enable the enhanced management of related conferences. A conference includes any real-time, or substantially real-time, transmission of audio and/or video between at least two computing devices. The conference may be implemented via a conferencing service running on a server. In some examples, a conference may be implemented via a dedicated application running on a computing device. The conference may comprise additional channels to enable text and/or documents to be transmitted via different participants. A conference may be initiated via selecting a user in an address book, entering a user identification, such as an email address and/or a phone number, and/or selecting a shared link and/or quick response (QR) code. A conference includes any solutions that enable two or more users, or computing devices, to establish a video and/or audio communication session. This includes applications, including those implemented via an internet browser, associated with FaceTime, WhatsApp, Facebook Live. This also includes any solutions that enable the broadcast of a conversation and give some users the ability to interact with a host including, for example, an influencer who is broadcasting.

A virtual assistant is any assistant implemented via a combination of software and hardware. Typically, a virtual assistant receives a query and performs an action in response to the query. A virtual assistant may be implemented via an application running on a computing device, such as a laptop, smartphone and/or tablet, such as Microsoft Cortana, Samsung Bixby or Apple Siri. In another example, a virtual assistant may be implemented via dedicated hardware, such as an Amazon Alexa smart speaker or a Google Nest smart speaker. Typically, virtual assistants respond to a command comprising a wake word or phrase and are put in a mode for receiving a query following the wake word or phrase. A query may include, for example, performing a search, requesting that a song be played, requesting that an item be added to a list, ordering an item for delivery, playing a game, requesting a news update and/or requesting a weather update. The virtual assistant may directly perform the action. In other examples, the virtual assistant may perform the action, and/or cause the action to be performed, via a third-party application. This may comprise, for example, passing the query to the application via an application programming interface (API). In some examples, the query may comprise instructing the virtual assistant via a skill.

A guest mode is a mode that the virtual assistant can be put in, or can put itself in, that prevents certain types of information from being output in response to a query. The guest mode may be used to protect the privacy of an owner of a virtual assistant and/or a user with a profile enabled on a virtual assistant. In some examples, the virtual assistant may put itself in guest mode in response to detecting people other than a user associated with a virtual assistant profile. This may be in response to detecting other people proximate the user, for example, by detecting voices other than the user's voice via a microphone of the device, such as a smart speaker, associated with the virtual assistant. In another example, the virtual assistant may detect other users associated with an application running on a computing device associated with the virtual assistant, for example, if the virtual assistant has been added to a conference. Guest mode may prevent personal information from being output at all (i.e., in a response to any query from any user/person). In another example, guest mode may prevent personal information from being output in response to a query that is raised by someone other than the user associated with the virtual assistant profile. The user may be detected by, for example, voice recognition. The types of information that may be prevented from being output include, for example, calendar entries; messages, such as text messages, emails, and/or voicemails; and/or any other type of personal information associated with a user profile. In some examples, the virtual assistant may interpret queries differently. For example, if a user said, "list movies playing at the cinema," the personal assistant may output a list of comedy movies, because the user profile may indicate that the user prefers comedies; however, in guest mode, the virtual assistant may output a generic list of movies. In other examples, a response to a query may not include personal information. For example, if a query to make an appointment causes a scheduling clash, the personal assistant may not output details about the appointment already booked. In one example, a user may ask the virtual assistant to book an appointment for tomorrow at 15:00. The virtual assistant may identify that the user has an appointment with a doctor already booked at that time; however, as the virtual assistant is in guest mode, the virtual assistant may simply reply "There is a conflict," without detailing the nature of the conflict. If the virtual assistant is not in guest mode, then the virtual assistant may reply "You have an appointment with a doctor at that time." Settings associated with the virtual assistant may enable a user to select what data is shared and/or not shared in guest mode. For example, settings may enable a user to prevent from being shared all data from a type of application (e.g., calendar applications and/or messaging applications), data from a specific application (e.g., Outlook), a type of data (e.g., calendar appointments, messages and/or contacts) and/or data associated with a type of account (e.g., work and/or home).

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, a smart speaker, an augmented reality device, a mixed reality device, a virtual reality device, a gaming console, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

FIG. 1 shows an example environment for enabling the protection of user privacy when adding a virtual assistant to a conference, in accordance with some embodiments of the disclosure. The environment 100 comprises a first computing device, in this example laptop 102, the laptop 102 having an integrated camera 104, an integrated microphone 106 and an integrated display 108, that communicates via network 110 with a second computing device, in this example a thin client 112, the thin client 112 having an external camera 114, an external microphone 116 and an integrated display 118. The laptop 102 and the thin client 112 communicate via network 110 with smart speaker 120. In other examples, any of the computing device peripherals may be integrated and/or external. In this example, a conference is initiated between the laptop 102 and the thin client 112 via network 110; however, any number of computing devices may participate in the conference including, for example, three, five, 10, 25, 50, 125 and/or 200. The network 110 may be any suitable network, including the internet, and may comprise wired and wireless means. The smart speaker 120 is added to the conference. In this example, the smart speaker 120 is a physical smart speaker, but in other examples, the smart speaker 120 may be any other type of smart speaker including, for example, a smart speaker implemented via an application running on one of the computing devices participating in the conference. In this example, the smart speaker 120 is in the same room as the laptop 102, such that a user can use the laptop 102 and utter a command to the smart speaker 120; however, in other examples, the smart speaker 120 may be in any suitable location. The smart speaker 120 may be added via, for example, an invite sent from the laptop 102. In another example, the smart speaker 120 may be added via a voice command, for example, a user at the laptop 102 may say "Alexa, join Zoom meeting 123456." On joining the conference, the smart speaker identifies that it is in a conference and activates guest mode 122. As discussed above, guest mode prevents the personal assistant from sharing at least some data associated with a virtual assistant user profile with the other participants of the conference. At 124, a query is received. For example, the query may be "Call Joan." At 126, an action based on the query and the guest mode is identified. For example, because the virtual assistant is in guest mode, the action may be to request Joan's number. Even though Joan's number is associated with a virtual assistant profile, the guest mode may prevent it from being accessed. As discussed in connection with FIG. 2 below, a user associated with the virtual assistant may effectively be able to override the guest mode. At 128, the action is performed, in this example, "Please provide Joan's number" is output at the smart speaker 120.

In some examples, the action may be identified based on a status of the guest mode. For example, the status of the guest mode may be "Active" or "Inactive." In another example, the guest mode may be one of a plurality of modes that can be activated at the virtual assistant. For example, a personal mode may be activated at the virtual assistant instead of the guest mode.

The guest mode may enable the virtual assistant to operate in a "clean slate" mode and may apply personalization (for example, by appending a personalization flag in the query header to any backend application or skill) when a voice profile is identified or matched.

Figure 2:
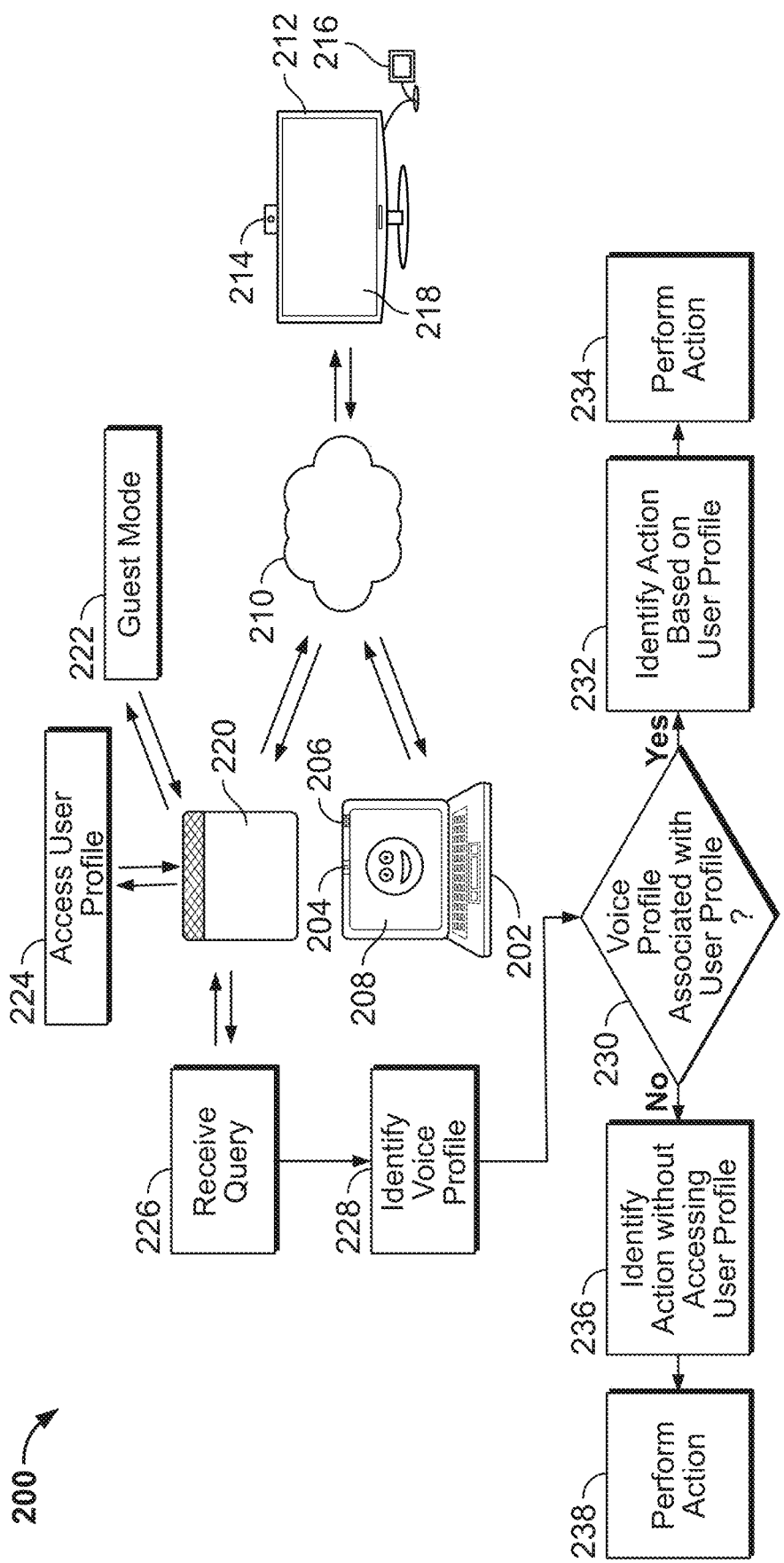
FIG. 2 shows another example environment for enabling the protection of user privacy when adding a virtual assistant to a conference, in accordance with some embodiments of the disclosure.

FIG. 2 shows another example environment for enabling the protection of user privacy when adding a virtual assistant to a conference, in accordance with some embodiments of the disclosure. In a similar manner to the environment shown in FIG. 1, the environment 200 comprises a first computing device, in this example laptop 202, the laptop 202 having an integrated camera 204, an integrated microphone 206 and an integrated display 208, that communicates via network 210 with a second computing device, in this example a thin client 212, the thin client 212 having an external camera 214, an external microphone 216 and an integrated display 218. The laptop 202 and the thin client 212 communicate via network 210 with smart speaker 220. In other examples, any of the computing device peripherals may be integrated and/or external. In this example, a conference is initiated between the laptop 202 and the thin client 212 via network 210; however, any number of computing devices may participate in the conference including, for example, three, five, 10, 25, 50, 125 and/or 200. The smart speaker 220 is added to the conference. On joining the conference, the smart speaker 220 identifies that it is in a conference and activates guest mode 222. At 224, a user profile is accessed. The user profile may be stored at the smart speaker 220 or, in another example, may be stored remotely from the smart speaker 220 on a server and be accessible via the network 210. At 226, a query is received. For example, the query may be "Call Joan." At 228, a voice profile associated with the query is identified. At 230, it is determined whether the voice profile is associated with the user profile by, for example, comparing the voice profile to a voice profile stored with the user profile. If the voice profile is associated with the user profile, then, at 232, an action based on the query and the user profile is identified. In this example, the action would be to call Joan via a contact number stored with, or accessible via, the user profile. At 234, the virtual assistant calls Joan. If the voice profile is not associated with the user profile, for example, if the query was spoken by another participant in the conference, such as the user associated with the thin client 212, then, at 236, an action is identified based on the query only. In this example, the action is to request Joan's number. At 238, the action is performed. In this example, the smart speaker 220 outputs "Please provide Joan's number."

In some examples, the owner of a virtual assistant (or user with a profile associated with the virtual assistant) may be able to query the virtual assistant in the same manner that they normally query it. In this example, the guest mode might not apply to the owner, during the video conference call, unless an option, or setting, is explicitly overridden. A voice profile match/verification may take place via a voice profile matching service within a conferencing service. This voice profile matching service may be an efficient microservice within a service-oriented architecture that matches voice queries with known voice profile(s) when, for example, a wake word is detected. In one example, the voice profile matching service may be invoked upon the detection of a wake word such as "Hey Siri," or "Alexa," in order to determine the identity of the user issuing a query. In some examples, the determination may be whether the voice profile of any speaker matches any stored voice profiles. A portion of a user query (or at least the portion that represents the wake word) may be analyzed for a voice profile match. In other examples, the profile associated with the virtual assistant may be imported during an authentication phase associated with the virtual assistant. In one example, the voice profile detection may be performed based on an IP address associated with the query, or source of the query. Performing the voice profile detection based on an IP address, or source, of a query, enables minimal computing power to be expended and speeds up the processing time of the query, since there is no analysis of the characteristics of the voice query. In some examples, the virtual assistant may be aware of a device identification associated with an invite to a conference, and any query from that device identification is assumed to be associated with the overriding the guest mode.

Figure 3:
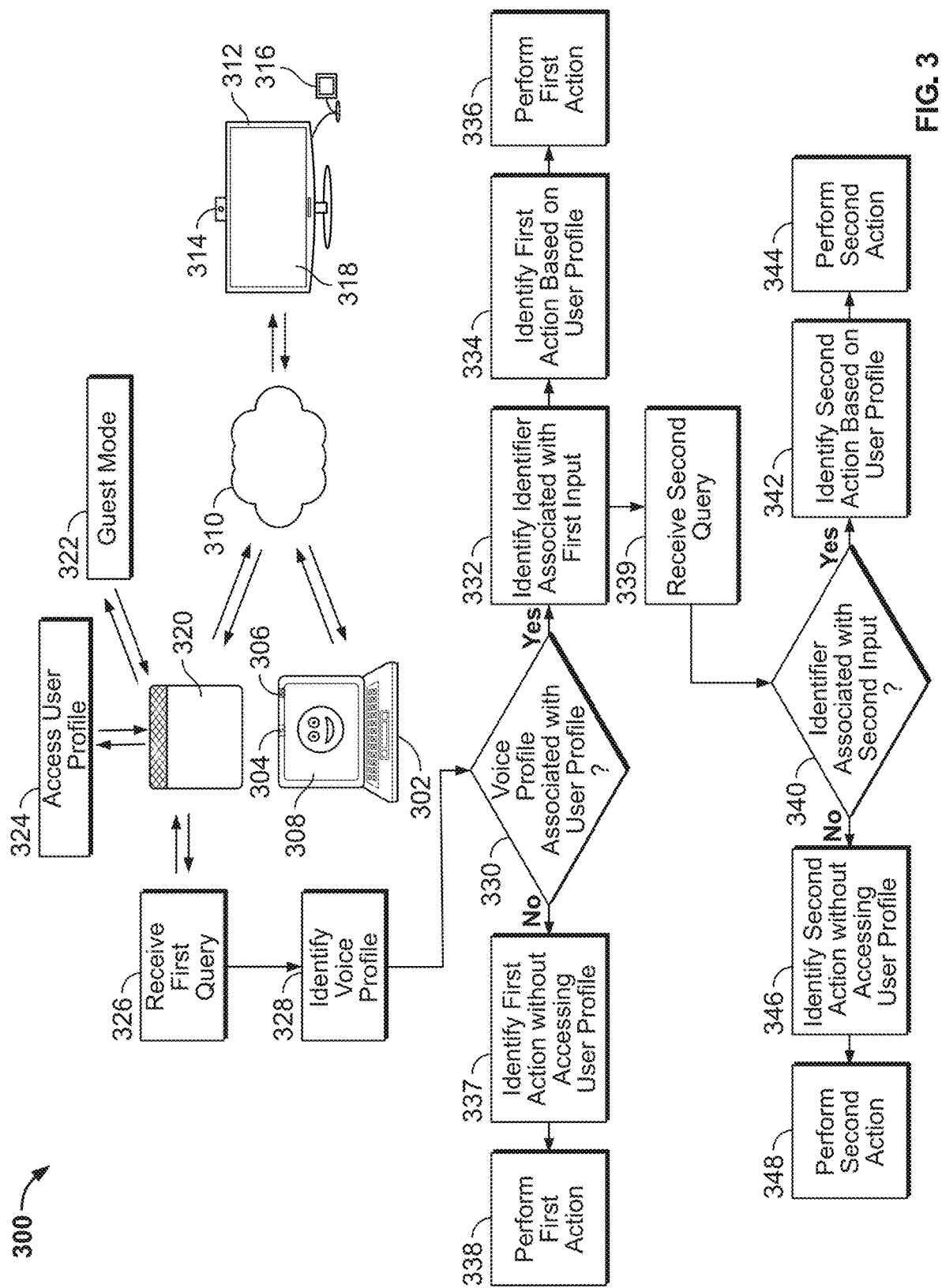
FIG. 3 shows another example environment for enabling the protection of user privacy when adding a virtual assistant to a conference, in accordance with some embodiments of the disclosure.

FIG. 3 shows another example environment for enabling the protection of user privacy when adding a virtual assistant to a conference, in accordance with some embodiments of the disclosure. In a similar manner to the environment shown in FIGS. 1 and 2, the environment 300 comprises a first computing device, in this example laptop 302, the laptop 302 having an integrated camera 304, an integrated microphone 306 and an integrated display 308, that communicates via network 310 with a second computing device, in this example a thin client 312, the thin client 312 having an external camera 314, an external microphone 316 and an integrated display 318. The laptop 302 and the thin client 312 communicate via network 310 with smart speaker 320. In other examples, any of the computing device peripherals may be integrated and/or external. In this example, a conference is initiated between the laptop 302 and the thin client 312 via network 310; however, any number of computing devices may participate in the conference including, for example, three, five, 10, 25, 50, 125 and/or 200. The smart speaker 320 is added to the conference. On joining the conference, the smart speaker 320 identifies that it is in a conference and activates guest mode 322. At 324, a user profile is accessed. At 326, a query is received. For example, the query may be "Call Joan." At 328, a voice profile associated with the query is identified. At 330, it is determined whether the voice profile is associated with the user profile by, for example, comparing the voice profile to a voice profile stored with the user profile. If the voice profile is associated with the user profile, then at 332, an identifier associated with the first input is identified, such as a fingerprint of the voice profile. At 334, a first action based on the query and the user profile is identified. In this example, the action would be to call Joan via a contact number stored with, or accessible via, the user profile. At 336, the virtual assistant calls Joan. If the voice profile is not associated with the user profile, for example, if the query was spoken by another participant in the conference, such as the user associated with the thin client 312, then, at 337, a first action is identified based on the query only. In this example, the action is to request Joan's number. At 338, the first action is performed. In this example, the smart speaker 320 outputs "Please provide Joan's number." At 339, a second query is received. For example, the second query may be "Send email to Jim." At 340, it is identified whether the second query is associated with the identifier identified at 332. For example, it is identified whether the second query has the same fingerprint as the first query. In this manner, the voice profile stored with the user profile does not need to be accessed for each subsequent query. At 342, a second action based on the second query and the user profile is identified. In this example, the action would be to send an email to an email address stored with, or accessible via, the user profile. At 344, the virtual assistant emails Jim. If the voice profile is not associated with the user profile, for example, if the query was spoken by another participant in the conference, such as the user associated with the thin client 312, then, at 346, a second action is identified based on the query only. In this example, the action is to request Jim's email address. At 348, the action is performed. In this example, the smart speaker 320 outputs "Please provide Jim's email address."

In some examples, the virtual assistant may give multiple responses to a query. For example, if the query is initiated by a user with no stored voice profile, then a general, or non-personalized, response may be given. Responses may be structured text from a corresponding backend application or skill that gets converted to speech (for example, using a text-to-speech module) so it can be heard by other conference participants. A personalized response can also be output at a computing device associated with the host of a conference, or at a computing device associated with the owner of the smart assistant based on their device address (for example, an IP or MAC address). The personalized response (for example, while unprompted and not asked for by the host) may be based on the context of the query issued by other participants in the conference. For example, a query such as "Hey Siri, when is the last showing for 'Top Gun' in Seattle tonight?" might return the time of the last showing of the movie while outputting calendar information at a computing device associated with the host of the video conference.

Figure 4:
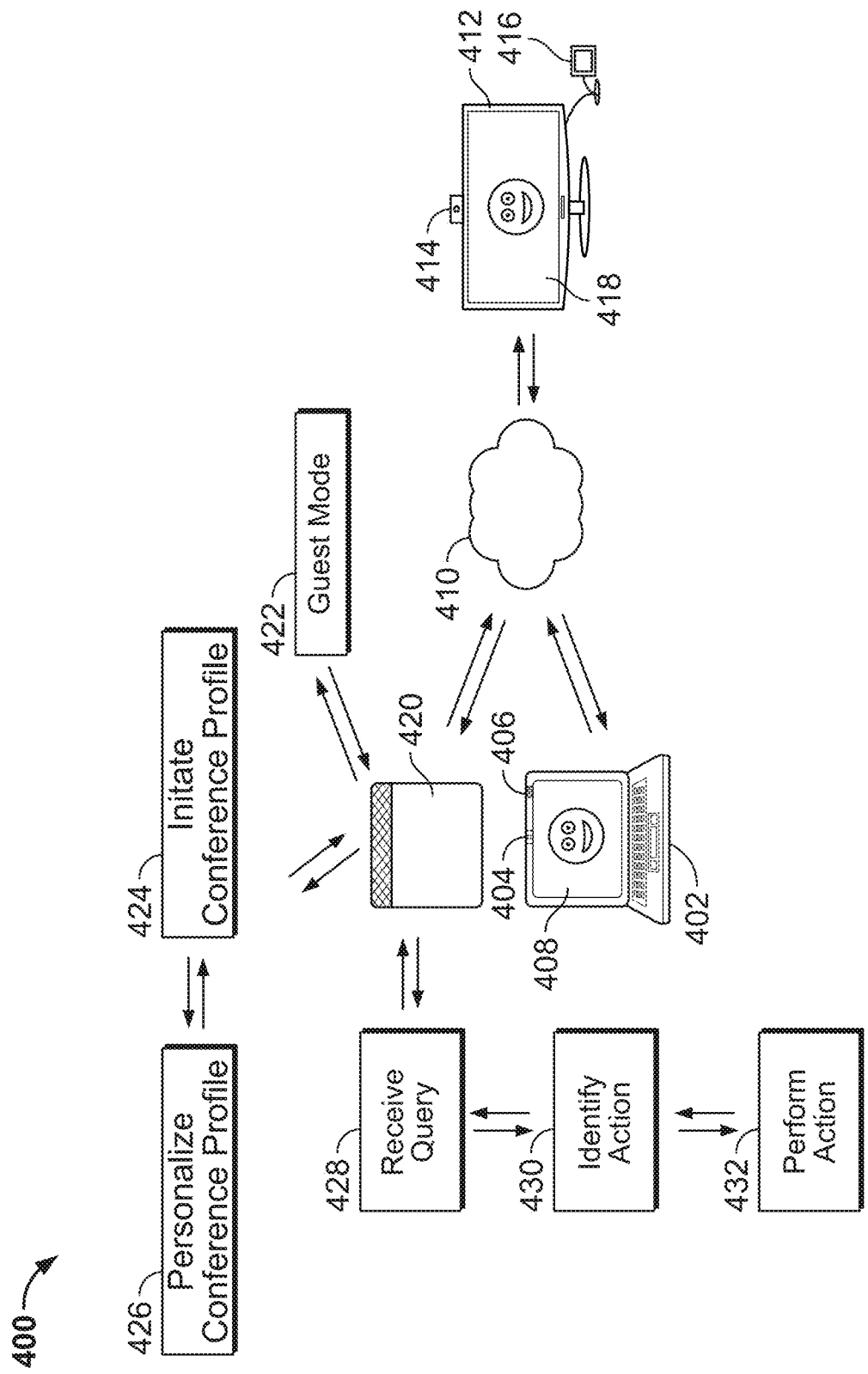
FIG. 4 shows another example environment for enabling the protection of user privacy when adding a virtual assistant to a conference, in accordance with some embodiments of the disclosure.

FIG. 4 shows another example environment for enabling the protection of user privacy when adding a virtual assistant to a conference, in accordance with some embodiments of the disclosure. In a similar manner to the environment shown in FIGS. 1-3, the environment 400 comprises a first computing device, in this example laptop 402, the laptop 402 having an integrated camera 404, an integrated microphone 406 and an integrated display 408, that communicates via network 410 with a second computing device, in this example a thin client 412, the thin client 412 having an external camera 414, an external microphone 416 and an integrated display 418. The laptop 402 and the thin client 412 communicate via network 410 with smart speaker 420. In other examples, any of the computing device peripherals may be integrated and/or external. In this example, a conference is initiated between the laptop 402 and the thin client 412 via network 410; however, any number of computing devices may participate in the conference including, for example, three, five, 10, 25, 50, 125 and/or 200. The smart speaker 420 is added to the conference. On joining the conference, the smart speaker 420 identifies that it is in a conference and activates guest mode 422. At 424, a conference profile is initiated. The conference profile may be stored at the smart speaker 420 or, in another example, may be stored remotely from the smart speaker 420 on a server and be accessible via the network 410. The conference profile may, for example, store preferences and/or settings associated with participants in the conference. At 426, the conference profile is personalized. This may comprise users explicitly providing input to the profile and/or via data that is collected from the conference. At 428, a query is received. For example, the query may be "Invite Alex." At 430, an action based on the query, the guest mode and the conference profile are identified. For example, because the virtual assistant is in guest mode and based on the conference profile, the action may be to invite a work colleague, Alex, to the conference via Alex's work email address. At 432, the action is performed: in this example, an invite is sent to Alex via smart speaker 420.

In some examples, a video conferencing system can offer its own version of a virtual assistant, such as a generic virtual assistant. In this case, a voice profile may not be needed. The virtual assistant offered by a video conference system can also evolve or incorporate an evolving user profile. The virtual assistant may be able to associate a user with the virtual assistant when the user is logged in. In a group conversation, the virtual assistant may, for example, be granted access to the calendars of participants so that the virtual assistant can, for example, help find the best possible time slots for a meeting that the involved group may want to schedule.

Figure 5:
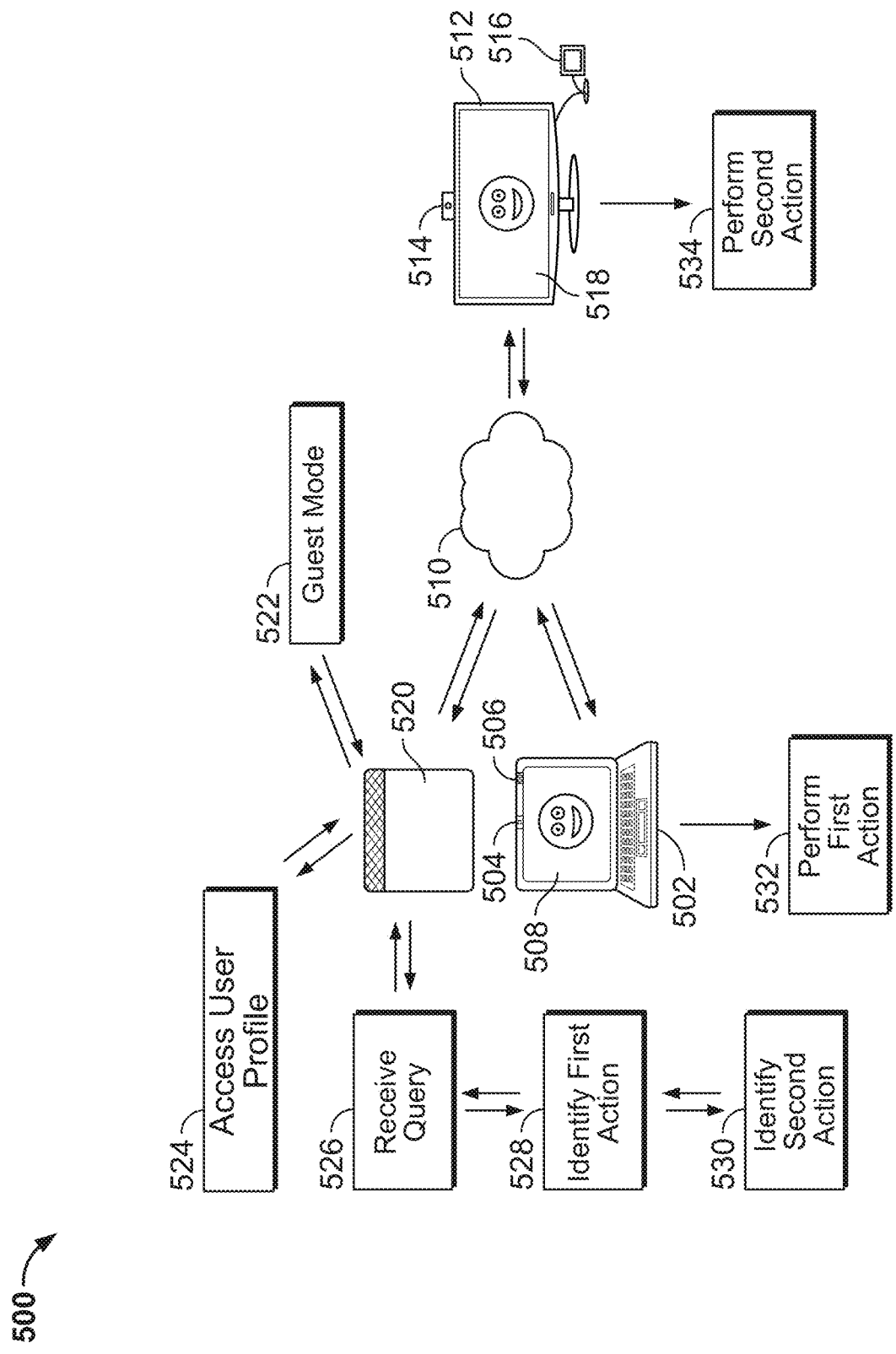
FIG. 5 shows another example environment for enabling the protection of user privacy when adding a virtual assistant to a conference, in accordance with some embodiments of the disclosure.

FIG. 5 shows another example environment for enabling the protection of user privacy when adding a virtual assistant to a conference, in accordance with some embodiments of the disclosure. In a similar manner to the environment shown in FIGS. 1-4, the environment 500 comprises a first computing device, in this example laptop 502, the laptop 502 having an integrated camera 504, an integrated microphone 506 and an integrated display 508, that communicates via network 510 with a second computing device, in this example a thin client 512, the thin client 512 having an external camera 514, an external microphone 516 and an integrated display 518. The laptop 502 and the thin client 512 communicate via network 510 with smart speaker 520. In other examples, any of the computing device peripherals may be integrated and/or external. In this example, a conference is initiated between the laptop 502 and the thin client 512 via network 510; however, any number of computing devices may participate in the conference including, for example, three, five, 10, 25, 50, 125 and/or 200. The smart speaker 520 is added to the conference. On joining the conference, the smart speaker 520 identifies that it is in a conference and activates guest mode 522. At 524, a user profile is accessed. The user profile may be stored at the smart speaker 520 or, in another example, may be stored remotely from the smart speaker 520 on a server, for example, a server offering a smart speaker service, and be accessible via the network 510. At 526, a query is received. For example, the query may be "Show latest film times for 'Top Gun' for all participants." At 528, a first action based on the query and the user profile is identified. In this example, the first action is associated with the laptop 502. It is identified that the laptop 502 is associated with the accessed user profile, and the identified first action is to show film times for "Top Gun" based on a favorite location associated with the user profile. At 530, a second action based on the query is identified. In this example, the second action is associated with the thin client 512. It is identified that the thin client 512 is not associated with the accessed user profile, and the identified first action is to show generic film times for "Top Gun" for a variety of locations. In some examples, the locations may be based on an identified IP address of the thin client 512 rather than the user profile. At 532, the film times identified at 528 are output at the laptop 502, and at 534, the film times identified at 530 are output at the thin client 512.

Figure 6:
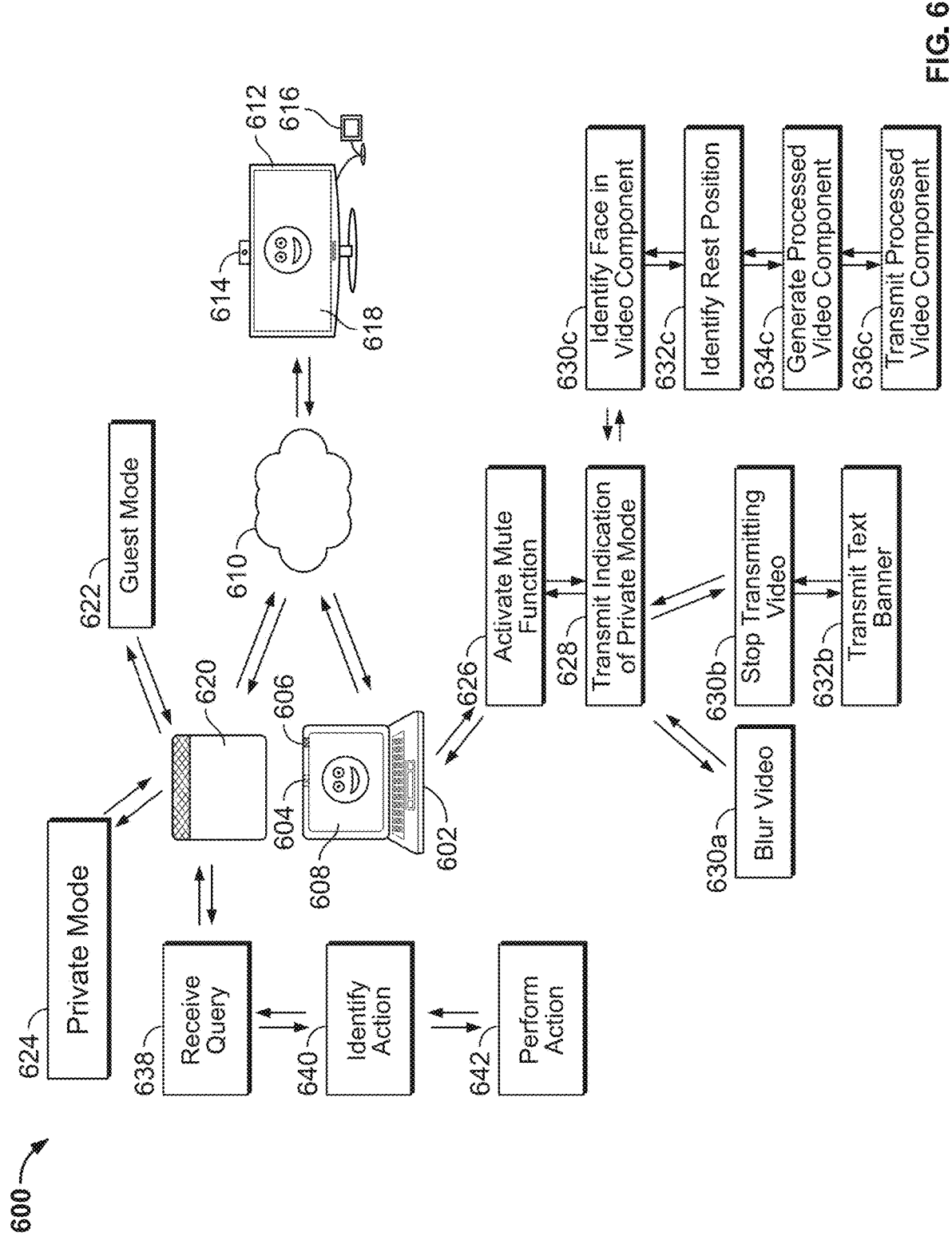
FIG. 6 shows another example environment for enabling the protection of user privacy when adding a virtual assistant to a conference, in accordance with some embodiments of the disclosure.

FIG. 6 shows another example environment for enabling the protection of user privacy when adding a virtual assistant to a conference, in accordance with some embodiments of the disclosure. In a similar manner to the environment shown in FIGS. 1-5, the environment 600 comprises a first computing device, in this example laptop 602, the laptop 602 having an integrated camera 604, an integrated microphone 606 and an integrated display 608, that communicates via network 610 with a second computing device, in this example a thin client 612, the thin client 612 having an external camera 614, an external microphone 616 and an integrated display 618. The laptop 602 and the thin client 612 communicate via network 610 with smart speaker 620. In other examples, any of the computing device peripherals may be integrated and/or external. In this example, a conference is initiated between the laptop 602 and the thin client 612 via network 610; however, any number of computing devices may participate in the conference including, for example, three, five, 10, 25, 50, 125 and/or 200. The smart speaker 620 is added to the conference. On joining the conference, the smart speaker 620 identifies that it is in a conference and activates guest mode 622. In addition to activating guest mode 622, a private mode is activated 624. The private mode may be activated by a user, for example, by speaking a command, such as, "Activate private mode," to the smart speaker 620 or by selecting a setting via, for example, a user interface associated with the virtual assistant. The private mode prevents other conference participants from hearing a spoken query to the smart speaker 620. At 626, a mute function at the laptop 602 is activated. This mute function may mute the microphone 606 of the laptop 602 entirely. In other examples, the microphone 606 may continue to function; however, a conferencing application may be prevented from transmitting the audio to other conference participants. At 628, an indication of the private mode is transmitted to other conference participants. In some examples, this may comprise transmitting data from the laptop 602 that causes an icon to be displayed at the computing devices of other conference participants, such as the thin client 612. In response to a user invoking the virtual assistant 620 in private mode, an icon can be retrieved from local system configuration files associated with the video conference application or downloaded from, for example, a web server and displayed at the computing devices of other conference participants.

In addition to activating a mute function, other actions may optionally be performed. At 630a, an example of an optional action is to additionally blur the video that is transmitted from the laptop 602, so that other conference participants cannot see the user talking. This prevents, for example, confusion as to whether a user is intending to speak to the conference participants or to provide input to the smart speaker 620. The video may be blurred at the laptop 602, at a server (not shown), for example, a server offering a smart speaker service, and/or at the computing devices of other conference participants, such as the thin client 612. In some examples, a thumbnail of the user that is output at a computing device may be blurred. At 630b, in another example, the video is not transmitted to other conference participants. In some examples, the laptop 602 may stop transmitting the video; however, it is also contemplated that a server (not shown), for example, a server offering a smart speaker service, may receive a video stream from the laptop 602 and not transmit the video to other conference participants; or the computing devices of the other conference participants, such as thin client 612, may receive the video but not generate it for display. In addition, at 632b, a text banner may be transmitted and/or displayed in place of the video. For example, a standard and/or custom message may be transmitted from the laptop 602 to the other computing devices in the conference, where it is generated for display. For example, the message may read "User has temporarily stopped video." In other examples, a server (not shown), for example, a server offering a smart speaker service, may generate a message and transmit it to the other computing devices in the conference; or the other computing devices, such as thin client 612, may automatically generate a message in response to the video being stopped.

At 630c, in another example, a face may be identified in the video component at the laptop 602. A rest position of the face may be identified at 632c. At 634c, a processed video component may be generated. For example, the processed video component may comprise a video component wherein the user's moving face as they are speaking a query to a virtual assistant is replaced with a representation of their face at rest position, so that even though they may be speaking to provide a query to the smart speaker 620, it looks as if their mouth is not moving; however, if, for example, they move their head from side to side, their head may still move in the processed video component. At 636c, the processed video component is transmitted to the other computing devices in the conference, such as thin client 612. In this manner, a user may provide input to a virtual assistant without causing confusion as to whether they are speaking to the conference participants. Steps 630c-634c may be generated via a trained algorithm. In some examples, these steps may be performed via an artificial intelligence (AI) processor, such as a Google Tensor processor and/or a Samsung Exynos processor. In some examples, steps 630c-634c may be implemented via, for example, NVIDIA Maxine. In some examples, some, or all, of steps 630c-634c may be performed at the laptop 602. In other examples, the video component may be transmitted, via network 610, to a server (not shown), and one or more of steps 630c-634c may be performed at the server, and the processed video component may be transmitted from the server to the other conference participants, such as thin client 612. In another example, the original video component may be transmitted from laptop 602 to the other conference participants, and the processing may be performed at the computing devices of the other conference participants, such as thin client 612. In some examples, the video component may be transmitted to a server (or the other conference participants) in response to determining that, for example, the computing device, such as laptop 602, does not have adequate processing power and/or battery life to perform the processing in, for example, a reasonable amount of time and/or in substantially real time. In another example, a representation of the user's face in the rest position may be transmitted, via network 610, from the laptop 602 to the computing devices of the other conference participants, and an AI platform at the computing devices of the conference participants, such as thin client 612, may be used to reconstruct the user's face in the rest position.

In addition, in response to activating private mode, the user may be able to choose how their video thumbnail should be shown to others while using such functionality via saved preferences, in response to using the functionality the first time and/or every subsequent time. Options such as "Blur and display banner," "Turn off video and display banner," "Display my profile picture" and/or "Display my name" may be chosen by the user.

After activating private mode 624 and implementing the private mode as discussed above, a query is received at 638. For example, the query may be "Call Joan." At 640, an action based on the query and the guest mode is identified, such as to request Joan's number. At 642, the action is performed, in this example, "Please provide Joan's number" is output at the smart speaker 620. In some examples, the guest mode and the private mode may interact. For example, if the private mode is implemented, then the guest mode may be overridden. In this example, the identified action 640 may be to call Joan via a contact number stored with, or accessible via, a user profile. At 642, the virtual assistant may call Joan.

In some examples, users can issue queries in a public or a private mode. A query in public mode may be heard by all other participants in a conference, while a query in private mode may only be heard by the user interacting with a virtual assistant. In some examples, users can select the public mode for use with selected participants in a conference. In another example, a user can share their virtual assistant and disable input and output to the virtual assistant for everyone except the owner of the virtual assistant.

Figure 7:
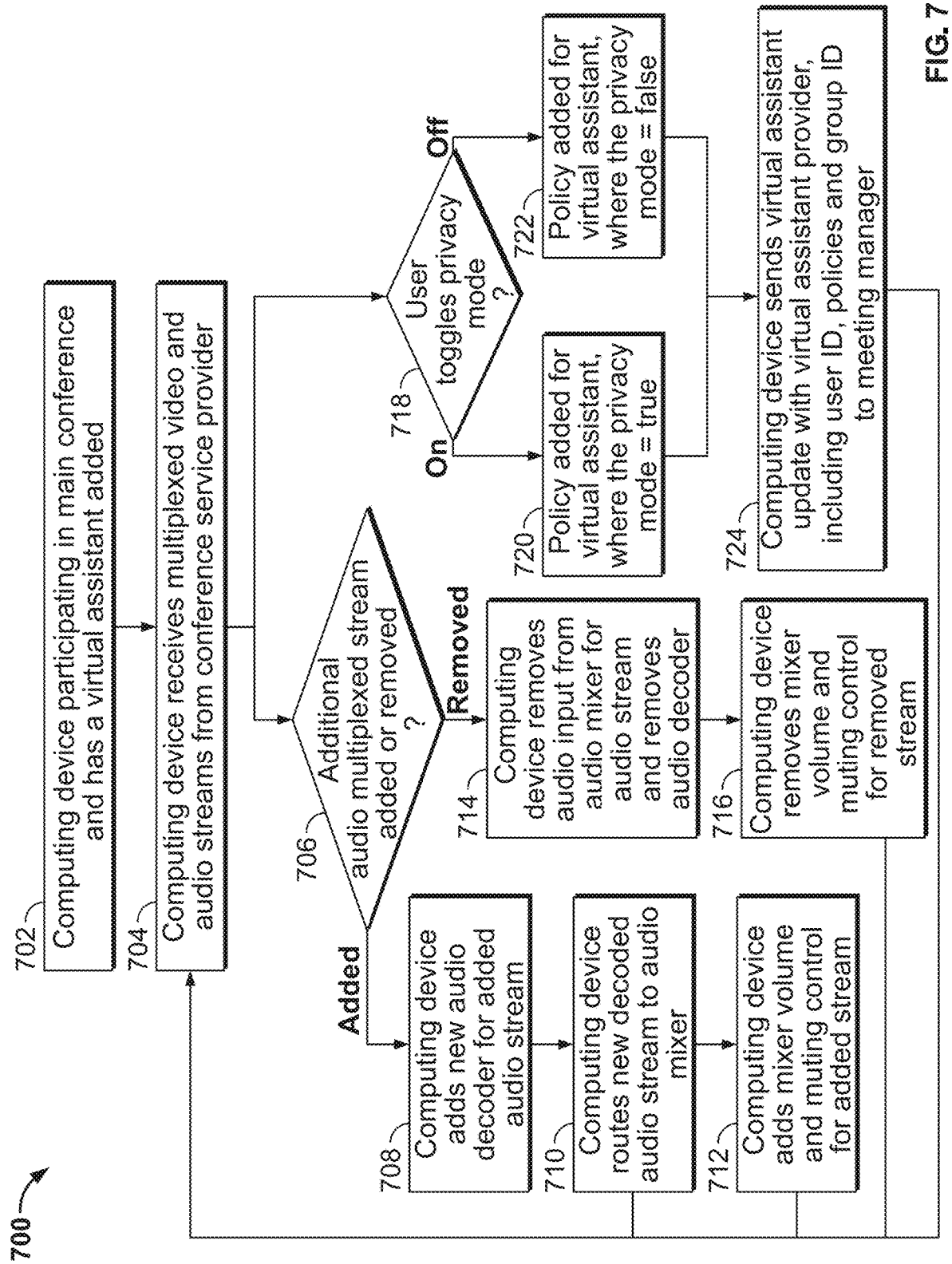
FIG. 7 shows a flowchart of illustrative steps involved in enabling the protection of user privacy when adding a virtual assistant to a conference, in accordance with some embodiments of the disclosure.

FIG. 7 shows a flowchart of illustrative steps involved in enabling the protection of user privacy when adding a virtual assistant to a conference, in accordance with some embodiments of the disclosure. Process 700 may be implemented on any of the aforementioned computing devices (e.g., computing device 102, 112, 202, 212, 302, 312, 402, 412, 502, 512, 602, 612). In addition, one or more actions of the process 700 may be incorporated into or combined with one or more actions of any other process or embodiments described herein.

The process 700 shows example steps for enabling a virtual assistant to toggle a private mode, such as that discussed in connection with FIG. 6, after the virtual assistant is added to a conference. At 702, a virtual assistant is added to a conference via a participant's computing device. At 704, the computing device receives multiplexed video and audio streams from a conference service provider. At 706, it is determined whether one or more additional audio multiplexed streams have been added or removed. If a stream has been added, at 708, the computing device adds a new audio decoder for the added audio stream (see, for example, FIGS. 12 and 13 below). At 710, the computing device routes the new decoded audio stream to an audio mixer, and, at 712, the computing device adds a mixer volume and muting control for the added stream and the process returns to step 704. If, at 706, an audio multiplexed stream is removed, then, at 714, the computing device removes audio input from an audio mixer for the audio stream and removes the audio decoder associated with the stream (see, for example, FIGS. 12 and 13 below). At 716, the computing device removes mixer volume and muting control for the removed audio stream, and the process returns to step 704. At 718, a user toggles a privacy mode associated with the virtual assistant. If the privacy mode is toggled to "On," then at 720, a policy is added (see, for example, FIGS. 12 and 13 below) for the virtual assistant where the privacy mode is set to "true." If the privacy mode is toggled to "Off," then at 722, a policy is added (see, for example, FIGS. 12 and 13 below) for the virtual assistant where the privacy mode is set to "false." At 724, the computing device sends the virtual assistant an update with the virtual assistant provider, including, for example, user ID, policies and group ID to the meeting manager (see, for example, FIGS. 12 and 13 below) and the process returns to step 704.

Figure 8:
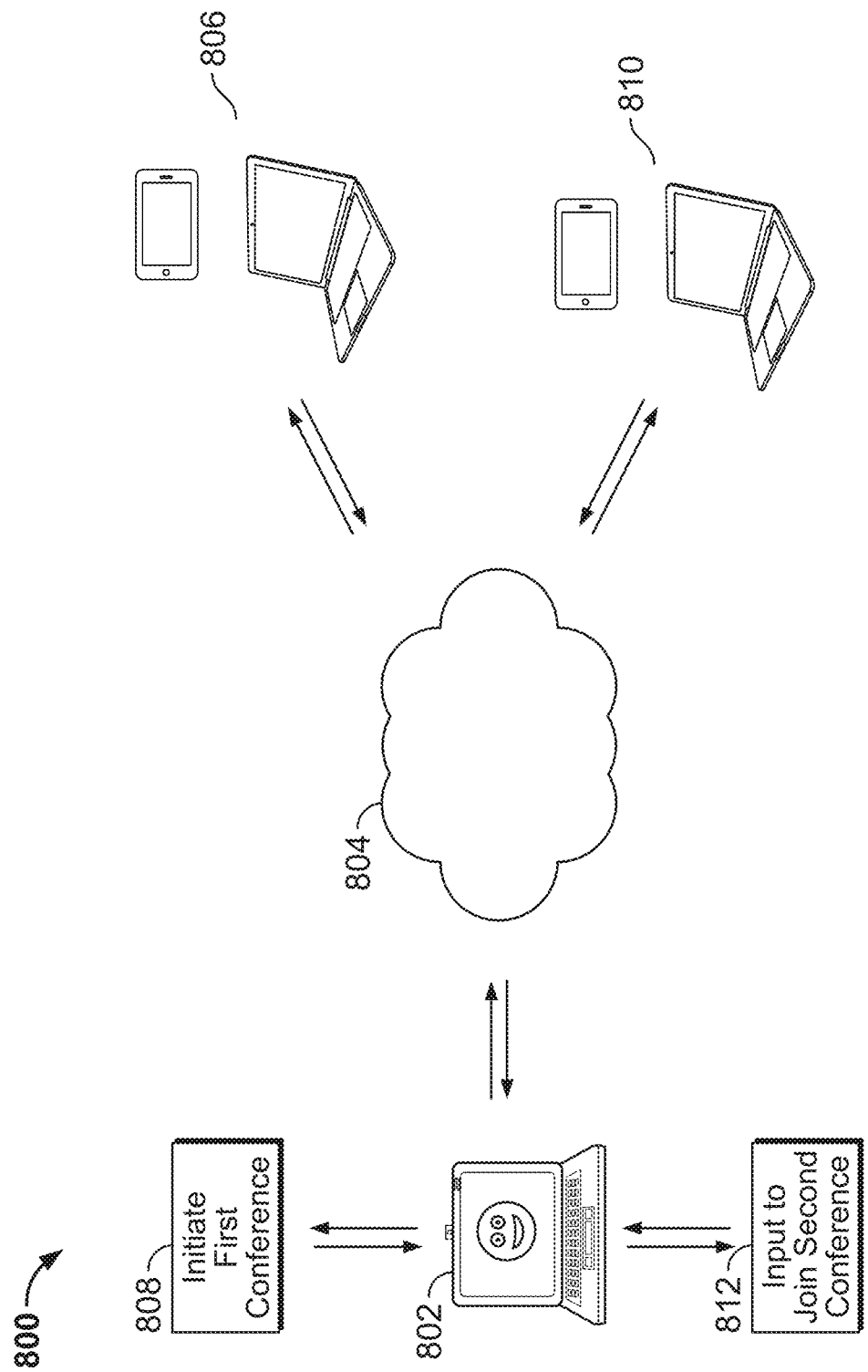
FIG. 8 shows an example environment for enabling the enhanced management of related conferences, in accordance with some embodiments of the disclosure.

FIG. 8 shows an example environment for enabling the enhanced management of related conferences, in accordance with some embodiments of the disclosure. The environment 800 comprises a first computing device, in this example, laptop 802, a network 804, a first group 806 of computing devices and a second group 810 of computing devices. The laptop 802, the first group 806 of computing devices and the second group 810 of computing devices communicate via network 804. In this example, a computing device is in communication with two groups of two computing devices each; however, any number of computing devices may participate in the conference including, for example, three, five, 10, 25, 50, 125 and/or 200. In addition, each of the groups may comprise any number of computing devices. The network 804 may be any suitable network, including the internet, and may comprise wired and wireless means. At 808, a first conference is initiated between the laptop 802 and the first group 806 of computing devices, and at 812, input is provided to join a second conference between the laptop 802, the first group 806 of computing devices and the second group 810 of computing devices. This input may comprise selecting a link in an invitation to the first and/or second conference. The first conference may be a huddle, side conference or breakout room, between the laptop 802 and the first group 806 of computing devices. The first conference and the second conference are associated with one another. In some examples, this may mean that a meeting identification (ID) of the first conference is a child of the second conference. In some examples, a first invitation may be sent to the laptop 802 and the computing devices of the first group 806. This first invitation may comprise links to join the first conference and the second conference. In other examples, a second invitation may be sent to the computing devices of the second group 810. This second invitation may comprise only a link to join the second conference.

Figure 9:
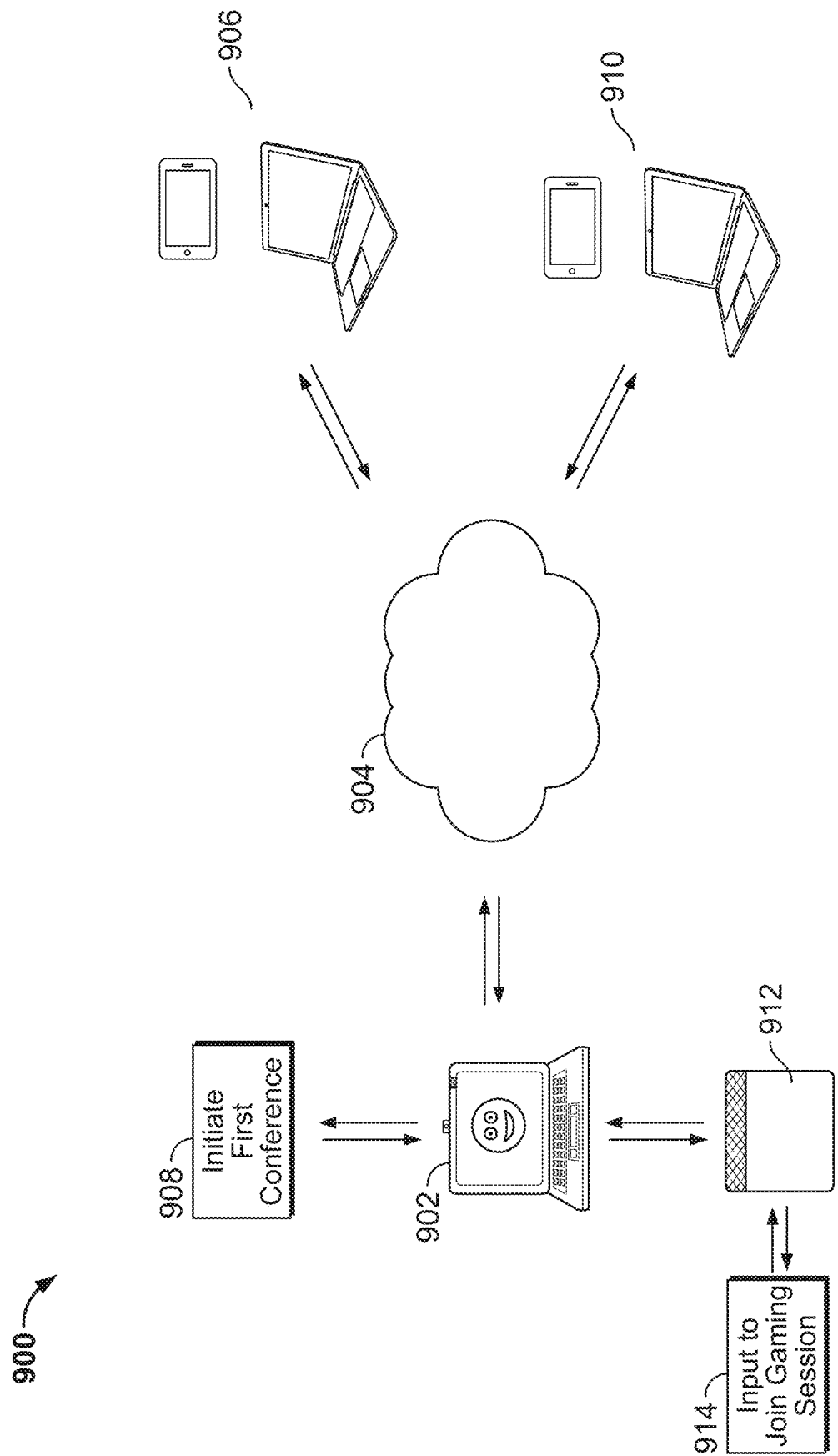
FIG. 9 shows another example environment for enabling the enhanced management of related conferences, in accordance with some embodiments of the disclosure.

FIG. 9 shows another example environment for enabling the enhanced management of related conferences, in accordance with some embodiments of the disclosure. In a similar manner to the environment shown in FIG. 8, the environment 900 comprises a first computing device, in this example, laptop 902; a network 904; a first group 906 of computing devices; a second group 910 of computing devices; and a smart speaker 912. The laptop 902, the first group 906 of computing devices and the second group 910 of computing devices communicate via network 904. In this example, a computing device is in communication with two groups of two computing devices each; however, any number of computing devices may participate in the conference including, for example, three, five, 10, 25, 50, 125 and/or 200. In addition, each of the groups may comprise any number of computing devices. The network 904 may be any suitable network, including the internet, and may comprise wired and wireless means. At 908, a first conference is initiated between the laptop 902 and the first group of computing devices 906. A virtual assistant, in this example implemented via smart speaker 912, receives input at 914 to join a second conference in the form of a gaming session. The gaming session is formed between the laptop 902, the first group 906 of computing devices and the second group 910 of computing devices. In this manner, a huddle, side conference or breakout room, is formed between a group of participants in the gaming session, so that they can, for example, chat without being overheard by all the participants in the gaming session. This may be of particular use, for example, in team games where team members wish to be able to discuss tactics between themselves.

In some examples, a huddle, a side conversation, or side group can include participants that have not yet joined a main meeting, or conference. Participants that are part of the huddle are also part of the main conference. For example, in enterprise video conference solutions, two or more people may form a huddle during a main video conference when they need to consult on something while not leaving the main video conference call altogether. The huddle, or side conversation session, may have its own host and participants. Participants in the huddle may be pre-invited to the huddle. In some examples, the participants may have the option to join the huddle manually or to auto-join the huddle (based on their selected preferences) when they join the main video conference. In some examples, a meeting invite may include an invite to the main video conference and an invite to a huddle session associated with the main meeting. Invitees can accept the invite to the main meeting and/or to the huddle. A huddle is in effect a sub-conference and has it is own session identification that is directly associated (e.g., a child of) the main video conference identification. This enables users to switch back and forth between the two conference sessions. This functionality may be managed by a service that is responsible for switching (e.g., the audio feed from the invitees) from one session to another. The figures below illustrate how such functionality can be implemented in an existing video conferencing infrastructure. In some examples, a huddle, or side-conversation, can occur before a main video conference, and the initial huddle may remain effective for the small group after it joins the main conference.

Figure 10:
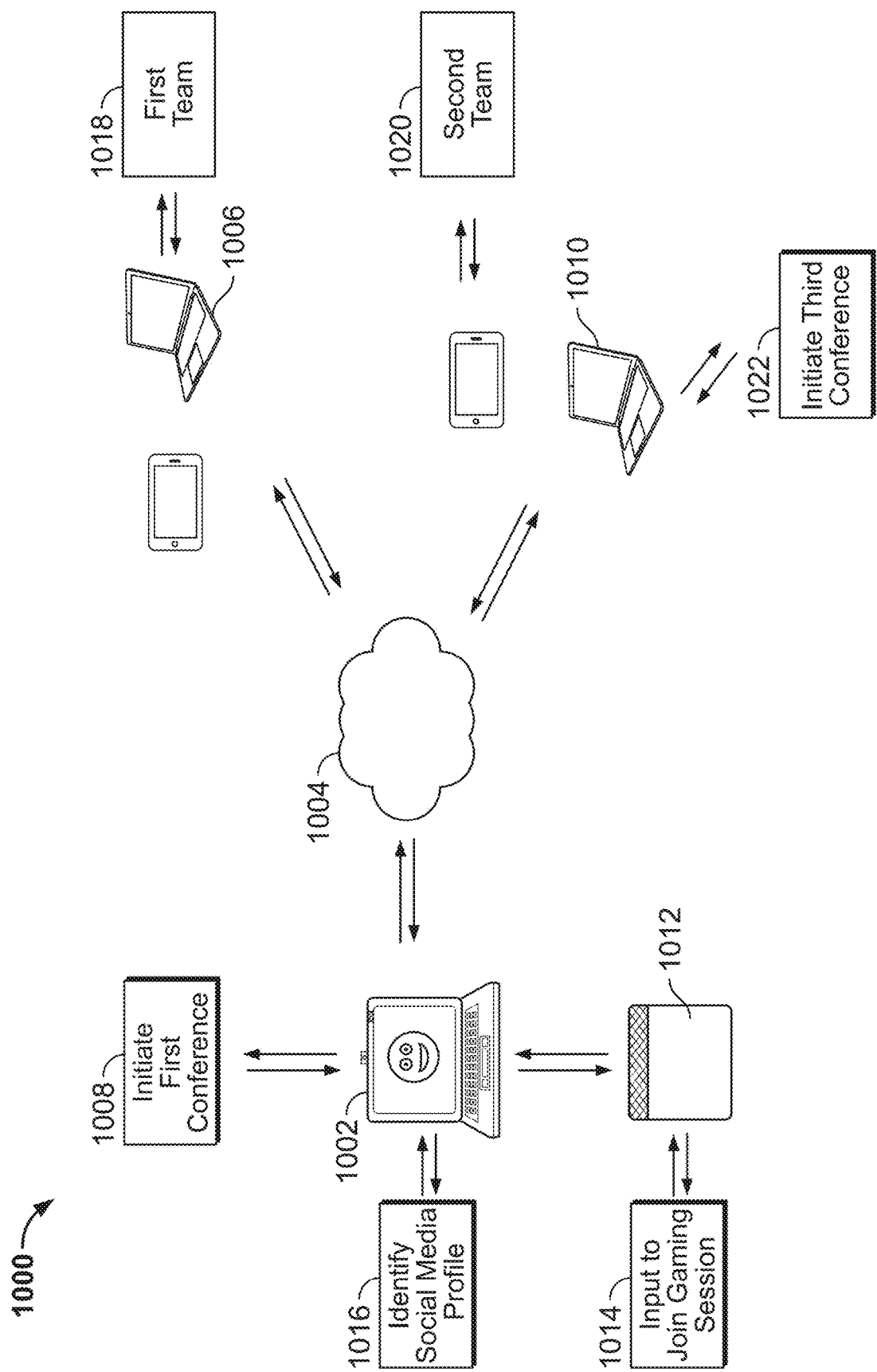
FIG. 10 shows another example environment for enabling the enhanced management of related conferences, in accordance with some embodiments of the disclosure.

FIG. 10 shows another example environment for enabling the enhanced management of related conferences, in accordance with some embodiments of the disclosure. In a similar manner to the environment shown in FIGS. 8 and 9, the environment 1000 comprises a first computing device, in this example, laptop 1002, a network 1004, a first group 1006 of computing devices, a second group 1010 of computing devices and a smart speaker 1012. The laptop 1002, the first group 1006 of computing devices and the second group 1010 of computing devices communicate via network 1004. In this example, a computing device is in communication with two groups of two computing devices each; however, any number of computing devices may participate in the conference including, for example, three, five, 10, 25, 50, 125 and/or 200. In addition, each of the groups may comprise any number of computing devices. The network 1004 may be any suitable network, including the internet, and may comprise wired and wireless means. At 1008, a first conference is initiated between the laptop 1002 and the first group 1006 of computing devices. A virtual assistant, in this example implemented via smart speaker 1012, receives input at 1014 to join a second conference in the form of a gaming session. At 1016, a social media profile is identified. In this example, the social media profile is identified via laptop 1002, but in other examples it may be identified via smart speaker 1012. The social media profile may be used to form the gaming session between the laptop 1002, the first group 1006 of computing devices and the second group 1010 of computing devices. For example, the social media profile may indicate friends, or contacts, who play and/or are playing the game. In this example, those friends, or contacts, may be imported into the game, and invites may be sent out to those contacts to join a gaming session. In other examples, invites may be sent via gaming distribution platform, such as via a Steam, Epic Games, Good Old Games, Battle.net and/or Activision platform. In this manner, a huddle, side conference or breakout room, is formed between a group of participants in the gaming session, so that they can, for example, chat without being overheard by all the participants in the gaming session. This may be of particular use, for example, in team games where team members wish to be able to discuss tactics between themselves. In this example, the first group 1006 of computing devices (including the first laptop 1002) is associated with a first team 1018, and the second group 1010 of computing devices is associated with a second team 2020. In some examples, the second group 1010 of computing devices may initiate a third conference 1022 that has an ID associated with the first conference and, optionally, the gaming session.

A user may start gaming with the help of their virtual assistant. The user and virtual assistant may both join a game later with many others while their connection remains effective and requires no need to re-configure or re-initiate. In one example, a user can initiate side conversations in a multiplayer online gaming session. The user can select a group of users and initiate a side conversation. The users may be able to adjust the audio from the main voice conversation and adjust the audio volume of the multiplayer group side chat independently. A side conversation may be with everyone on a first team, so another team cannot hear the conversation for the team. Side conversations may be made with the players that are friends within the multiplayer session. In other examples, Facebook friends can be imported into a game profile. If any of those Facebook friends are in the multiplayer gaming session, a side conversation can be set up for those friends. Side conversations can be enabled during gameplay and/or before gameplay starts. Additionally, there may be side conversations within side conversations. As an example, a side conversation may be set up for all members on a team. Within that side conversation, a new side conversation can be initiated with a subset of the players on the team.

Figure 11:
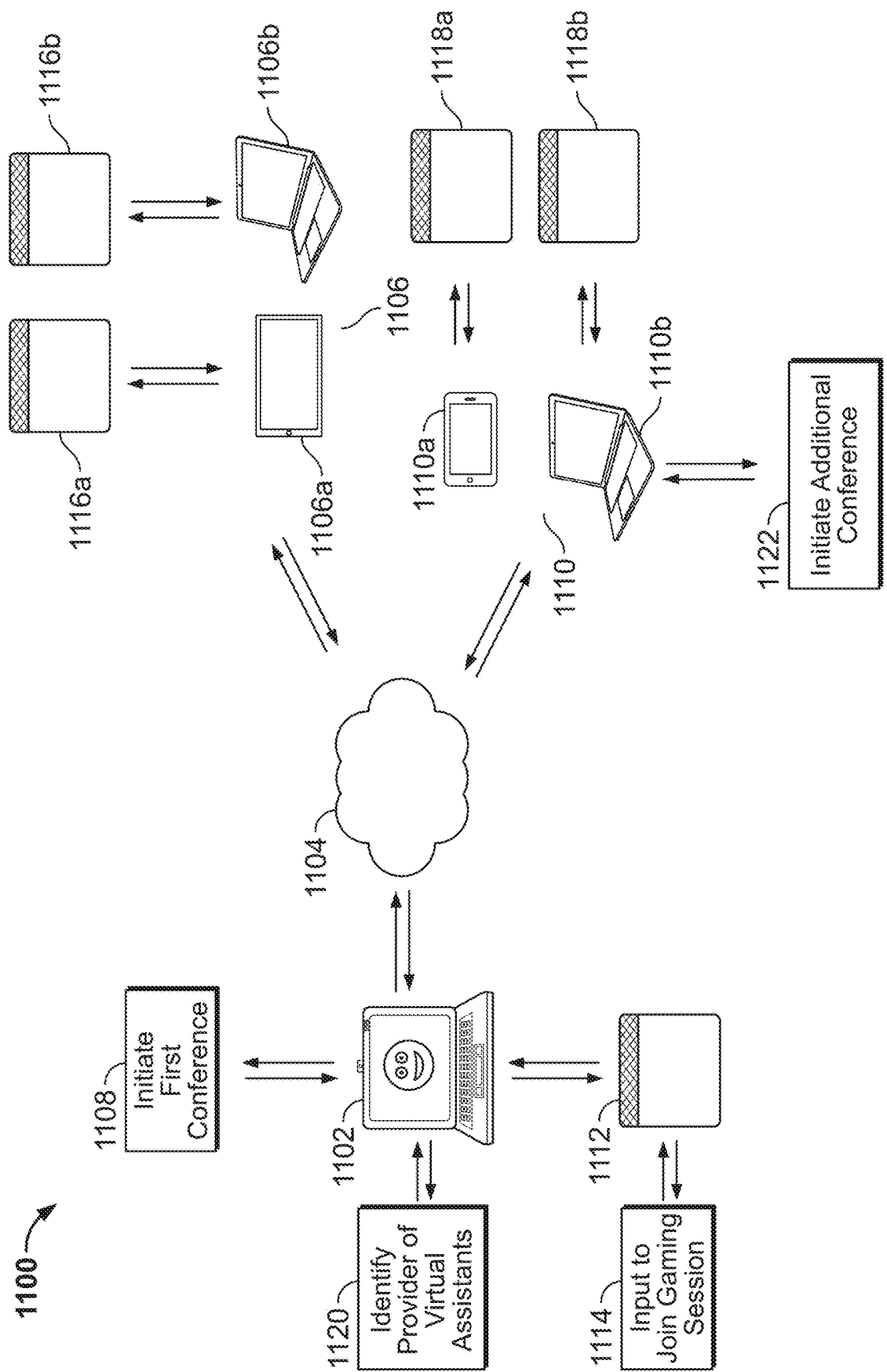
FIG. 11 shows another example environment for enabling the enhanced management of related conferences, in accordance with some embodiments of the disclosure.

FIG. 11 shows another example environment for enabling the enhanced management of related conferences, in accordance with some embodiments of the disclosure. In a similar manner to the environment shown in FIGS. 8-10, the environment 1100 comprises a first computing device, in this example, laptop 1102; a network 1104; a first group 1106 of computing devices; a second group 1110 of computing devices; and a smart speaker 1112. The laptop 1102, the first group 1106 of computing devices and the second group 1110 of computing devices communicate via network 1104. In this example, a computing device is in communication with two groups of two computing devices each; however, any number of computing devices may participate in the conference including, for example, three, five, 10, 25, 50, 125 and/or 200. In addition, each of the groups may comprise any number of computing devices. The network 1104 may be any suitable network, including the internet, and may comprise wired and wireless means. At 1108, a first conference is initiated between the laptop 1102 and the first group 1106 of computing devices. A virtual assistant, in this example implemented via smart speaker 1112, receives input at 1114 to join a second conference in the form of a gaming session. The gaming session is formed between the laptop 1102, the first group 1106 of computing devices and the second group 1110 of computing devices. At least a subset of the computing devices 1106a, 1106b associated with the first group 1106 of computing devices invite a virtual assistant to the gaming session. In this example, both computing devices 1106a, 1106b of the first group invite a virtual assistant in the form of smart speakers 1116a, 1116b, though in other examples the virtual assistant may be a software-based virtual assistant. In a similar manner, at least a subset of the computing devices 1110a, 1110b associated with the second group 1110 of computing devices invite a virtual assistant to the gaming session. In this example, both computing devices 1110a, 1110b of the first group invite a virtual assistant in the form of smart speakers 1118a, 1118b, though in other examples the virtual assistant may be a software-based virtual assistant. At 1120, providers of the virtual assistants are identified, and only one virtual assistant from a provider is invited to the respective first and second conferences. For example, if virtual assistants 1116a, 1116b are both Amazon Alexa virtual assistants, then only one of the virtual assistants 1116a, 1116b is invited to the first conference. This may entail prompting a user at one of the computing devices 1102, 1106a, 1106b to select a virtual assistant to join the conference. In other examples, the virtual assistant may be selected based on a criterion set via a conference setting. In a similar manner, if virtual assistants 1110a, 1110b are both Google Nest mini virtual assistants, then only one of the virtual assistants 1118a, 1118b is invited to the second conference. As the first conference is associated with the second conference, a single provider may be enforced across both the first and second conferences. This prevents, for example, a wake word uttered by a user in one of the conferences from activating multiple virtual assistants. In some examples, one or more computing devices 1110a, 1110b of the second group 1110 may initiate 1122 one or more additional conferences associated with the first and/or second conference.

In some examples, a user can invite virtual assistants to a multiplayer gaming session. There may be multiple virtual assistants added to the same gaming session; however, only one of the same virtual assistant providers may be allowed. A user may also be able to invite virtual assistants to the side conversations. As in the main multiplayer gaming audio session, multiple virtual assistants may be invited to a side group conversation; however, only one virtual assistant per provider may be able to be invited to the side group conversation. An audio mixer on the gaming computing device may allow users to adjust the volume for each virtual assistant.

Figure 12:
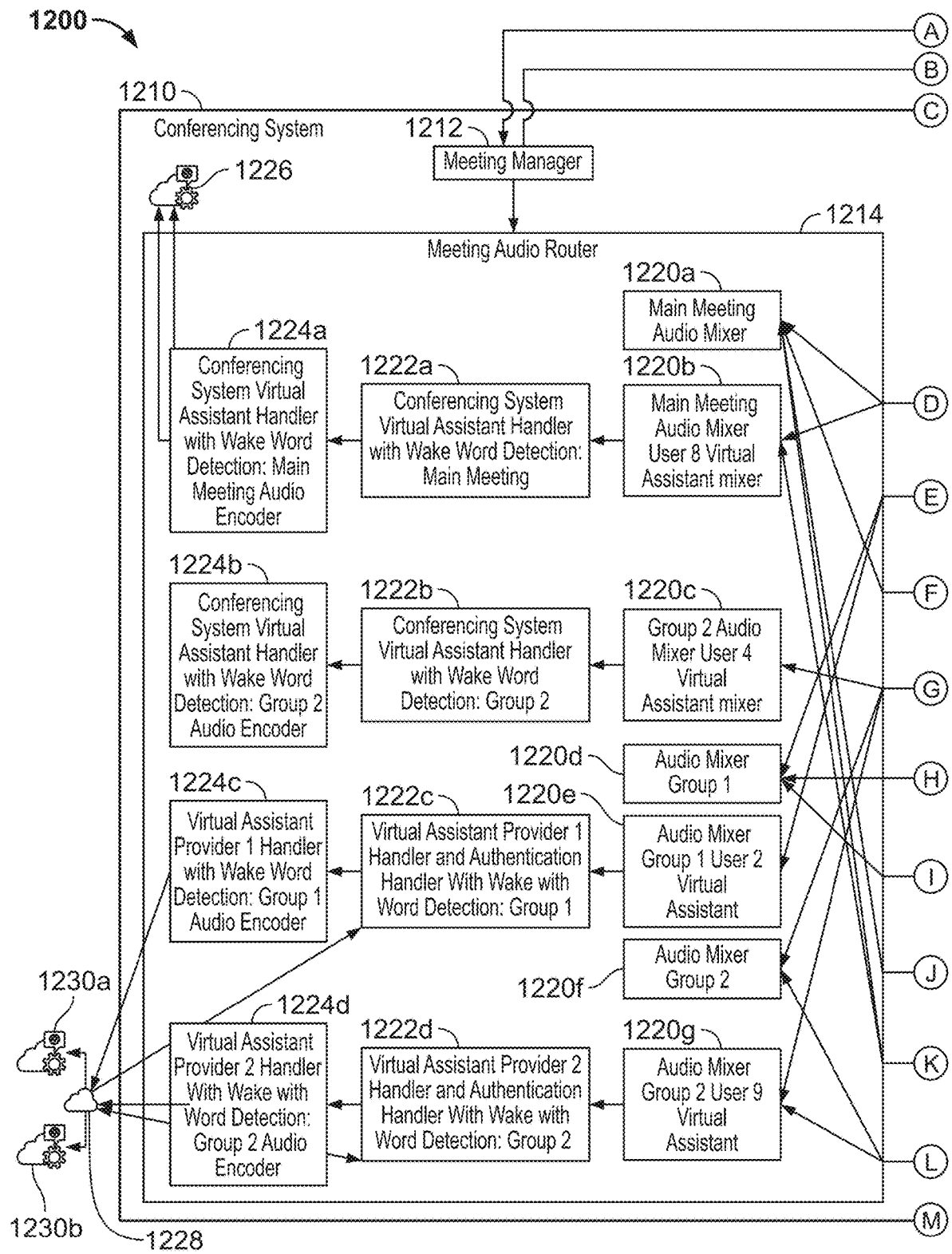
FIG. 12 shows a schematic diagram of audio routing for enabling the enhanced management of related conferences, in accordance with some embodiments of the disclosure.
Figure 12:
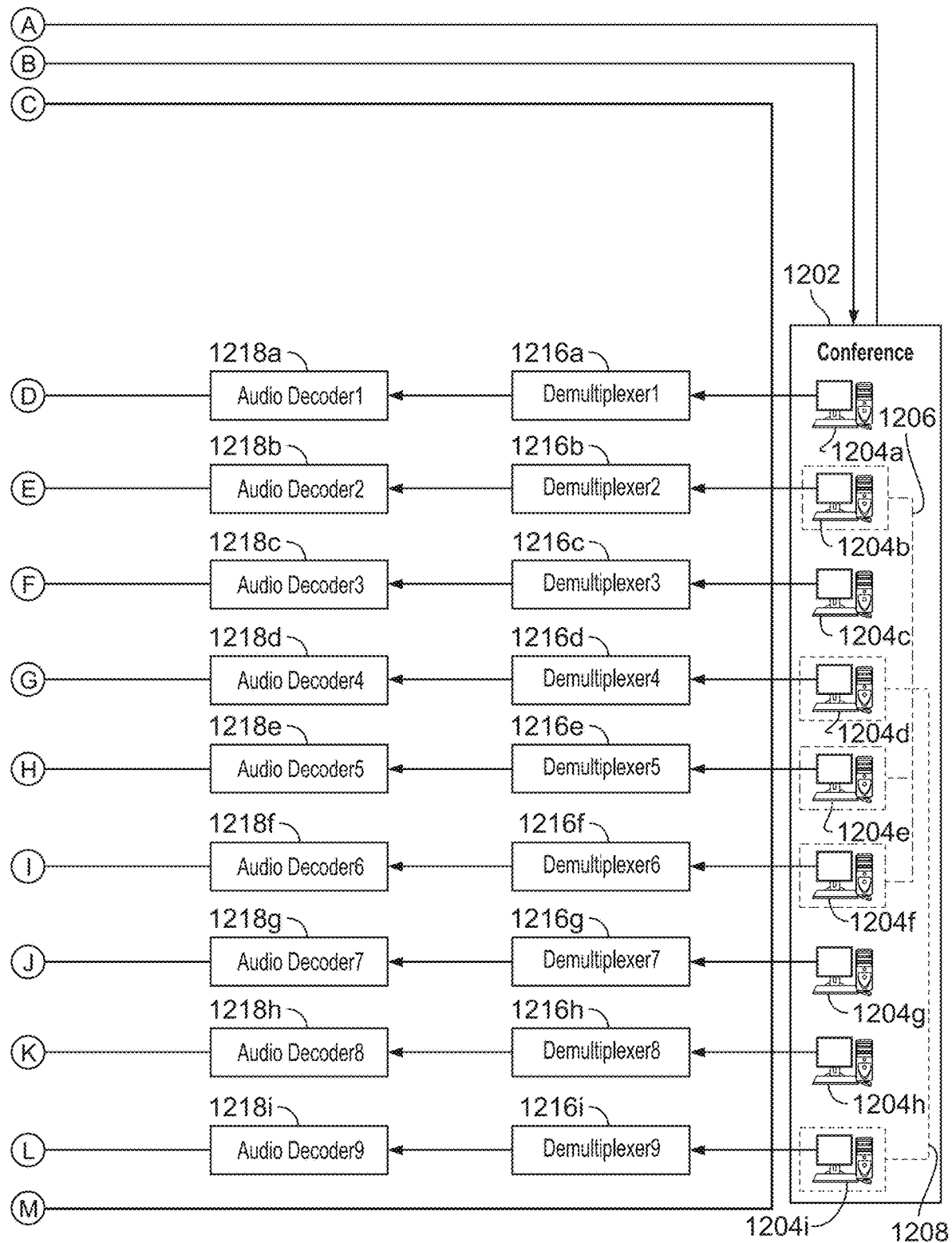

FIG. 12 shows a schematic diagram of audio routing for enabling the enhanced management of related conferences, in accordance with some embodiments of the disclosure. The environment 1200 enables incoming audio to be routed to the entire meeting, subgroups, and virtual assistants. The system of the environment 1200 enables users to invite voice assistance services from different virtual assistant providers. The audio input routing enables a user hosting a voice assistance service to select which users are allowed to provide input queries to the virtual assistant. Multiple virtual assistants may be invited to the main meeting or a group conversation. In some examples, there is a limit of one instance for a voice provider in a meeting or a group. In the system described in connection with environment 1200, there is a meeting with nine users, each having a corresponding computing device 1204a-1204i. Users one, three, seven and eight are not in a group conversation. Users two, five and six are in a first group conversation, but are still attending the main meeting. Users four and nine are in a second group conversation, but are also still attending the main meeting. In the main meeting conference, User eight invited a conferencing system virtual assistant to the main meeting. In the first side group conversation, User two invited a first virtual assistant to the conversation, and User six is enabled to submit voice queries via the first virtual assistant. In the second group conversation, User nine invited a second virtual assistant to the second group conversation. Both Users four and nine are allowed to submit voice queries to the second virtual assistant. There is a meeting manager that manages group conversations in the meeting. If a user wants to start a side group conversation, a side group request is made to the Meeting Manager with user identifiers (i.e., identifiers identifying the users invited to the side group) associated with the group request. The Meeting Manager sends group invite join requests to all the users that are invited to the group. Each user invited to the group may have an option to accept or decline the group invite request. Each user that accepts the request will be placed in the group conversation. The Meeting Manager also manages virtual assistant invites. When a user invites a virtual assistant service, a virtual assistant invite is sent to users that are allowed to make voice queries to the shared assistant. A virtual assistant invite is also sent to the meeting manager along with an identifier for the side group, user identifiers that have been invited to the side group, and a list of user identifiers with policies per user for performing voice queries via the virtual assistant. The meeting manager sends a new and updated routing virtual assistant request with incoming user stream identifiers, policies and group identifiers to the meeting audio router. Virtual assistant authentication, private mode support, device identification support and a generic virtual assistant provider may also be added.

In the example of a multiplayer game server, multiplayer game data is sent to the multiplayer game server. The multiplayer game server may also comprise an audio routing system as discussed in connection with environment 1200 that includes separate audio mixers for the main gaming session and the side group conversation, or conversations. The input to the gaming device may contain multiplayer game data and a multiplexed audio stream containing the main multiplayer session audio. The incoming multiplexed audiovisual streams may be demultiplexed, with the demultiplexed audio stream sent to an audio decoder and the demultiplexed video stream sent to a video decoder. The decoded audio streams may be routed to an audio mixer. The main meeting may have its own mixer. Each subgroup may have its own mixer. If there are virtual assistants added to the meeting or side groups, there may be an audio mixer within each group for each virtual assistant added. This may also be true for any conferencing system virtual assistants. The output from each virtual assistant mixer may be sent to a virtual assistant handler for the virtual assistant service. The virtual assistant handler may listen for the wake word as defined for the virtual assistant provider. If a wake word is detected by the virtual assistant handler, the audio may be routed to the virtual assistant service.

The environment 1200 comprises a conference 1202, a conferencing system 1210 and first and second virtual assistants 1230a, 1230b. The conference 1202 is between the first to ninth computing devices 1204a-1204i. The conferencing system comprises a meeting manager 1212, a meeting audio router 1214 and a voice conferencing system virtual assistant 1226.

In this example, eighth computing device 1204h invites the voice conferencing system virtual assistant 1226 to the conference, and the first and eighth computing devices 1204a, 1204h are enabled for submitting voice queries via the voice conferencing system virtual assistant 1126. A first side group 1206 is set up between the second computing device 1204b, the fifth computing device 1204e, the sixth computing device 1204f and the first virtual assistant 1230a. The first virtual assistant 1230a is in guest mode, and the sixth computing device 1204f is enabled for submitting voice queries. A second side group 1208 is set up between fourth computing device 1204d, ninth computing device 1204i and the second virtual assistant 1230b. The user of the ninth computing device 1204i is authenticated with the second virtual assistant 1230b; however, each of the fourth computing device 1204d and the ninth computing device 1204i can use both the first and second virtual assistants 1230a, 1230b.

The first to ninth computing devices 1204a-1204i of the conference 1202 transmit various data to the meeting manager 1212. In this example, a computing device joins a meeting with a user ID and a device ID by transmitting them to the meeting manager 1212. A side meeting, or group, request is transmitted to the meeting manager 1212, with user ID identifiers of the computing devices to be included in the side meeting. Virtual assistant invite, update and/or terminate requests with a virtual assistant provider, are transmitted to the meeting manager 1212 along with a user ID, virtual assistant user authentication, policies and/or a group ID. Group invite join requests are transmitted from the meeting manager 1212 along with a group ID to the relevant computing devices, and the computing devices respond to the meeting manager 1212 with associated responses. Requests to enable and/or disable a main meeting speak request are transmitted to the meeting manager 1212 along with a user ID and a group ID. A request to end a side group is transmitted to the meeting manager 1212, along with a group ID.

The meeting manager 1212 transmits various data to the meeting audio router 1214. In this example, in response to a virtual assistant request, new (or updated) routing is established with incoming user stream IDs, virtual assistant user authentication, policies and/or group IDs. Incoming user stream IDs are used to establish a new (or updated) routing request. A main meeting speaker request is enabled and/or disabled via user IDs and/or group IDs. A side group request is ended via a group ID.

Where the streams are audiovisual streams, the first to ninth computing devices 1204a-1204i of the conference 1202 transmit the audiovisual streams to a plurality of corresponding demultiplexers 1216a-1216i in the conferencing system 1210, which demultiplex the audiovisual streams into separate encoded video and audio streams. From the demultiplexers 1216a-1216i, each of the demultiplexed audio streams is transmitted to a corresponding audio decoder 1218a-1218i, where the audio is decoded. The decoded audio is transmitted to the meeting audio router 1214.

In this example, audio from the first, third, seventh and eighth computing devices 1204a, 1204c, 1204g, 1204h is transmitted to a first audio mixer 1220a, where audio for the main meeting audio is mixed. Continuing this example, audio from the first and eighth computing devices 1204a, 1204h is transmitted a second audio mixer 1220b, where audio for the main meeting and video conference virtual assistant 1226 is mixed. Audio from the fourth computing device 1204d is transmitted to a third audio mixer 1220c, where audio for the second side group 1208 and the conference virtual assistant 1226 is mixed. Audio from the second, fifth, and sixth computing devices 1204b, 1204e, 1204f is transmitted to a fourth audio mixer 1220d, where audio for the first side group 1206 is mixed. Audio from the second computing device 1204b is transmitted to a fifth audio mixer 1220e, where audio for the first group 1206 and first virtual assistant 1230a is mixed. Audio from the fourth and ninth computing devices 1204d, 1204i is transmitted to a sixth audio mixer 1220f, where audio for the second side group 1208 is mixed. Audio from the fourth and ninth computing devices 1204d, 1204i is transmitted to a seventh audio mixer 1220g, where audio for the second side group 1208 and second virtual assistant is mixed.

Mixed audio is transmitted from the second audio mixer 1220b to the conferencing system virtual assistant 1226, via modules 1222a, 1224a. Module 1222a comprises a handler that transmits audio in response to the detection of a wake word associated with the conference virtual assistant 1226 that has been uttered in the main meeting. Module 1224a receives the audio from module 1222a and comprises a handler than encodes the audio for the conferencing system virtual assistant 1226 and transmits the encoded audio to the conferencing system virtual assistant 1226. Mixed audio is transmitted from the third audio mixer 1220c to the conferencing system virtual assistant 1226, via modules 1222b, 1224b. Module 1222b comprises a handler that transmits audio in response to the detection of a wake word associated with the conference virtual assistant 1226 that has been uttered in the second side group 1208. Module 1224b receives the audio from module 1222b and comprises a handler than encodes the audio for the conferencing system virtual assistant 1226 and transmits the encoded audio to the conferencing system virtual assistant 1226. Conferencing system virtual assistant 1226 may be connected to other computing devices via a network, such as network 1228. Network 1228 may comprise the internet and may comprise wired and/or wireless means.

Mixed audio is transmitted from the fifth audio mixer 1220e to the first virtual assistant 1230a, via modules 1222c, 1224c. Module 1222c comprises a handler that transmits audio in response to the detection of a wake word associated with the first virtual assistant 1230a that has been uttered in the first side group 1206. In addition, the handler deals with user authentication for the virtual assistant, and, in this example, the user has been authenticated as a guest. Authentication may take place via network 1228. Module 1224c receives the audio from module 1222c and comprises a handler than encodes the audio for the first virtual assistant 1230a and transmits the encoded audio to the first virtual assistant 1230a, optionally via network 1228. Mixed audio is transmitted from the seventh audio mixer 1220g to the second virtual assistant 1230b, via modules 1222d, 1224d. Module 1222d comprises a handler that transmits audio in response to the detection of a wake word associated with the second virtual assistant 1230b that has been uttered in the second side group 1208. In addition, the handler deals with user authentication for the virtual assistant, and, in this example, the user has been authenticated as a user of the virtual assistant. Authentication may take place via network 1228. Module 1224d receives the audio from module 1222d and comprises a handler than encodes the audio for the second virtual assistant 1230b and transmits the encoded audio to the first virtual assistant 1230b, optionally via network 1228.

Figure 13:
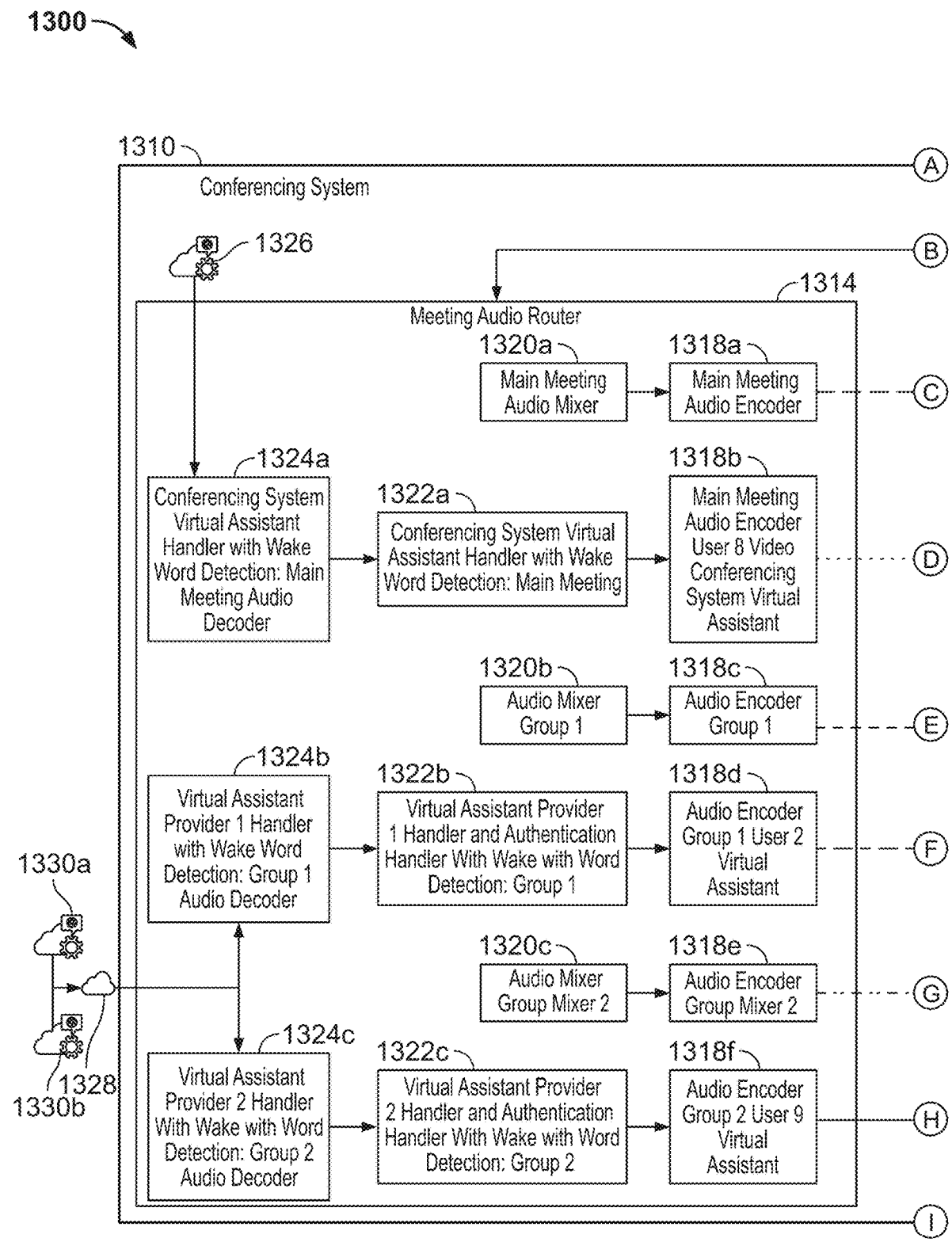
FIG. 13 shows a schematic diagram of audio routing for enabling the enhanced management of related conferences, in accordance with some embodiments of the disclosure.
Figure 13:
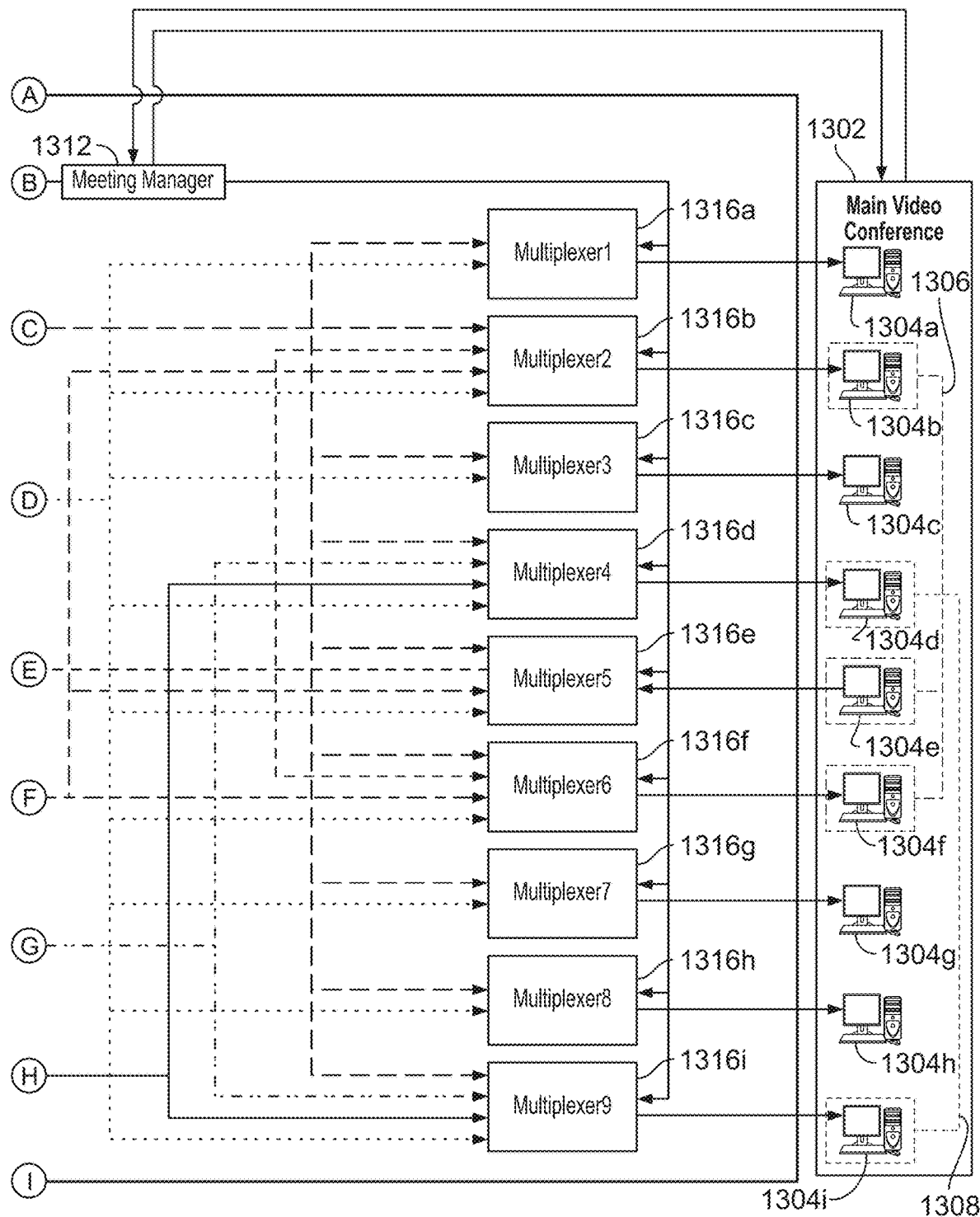

FIG. 13 shows a schematic diagram of audio routing for enabling the enhanced management of related conferences, in accordance with some embodiments of the disclosure. The environment 1300 enables incoming audio to be routed to the entire meeting, subgroups, and virtual assistants. The output audio mixers for the meeting, or subgroups, may be sent to their own encoders. The audio from the virtual assistant handlers may be sent to their own encoders. A multiplexer may be created for each user in the meeting. The output of each encoder may be routed to the multiplexer for the user. There may be a multi-program multiplexed stream created from the multiplexer including the video stream, if a video stream is present, and the audio stream(s) based on a policy enforced by the meeting manager and, optionally, set by users in the main meeting, side groups, and users sharing virtual assistant providers. Virtual assistant authentication, private mode support, device identification support, and a generic virtual assistant provider may also be added.

The environment 1300 comprises a conference 1302, a conferencing system 1310 and first and second virtual assistants 1330a, 1330b. The conference 1302 is between first to ninth computing devices 1304a-1304i. The conferencing system comprises a meeting manager 1312, a meeting audio router 1314 and a voice conferencing system virtual assistant 1326. The conferencing system virtual assistant 1326 and/or the first and/or second virtual assistants 1330a, 1330b may be connected to other computing devices via a network, such as network 1328. Network 1328 may comprise the internet and may comprise wired and/or wireless means.

In this example, the eighth computing device 1304h invites the voice conferencing system virtual assistant 1326 to the conference, and the first and eighth computing devices 1304a, 1304h are enabled for submitting voice queries via the voice conferencing system virtual assistant 1126. A first side group 1306 is set up between the second computing device 1304b, the fifth computing device 1304e, the sixth computing device 1304f and the first virtual assistant 1330a. The first virtual assistant 1330a is in guest mode, and the sixth computing device 1304f is enabled for submitting voice queries. A second side group 1308 is set up between fourth computing device 1304d, ninth computing device 1304i and the second virtual assistant 1330b. The user of the ninth computing device 1304i is authenticated with the second virtual assistant 1330b; however, each of the fourth computing device 1304d and the ninth computing device 1304i can use both the first and second virtual assistants 1330a, 1330b.

The first to ninth computing devices 1304a-1304i of the conference 1302 transmit various data to the meeting manager 1312. In this example, a computing device joins a meeting with a user ID and a device ID by transmitting them to the meeting manager 1312. A side meeting, or group, request is transmitted to the meeting manager 1312, with user ID identifiers of the computing devices to be included in the side meeting. Virtual assistant invite, update and/or terminate requests with a virtual assistant provider are transmitted to the meeting manager 1312 along with a user ID, virtual assistant user authentication, policies and/or a group ID. Group invite join requests are transmitted from the meeting manager 1312 along with a group ID to the relevant computing devices, and the computing devices respond to the meeting manager 1312 with associated responses. Requests to enable and/or disable a main meeting speak request are transmitted to the meeting manager 1312 along with a user ID and a group ID. A request to end a side group is transmitted to the meeting manager 1312, along with a group ID.

The meeting manager 1312 transmits various data to the meeting audio router 1314. In this example, in response to a virtual assistant request, new (or updated) routing is established with incoming user stream IDs, virtual assistant user authentication, policies and/or group IDs. Incoming user stream IDs are used to establish a new (or updated) routing request. A main meeting speaker request is enabled and/or disabled via user IDs and/or group IDs. A side group request is ended with a group ID.

In this example, audio for the first to ninth computing devices 1304a-1304i is transmitted from a first audio mixer 1320a, where audio for the main meeting is mixed; the conferencing system virtual assistant 1326; a second audio mixer 1320b, where audio for the first side group 1306 is mixed; the first and second virtual assistants 1330a, 1330b; and a third audio mixer 1320c, where audio for the second side group 1308 is mixed.

Mixed audio from the first, second and third audio mixers 1320a, 1320b, 1320c is transmitted to respective first, third and fifth audio encoders 1318a, 1318c, 1318e, where the mixed audio is encoded.

Audio from the conferencing system virtual assistant 1326 is transmitted to a second audio encoder 1318, via modules 1324a, 1322a, where the audio is encoded. Module 1324a receives the audio from the conferencing system virtual assistant 1326 and comprises a handler that decodes the audio from the conferencing system virtual assistant 1326 and transmits the decoded audio to module 1322a. Module 1322a comprises a handler that transmits audio in response to the detection of a wake word associated with the conference virtual assistant 1326 that has been uttered in the main meeting.

Audio from the first virtual assistant 1330a is transmitted to a fourth encoder 1318d, via modules 1324b, 1322b, where the audio is encoded. Module 1324b receives the audio from the first virtual assistant 1330a and comprises a handler that decodes the audio from the first virtual assistant 1330a and transmits the decoded audio to module 1322b. Module 1322b comprises a handler that transmits audio in response to the detection of a wake word associated with the first virtual assistant 1330a that has been uttered in the first side group 1306.

Audio from the second virtual assistant 1330b is transmitted to a sixth encoder 1318f, via modules 1324c, 1322c, where the audio is encoded. Module 1324c receives the audio from the second virtual assistant 1330b and comprises a handler that decodes the audio from the second virtual assistant 1330b and transmits the decoded audio to module 1322c. Module 1322c comprises a handler that transmits audio in response to the detection of a wake word associated with the second virtual assistant 1330b that has been uttered in the second side group 1308.

Audio is transmitted from the encoders to the multiplexers 1316a-1316i, as discussed below, and video streams are received at the multiplexers 1316a-1316i, where the audio and video are multiplexed to create one or more audiovisual streams that are transmitted to the first to ninth computing devices 1304a-1304i. Audio is transmitted from the first audio encoder 1318a to the first to ninth multiplexers 1316a-1316i, where the multiplexed stream is transmitted to respective first to ninth computing devices 1304a-1304i. Audio is transmitted from the second audio encoder 1318b to the first to ninth multiplexers 1316a-1316i, where the multiplexed stream is transmitted to respective first to ninth computing devices 1304a-1304i. Audio is transmitted from the third audio encoder 1318c to the second, fifth and sixth multiplexers 1316b, 1316e, 1316f, where the multiplexed stream is transmitted to the respective second, fifth and sixth computing devices 1304b, 1304e, 1304f. Audio is transmitted from the fourth audio encoder 1318d to the second, fifth and sixth multiplexers 1316b, 1316e, 1316f, where the multiplexed stream is transmitted to the respective second, fifth and sixth computing devices 1304b, 1304e, 1304f. Audio is transmitted from the fifth audio encoder 1318e to the fourth and ninth multiplexers 1316d, 1316i, where the multiplexed stream is transmitted to the respective fourth and ninth computing devices 1304d, 1304i. Audio is transmitted from the sixth audio encoder 1318f to the fourth and ninth multiplexers 1316d, 1316i, where the multiplexed stream is transmitted to the respective fourth and ninth computing devices 1304d, 1304i. In addition, the first to ninth multiplexers 1316a-1316i optionally receive video and multiplex the video with the audio. Each of the multiplexed (or audiovisual) streams are transmitted from the multiplexers 1316a-1316i to the corresponding first to ninth computing devices 1304a-1304i. The meeting manager 1312 transmits a multiplexing policy to each of the first to ninth multiplexers 1316a-1316i.

Figure 14:
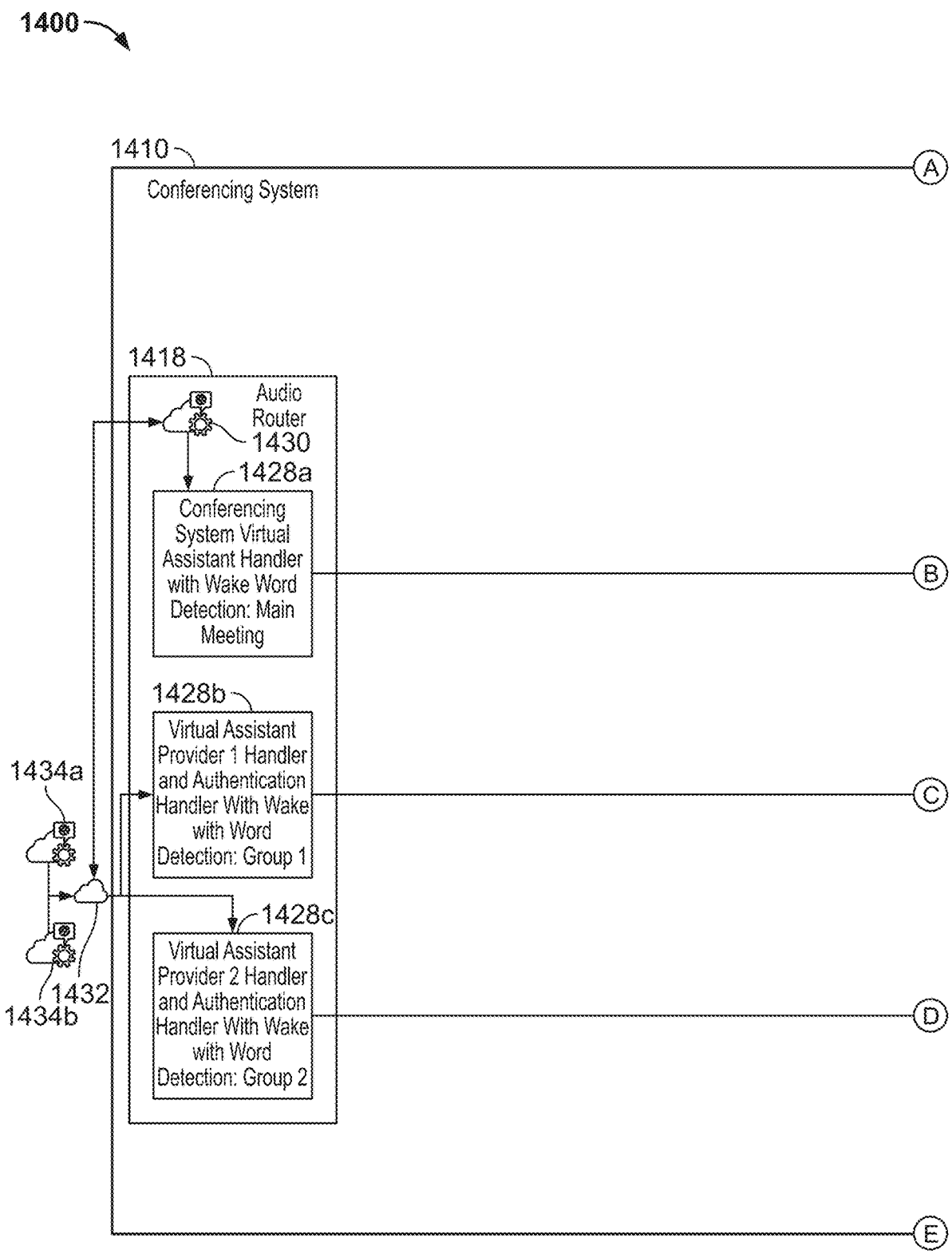
FIG. 14 shows a schematic diagram of video routing for enabling the enhanced management of related conferences, in accordance with some embodiments of the disclosure.
Figure 14:
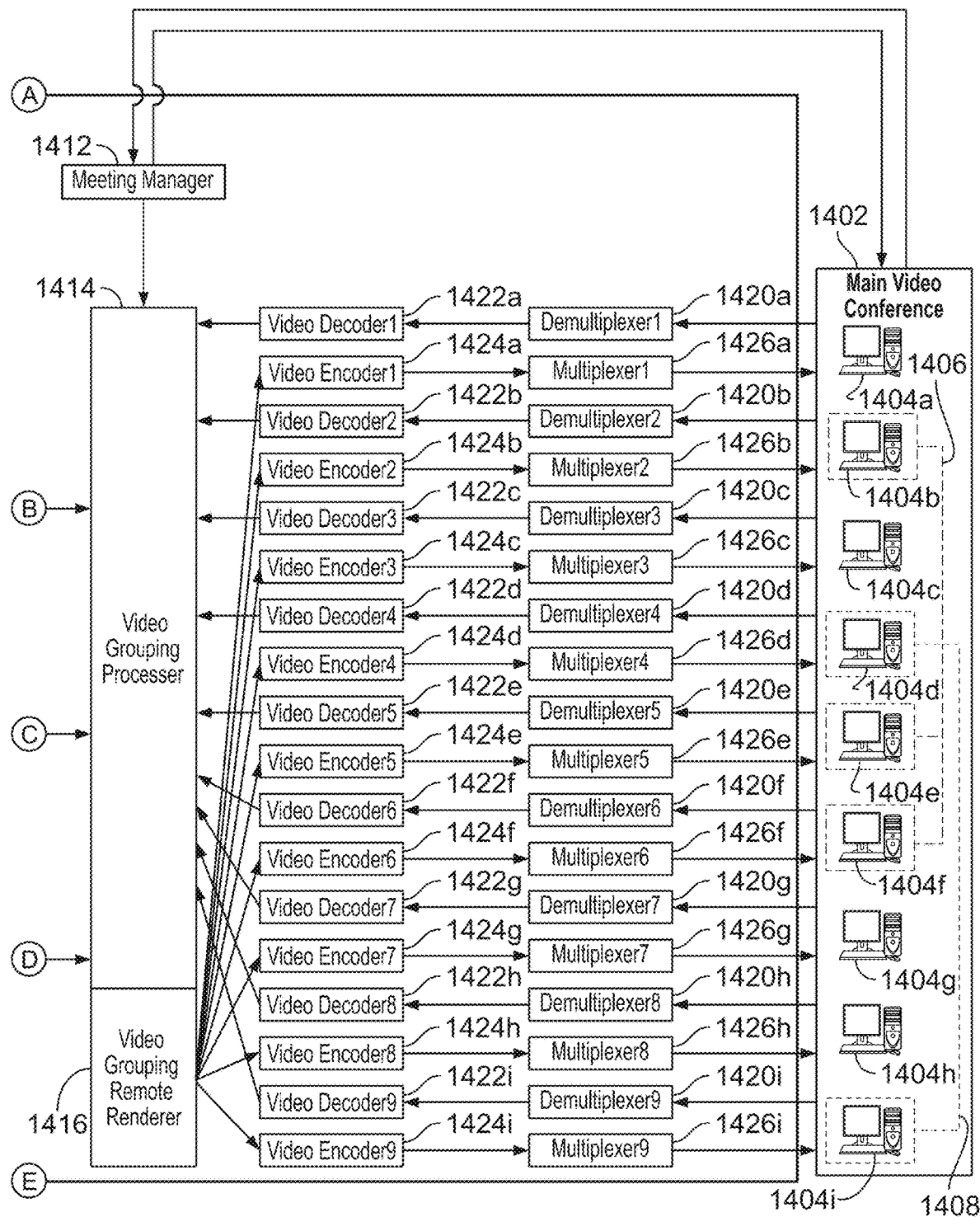

FIG. 14 shows a schematic diagram of video routing for enabling the enhanced management of related conferences, in accordance with some embodiments of the disclosure. The environment 1400 enables incoming and outgoing video to be routed to the entire meeting and subgroups. The system of environment 1400 enables a decoded video stream to be received from each conference participant, the video to be remotely rendered, the rendered video to be encoded, and enables the encoded video to be multiplexed with the audio stream(s) to be sent to the computing device associated with each user. A video grouping processor receives new and updated routing requests with incoming user stream identifiers. The video grouping processor also receives virtual assistant invites, along with the virtual assistant provider, user identifiers, policies and side group identifiers. The video grouping processor may perform graphics layout for the conference based on groupings. The raw video rendering may be grouped and/or sorted depending on the choice of how the video should be rendered. A layout and rendering policy may set by the meeting manager and transmitted to the video grouping processor. Any user sharing a virtual assistant service may have a unique icon representative of the virtual assistant service provider with rendered video associated with the user. Anytime a virtual assistant is responding to a query, an icon, or a highlight around the user sharing the query, may be rendered. This icon, or highlight, can be unique per voice assistant provider. As an example, when an Alexa device is responding to a query, a blue flashing is output at the device. Following the example, rendering around the user in a conference may reflect what the voice assistant device outputs when receiving input and answering a query. Virtual assistant authentication, private mode support, device identifier support and a generic virtual assistant provider may also be added.

The environment 1400 comprises a conference 1402, a conferencing system 1410 and first and second virtual assistants 1434a, 1434b. The conference 1402 is between first to ninth computing devices 1404a-1404i. The conferencing system comprises a meeting manager 1412, a video grouping processor 1414, a video grouping remote renderer 1416, an audio router 1418 and a voice conferencing system virtual assistant 1430.

In this example, the eighth computing device 1404h invites the voice conferencing system virtual assistant 1430 to the conference, and the first and eighth computing devices 1404a, 1404h are enabled for submitting voice queries via the voice conferencing system virtual assistant 1126. A first side group 1406 is set up between the second computing device 1404b, the fifth computing device 1404e, the sixth computing device 1404f and the first virtual assistant 1434a. The first virtual assistant 1434a is in guest mode, and the sixth computing device 1404f is enabled for submitting voice queries. A second side group 1408 is set up between fourth computing device 1404d, ninth computing device 1404i and the second virtual assistant 1434b. The user of the ninth computing device 1404i is authenticated with the second virtual assistant 1434b; however, each of the fourth computing device 1404d and the ninth computing device 1404i can use both of the first and second virtual assistants 1434a, 1434b.

The first to ninth computing devices 1404a-1404i of the conference 1402 transmit various data to the meeting manager 1412. In this example, a computing device joins a meeting with a user ID and a device ID by transmitting them to the meeting manager 1412. A side meeting, or group, request is transmitted to the meeting manager 1412, with user ID identifiers of the computing devices to be included in the side meeting. Virtual assistant invite, update and/or terminate requests with a virtual assistant provider are transmitted to the meeting manager 1412 along with user identifiers, virtual assistant user authentication, policies and/or a group identifier. Group invites join requests are transmitted from the meeting manager 1412 along with a group identifier to the relevant computing devices, and the computing devices respond to the meeting manager 1412 with associated responses. Requests to enable and/or disable a main meeting speak request are transmitted to the meeting manager 1412 along with a user identifier and a group identifier. A request to end a side group is transmitted to the meeting manager 1412, along with a group identifier.

The meeting manager 1412 transmits various data to the video grouping processor 1414. In this example, in response to a virtual assistant request, new (or updated) routing is established with incoming user stream IDs, virtual assistant user authentication, policies and/or group IDs. Incoming user stream IDs are used to establish a new (or updated) routing request. A main meeting speaker request is enabled and/or disabled via user IDs and/or group IDs. A side group request is ended with a group ID.

The video grouping processor 1414 receives video streams from the first to ninth computing devices 1404a-1404i. If the streams are audiovisual streams, the audiovisual streams are received, from the first to ninth computing devices 1404a-1404i, at the demultiplexers 1420a-1420i, where the audio and video are demultiplexed to create video and audio streams. The video streams are transmitted to the respective first to ninth video decoders 1422a-1422i, and the decoded videos are transmitted to the video grouping processor 1414.

The video grouping remote renderer 1416 transmits video streams to the first to ninth computing devices 1404a-1404i. Video is transmitted, from the video grouping remote renderer 1416, to the first to ninth video encoders 1424a-1424i, where the video is encoded. The encoded video is transmitted to respective first to ninth multiplexers 1426a-1426i, where the video is multiplexed with respective audio streams and the multiplexed audiovisual streams are transmitted to the first to ninth computing devices 1404a-1404i.

In order to display, for example, icons associated with using a virtual assistant, virtual assistant data may be transmitted to the video grouping processor 1414. The video conferencing system virtual assistant 1430 and the first and second virtual assistants 1434a, 1434b transmit data, optionally via a network 1432, such as the internet. The data is received at respective handlers 1428a, 1428b, 1428c, where the handler processes the data and transmits it to the video grouping processor 1414.

Figure 15:
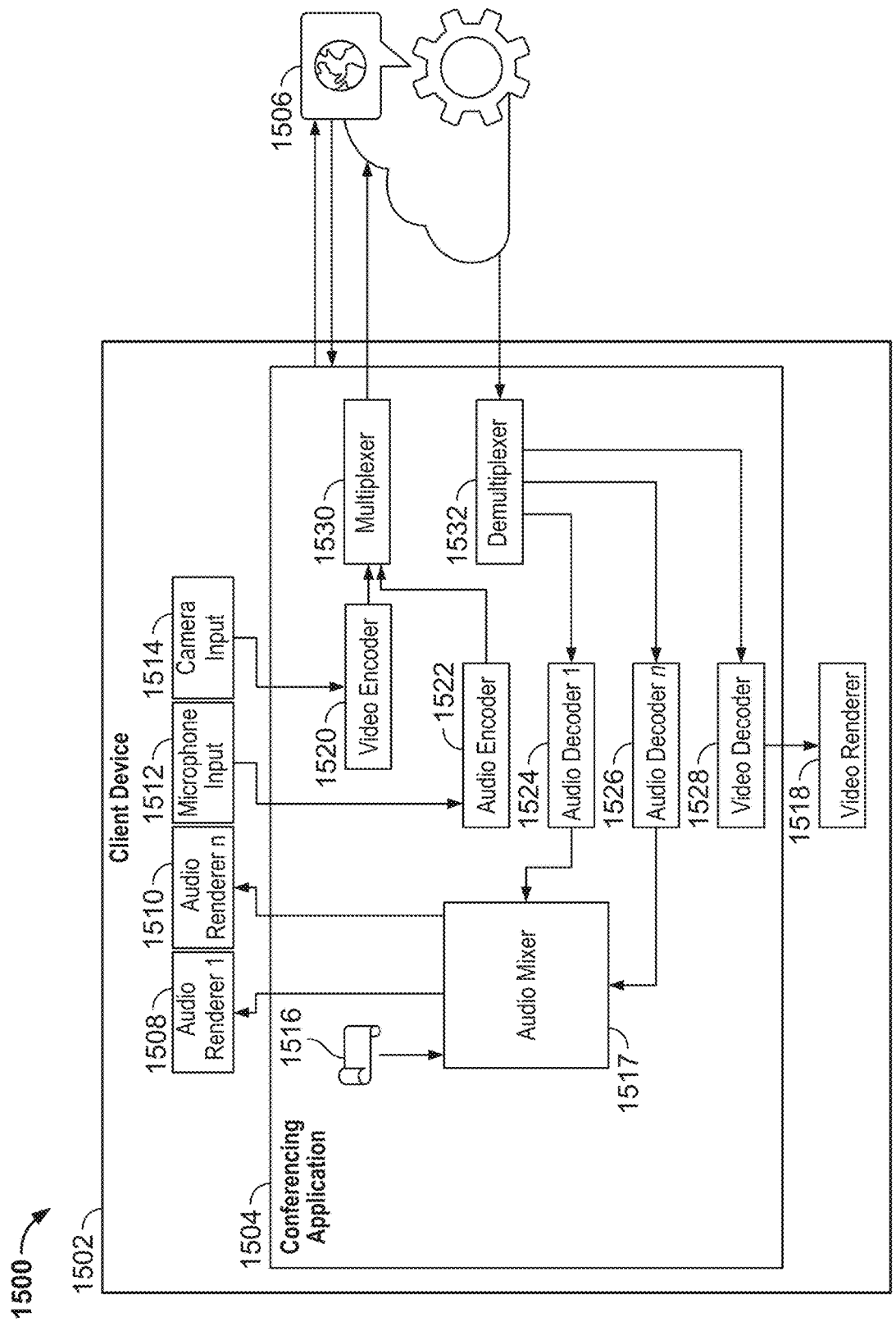
FIG. 15 shows a schematic diagram of audio and video routing for enabling the enhanced management of related conferences, in accordance with some embodiments of the disclosure.

FIG. 15 shows a schematic diagram of audio and video routing for enabling the enhanced management of related conferences, in accordance with some embodiments of the disclosure. The environment 1500 comprises a client device 1502 running a conferencing application 1504. The conferencing application transmits various data, via network 1506, to a video conferencing service (not shown). The client device 1502 comprises first to n audio renderers 1508, 1510. N represents any number of audio renderers, including, for example, three, five, 10, 25, 50, 125 and/or 200. The client device 1502 also comprises a microphone input 1512, which may be physical or virtual; a camera input, which again may be physical or virtual; and a video renderer 1518.

The microphone input audio may be encoded, the camera video input may be encoded, both may be multiplexed and may be sent to a video conferencing server. The incoming video and audio stream may be demultiplexed. The video may be sent to the video renderer. All audio streams may be decoded and sent to an audio mixer. The user may be able to choose policies on a per audio stream basis. The audio mixer policy may allow the user to mute or adjust the audio level for each incoming audio stream. A user interface associated with the application 1504 may allow the user to select other users in the main video conference and create side group requests. The user interface may also allow users to "accept" or "reject" a side group request. The user interface may provide a way for the user to invite a virtual assistant to the meeting or to a side group meeting. When inviting users for a shared voice assistant service, the user can select which users in the meeting, or side group, can provide voice input queries. The user can also select which users in the main meeting, or side group, can hear the voice query responses. Virtual assistant authentication, private mode support, device identifier support and a generic voice assistant provider can also be added.

The conferencing application 1504 transmits various data to the video conferouping service. This includes, for example, data to join a meeting with a user ID and a device ID. A new, or updated, routing policy for a virtual assistant request, along with incoming user stream IDs may be transmitted to a virtual assistant. In addition, user authentication may be performed via policies and/or group IDs. A side group request may be transmitted, along with a relevant group ID, invited group ID and policies. Group invites join requests are transmitted from the video conferencing application 1504 along with a group ID to the video conferencing service, and the video conferencing service transmits appropriate responses. Requests to enable and/or disable a main meeting speak request are transmitted to the video conferencing service along with a user ID and a group ID. A request to end a side group is transmitted to the meeting video conferencing service, along with a group ID.

The conferencing application 1504 comprises a policy 1516 for setting a volume control, including muting, and a render policy for each incoming audio stream. The policy is transmitted to the audio mixer 1517, where it is implemented. The audio mixer 1517 transmits received audio to the audio renderers 1508, 1510. Received audio is transmitted from the microphone input 1512 to the audio encoder 1522, and received video is transmitted from the camera input 1514 to the video encoder 1520. Encoded video and audio is transmitted from the encoders 1520, 1522 to the multiplexer 1530, where it is transmitted, via network 1506, to the video conferencing service. An audiovisual stream is received, from the video conferencing service, via network 1506, at demultiplexer 1532. The demultiplexed audio stream or streams are transmitted to first to n audio decoders 1524, 1526, and the demultiplexed video stream is transmitted to the video decoder 1528. The decoded audio is transmitted from the audio decoders 1524, 1526 to the audio mixer 1517. The mixed audio is transmitted from the audio mixer to the audio renderer 1508, or renderers 1508, 1510, where it is generated for output. The decoded video is transmitted from the video decoder 1528 to the video renderer 1518, where it is generated for output.

Figure 16:
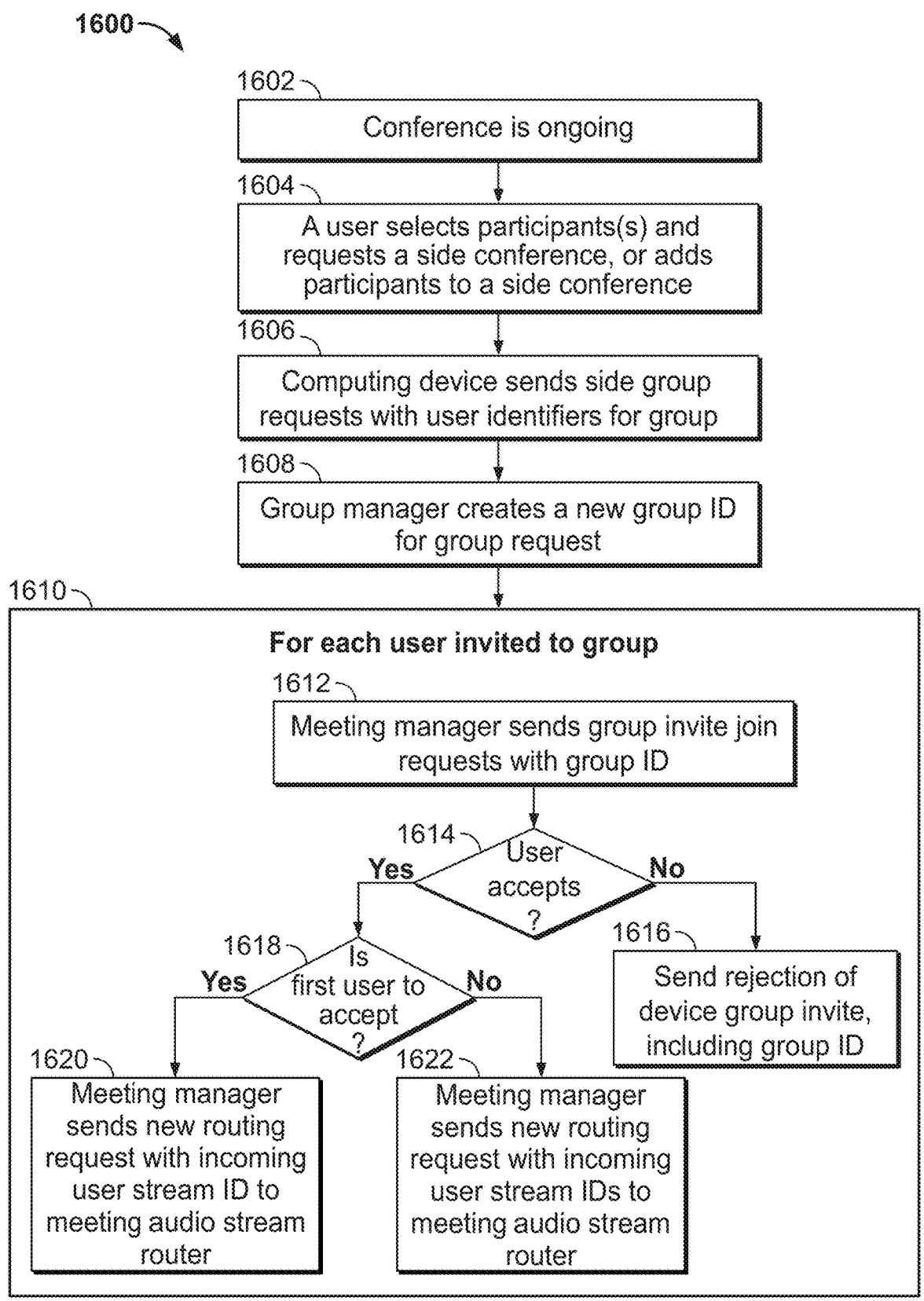
FIG. 16 shows a flowchart of illustrative steps involved in enabling the enhanced management of related conferences, in accordance with some embodiments of the disclosure.

FIG. 16 shows a flowchart of illustrative steps involved in enabling the enhanced management of related conferences, in accordance with some embodiments of the disclosure. Process 1600 may enable supporting a meeting manager to set up a group meeting. Process 1600 may be implemented on any of the aforementioned computing devices (e.g., computing device 802, 902, 1002, 1102, 1106a, 1106, 1110a, 1110b). In addition, one or more actions of the process 1600 may be incorporated into or combined with one or more actions of any other process or embodiments described herein.

At 1602, a conference is in progress. During the conference, at 1604, a user selects one or more participants and requests a side conference with those selected users by, for example, transmitting an invite to the selected users. In another example, at 1604, the selected participants are added directly to the side conference. At 1606, the computing device associated with the user transmits side group requests, with user identifiers for the group, and at 1608, a group manager creates a new group identification for the group request. At 1610, for each user invited to the group, the following steps are performed. At 1612, the meeting manager transmits a group invite join request to the user, with the group identification. At 1614, it is determined whether the user accepts the request. If the user declines the request, at 1616, a rejection of the request, including the group identification, is transmitted to the meeting manager. If the user accepts the request, then, at 1618, it is determined whether the user is the first user to accept the request. If the user is the first user to accept the request, then, at 1620, the meeting manager sends a new routing request with the incoming user stream identification to a meeting audio stream router. If the user is not the first user to accept the request, then, at 1622, the meeting manager sends a new routing request with identifications of the incoming user streams to a meeting audio stream router.

Figure 17:
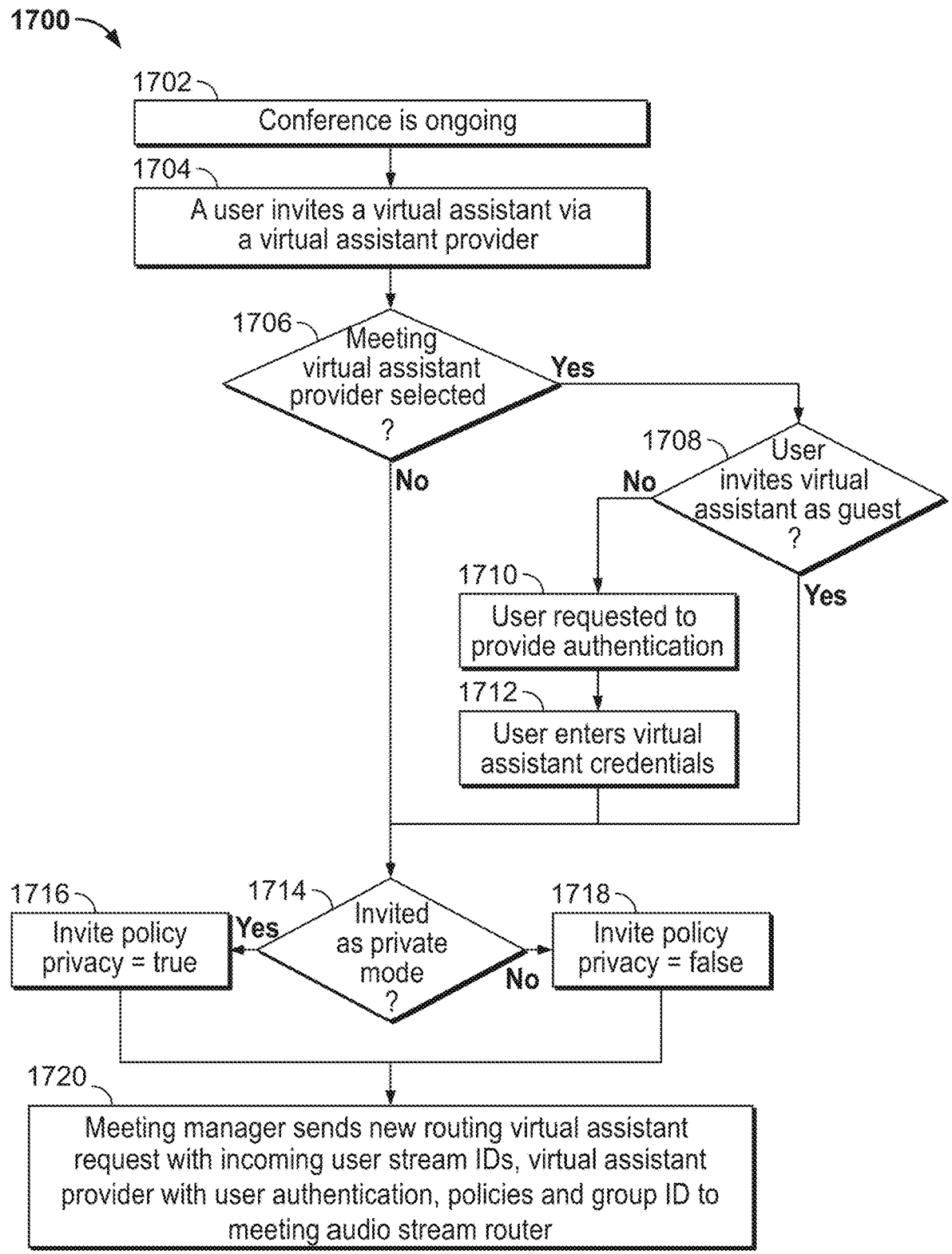
FIG. 17 shows another flowchart of illustrative steps involved in enabling the enhanced management of related conferences, in accordance with some embodiments of the disclosure.

FIG. 17 shows another flowchart of illustrative steps involved in enabling the enhanced management of related conferences, in accordance with some embodiments of the disclosure. Process 1700 may enable adding voice assistants to a meeting and may be implemented on any of the aforementioned computing devices (e.g., computing device 802, 902, 1002, 1102, 1106a, 1106, 1110a, 1110b). In addition, one or more actions of the process 1700 may be incorporated into or combined with one or more actions of any other process or embodiments described herein.

At 1702, a conference is in progress. During the conference, at 1704, a user invites a virtual assistant to the conference via a provider associated with the virtual assistant. At 1706, it is determined whether a virtual assistant provider is selected for the meeting. If a virtual assistant provider is selected for the meeting, at 1708, it is determined whether the virtual assistant is invited as a guest. If the virtual assistant is not invited as a guest, then, at 1710, the user is requested to provide authentication input, for example, via an authentication screen generated for display at a computing device. In another example, the user could be provided with an audio prompt to speak their credentials. At 1712, the user enters their credentials for the virtual assistant, and the process proceeds to step 1714. If the meeting virtual assistant provider is not selected at 1706, the process proceeds to step 1714. If the user did not invite the virtual assistant as a guest at 1708, the process proceeds to step 1714. At step 1714, it is determined whether the virtual assistant has been invited in private, or guest, mode. If the virtual assistant has been invited in private mode, then, at 1716, the invite policy has the privacy set to true. If the virtual assistant has not been invited in private mode, then, at 1718, the invite policy has the privacy set to false. The process proceeds from step 1716, or step 1718, to step 1720, where a conference meeting manager sends a new routing virtual assistant request with, for example, incoming user stream identifications, virtual assistant provider information, virtual assistant user authentication, policies and a group identification to a meeting audio stream router.

Figure 18:
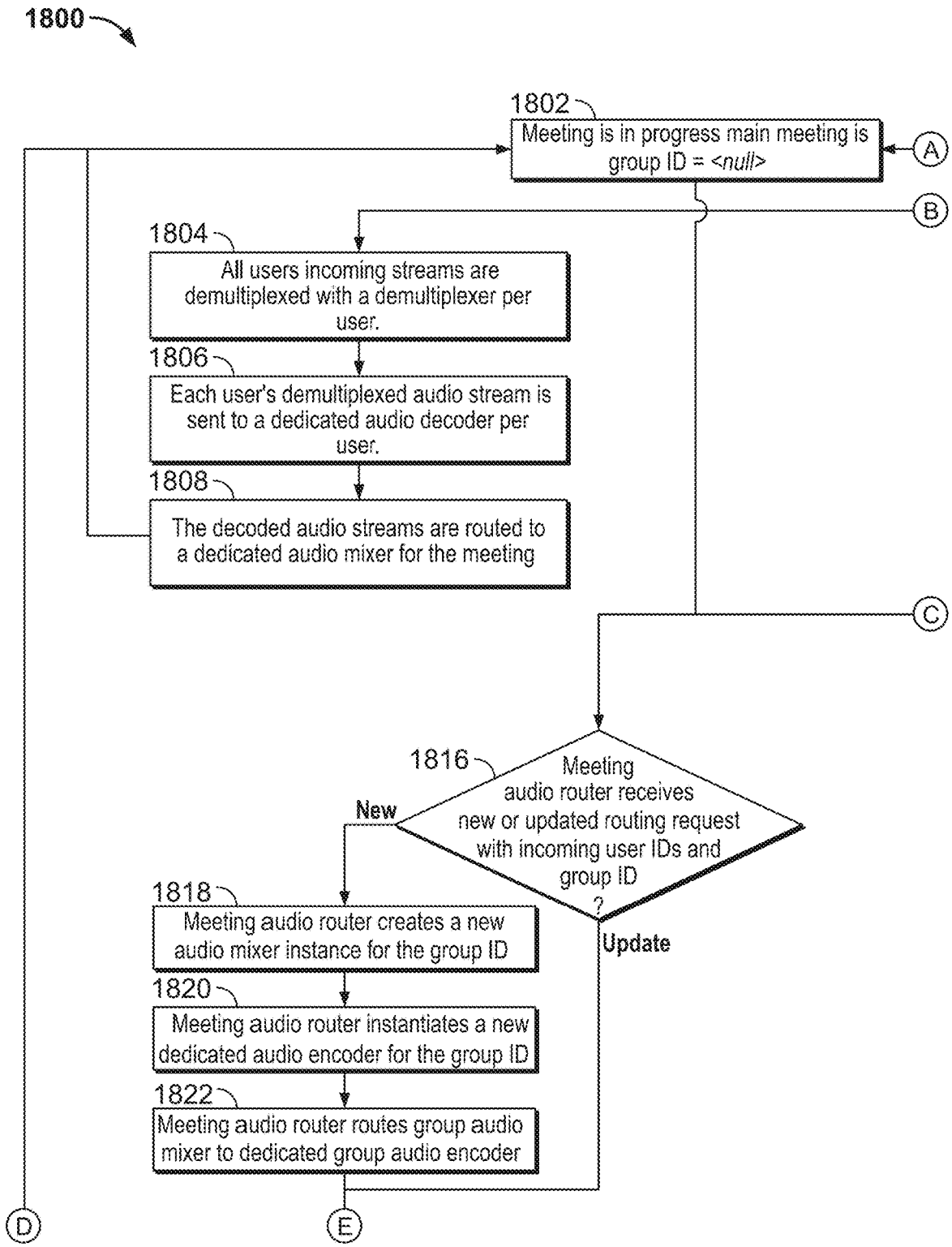
FIG. 18 shows another flowchart of illustrative steps involved in enabling the enhanced management of related conferences, in accordance with some embodiments of the disclosure.
Figure 18:
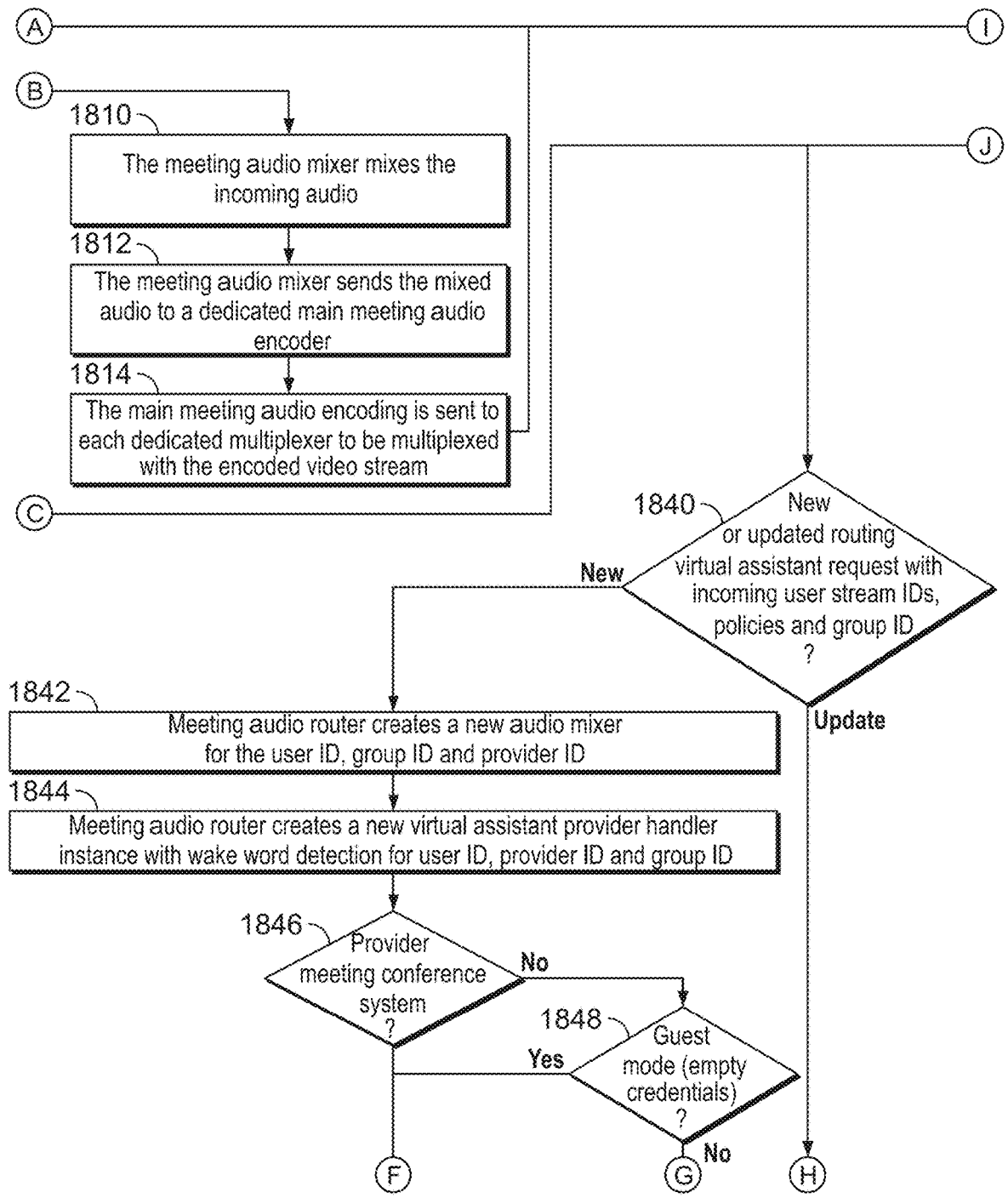
Figure 18:
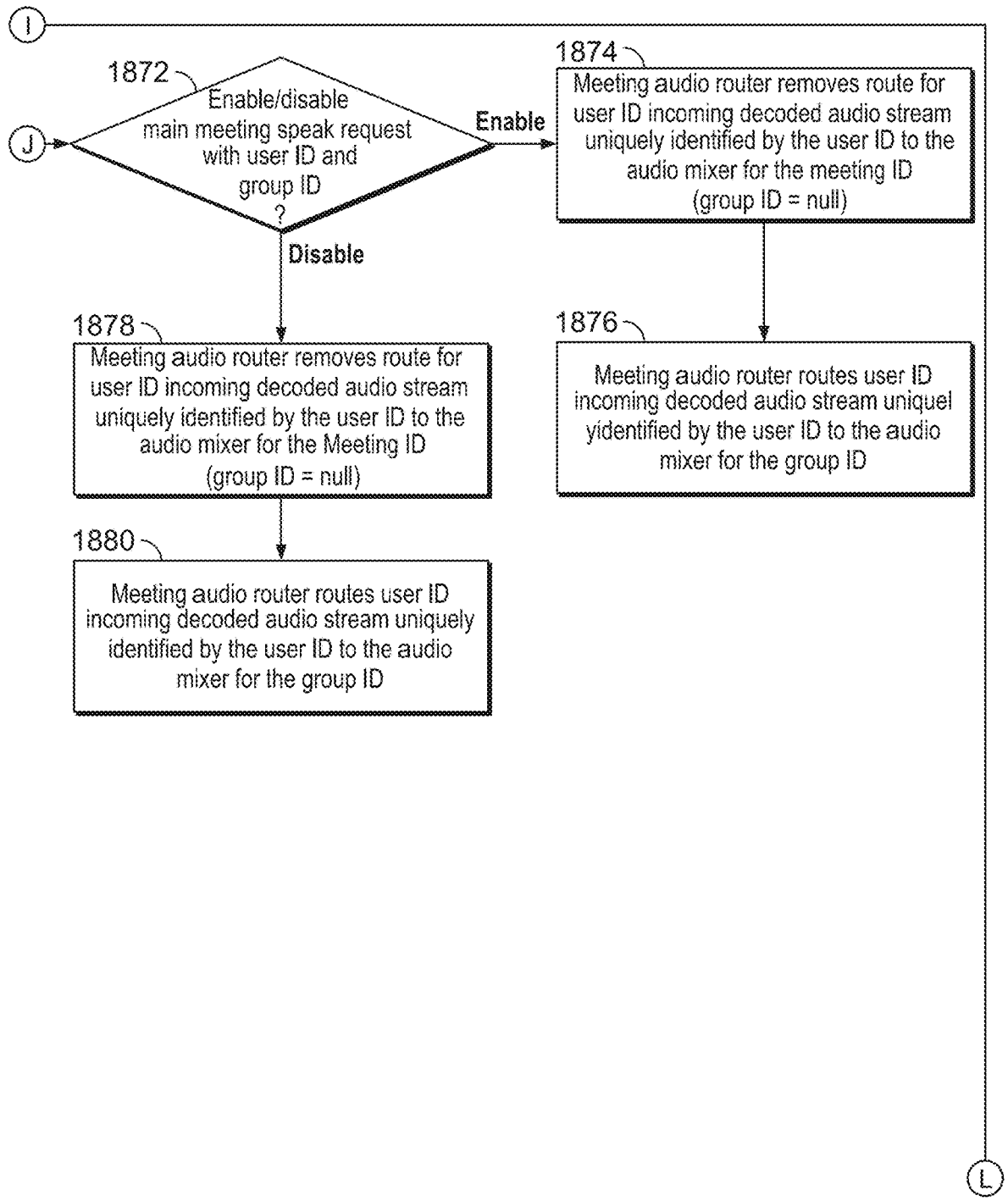
Figure 18:
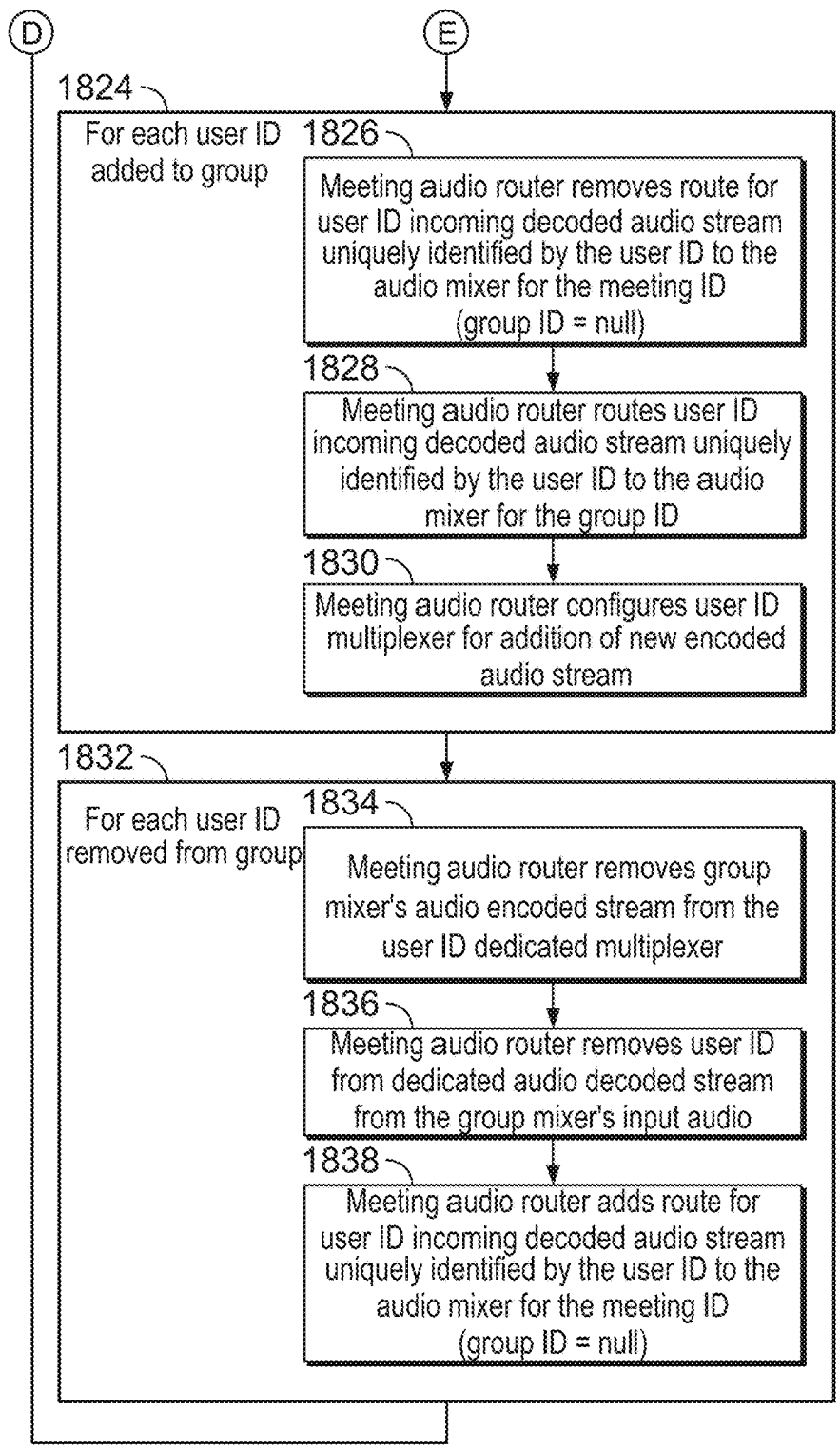
Figure 18:
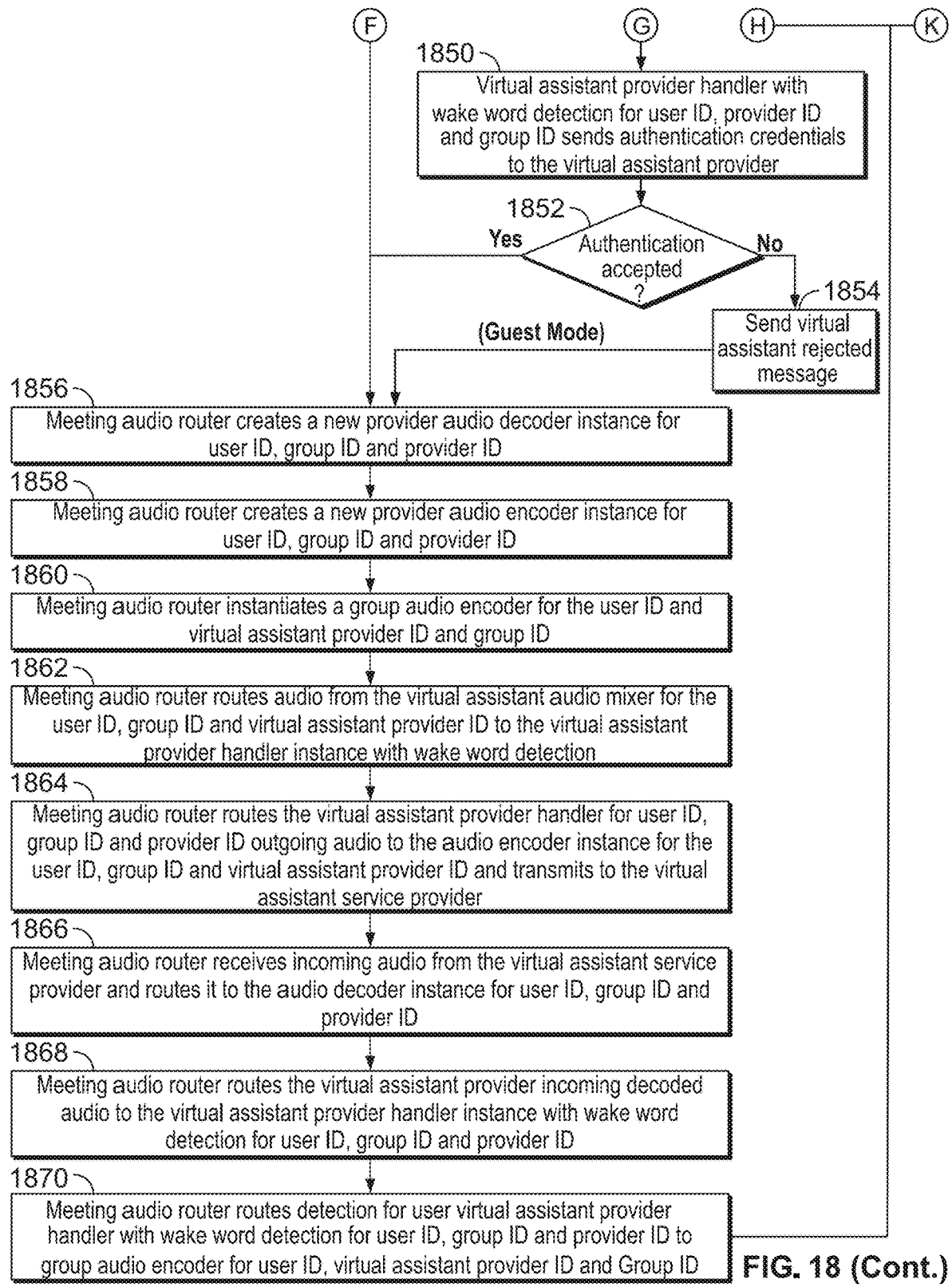
Figure 18:
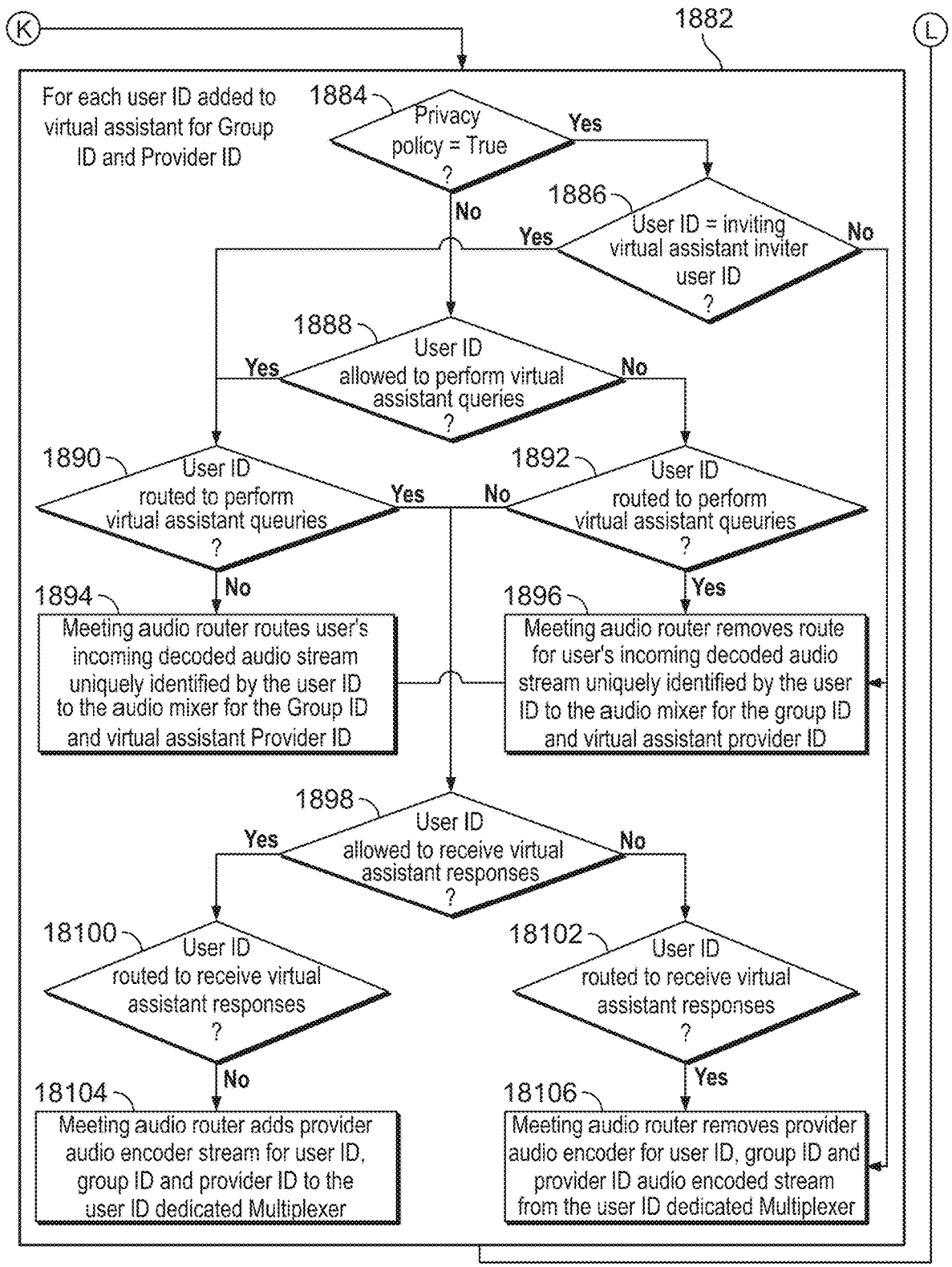

FIG. 18 shows another flowchart of illustrative steps involved in enabling the enhanced management of related conferences, in accordance with some embodiments of the disclosure. Process 1800 may enable support for a meeting audio router to create side groups and add voice assistants to a meeting. Process 1800 may be implemented on any of the aforementioned computing devices (e.g., computing device 802, 902, 1002, 1102, 1106a, 1106, 1110a, 1110b). In addition, one or more actions of the process 1800 may be incorporated into or combined with one or more actions of any other process or embodiments described herein.

At 1802, a conference is in progress, where the main meeting has a group identification of null. Steps 1804-1814 describe the functioning of the main meeting and loop continuously as the conference progresses. At 1804, all the incoming audiovisual streams, from the different computing devices of the conference, are demultiplexed with a separate demultiplexer per conference participant. At 1806, each demultiplexed audio stream is sent to a dedicated audio decoder per conference participant. At 1808, the decoded audio streams are routed to a dedicated audio mixer for the main meeting of the conference. At 1810, a meeting audio mixer mixes incoming audio. At 1812, the meeting audio mixer transmits the mixed audio to a dedicated main meeting audio encoder. At 1814, the encoded audio of the main meeting audio is transmitted to each dedicated multiplexer to be multiplexed with the encoded video streams, and if video is included, the video stream will be multiplexed.

Various actions may be performed during a conference, at 1816, 1840 and 1872. A side group is created, and audio is routed to the participants of the side group, starting at 1816. A virtual assistant is added to a conference, or side conference, starting at 1840. At 1872, a speak request is accepted or denied for the main conference.

At 1816, it is determined whether the meeting audio router receives a new or an updated routing request with corresponding incoming user identifications and a side group identification. If it is an updated routing request, the process skips to 1824. Otherwise, if the audio router receives a new routing request, then, at 1818, the meeting audio router creates a new audio mixer instance for the side group, based on the group identification. At 1820, the meeting audio router instantiates a new dedicated audio encoder for the side group, and at 1822, the meeting audio router routes the group audio mixer to a dedicated side group audio encoder. The process proceeds to 1824.

At 1824, steps are carried out for each user added to the side group, with the users identified by user identifications. At 1826, the meeting audio router removes a route for the incoming decoded audio stream of the side group participant from the main meeting audio mixer. The incoming decoded audio stream is uniquely identified by the user identification associated with the stream. At 1828, the meeting audio router routes the incoming decoded audio stream to the audio mixer for the side group. At 1830, the meeting audio router configures a multiplexer associated with a user ID for the addition of the new encoded audio stream.

At 1832, steps are carried out for each user removed from the side group. At 1834, an encoded audio stream associated with the removed user is removed from the dedicated multiplexer associated with that user by the meeting audio router. At 1836, the meeting audio router removed the decoded audio stream associated with the user from the group mixer input audio. At 1838, the meeting audio router adds the route for the incoming decoded audio stream associated with the user to the audio mixer for the main meeting. The process loops back to 1802, where the conference proceeds.

At 1840, it is determined whether a request to route audio to a virtual assistant is a new or updated request. The request may comprise incoming user stream identifications, policies and a group identification associated with the main meeting, or a side group. If it is a new request, then the process proceeds to 1842, where the meeting audio router creates a new audio mixer for the identification associated with the user, the identification for the group (i.e., main meeting or side group) and an identification associated with the virtual assistant provider. At 1844, the meeting audio router creates a new virtual assistant provider handler instance with wake word detection for the user, group and provider identifications. At 1846, it is determined whether the virtual assistant provider is already a part of the conference. If it is, then the process proceeds to step 1856. If it is not, then the process proceeds to 1848, where it is determined whether the virtual assistant is in guest mode. If it is in guest mode, then the process proceeds to step 1856. If the virtual assistant is not in guest mode, then, at 1850, the virtual assistant provider handler requests authentication credentials and transmits the authentication credentials to the virtual assistant providers. At 1852, it is determined whether the authentication is accepted. If the authentication is accepted, the process proceeds to 1856. If the authentication is not accepted, then the process proceeds to 1854, where the virtual assistant is rejected from the conference, and a message is transmitted to a computing device associated with the virtual assistant. The virtual assistant is put into guest mode and is accepted into the conference, and the process proceeds to step 1856. At 1856, the meeting audio router creates a new provider audio decoder instance for the user identification, group identification and provider identification. At 1858, the meeting audio router creates a new provider audio encoder instance for the user identification, group identification and provider identification. At 1860, the meeting audio router instantiates a group audio encoder for the user identification, group identification and provider identification. At 1862, the meeting audio router routes audio from the virtual assistant audio mixer for the user identification, group identification and provider identification to the virtual assistant provider handler instance with wake word detection. At 1864, the meeting audio router routes the virtual assistant provider handler for outgoing audio associated with the user identification, group identification and provider identification to the audio encoder instance created in step 1858 and transmits audio to the virtual assistant service provider. At 1866, the meeting audio router receives incoming audio from the virtual assistant service provider and routes it to the audio decoder instance created in step 1856. At 1868, the meeting audio router routes the virtual assistant provider incoming decoded audio to the virtual assistant provider handler instance created in step 1844. At 1870, the meeting audio router routes the virtual assistant provider handler with wake word detection created in step 1844 to the group audio encoder created in step 1860. The process proceeds to 1882.

At 1840, if it is determined that the routing request is an updated routing request, the process proceeds to 1882.

At 1882, steps are carried out for each user added to a virtual assistant in a group, such as a main meeting or side group and for a virtual assistant provider. At 1884, it is determined whether the privacy policy is set to true. If it is not set to true, the process proceeds to step 1888. If it is set to true, it is determined at 1886 whether the user identification of the user inviting the virtual assistant to the group is the same as the user identification of the present user. If it is not, the process proceeds to steps 1896 and 18106. If it is, the process proceeds to 1890. At 1888, it is determined, via the user identification, whether the user is allowed to perform virtual assistant queries. If the user is allowed to perform virtual assistant queries, the process proceeds to step 1890. If the user is not allowed to perform virtual assistant queries, the process proceeds to step 1892. At 1890, it is determined, via the user identification, whether the user was routed to perform virtual assistant queries. If the user was routed, the process proceeds to step 1898. If the user was not routed, the process proceeds to step 1894. At 1892, it is also is determined, via the user identification, whether the user was routed to perform virtual assistant queries. If the user was routed, the process proceeds to step 1896. If the user was not routed, the process proceeds to step 1898. At 1894, the meeting audio router routes an incoming decoded audio stream associated with a user identification to the audio mixer for a group identification and virtual assistant provider identification. At 1896, the meeting audio router removes a route for an incoming decoded audio stream associated with a user identification from the audio mixer for a group identification and virtual assistant provider identification. The process proceeds, from step 1894 or step 1896 to step 1898, where it is determined, via a user identification, whether a user is allowed to receive virtual assistant responses. If the user is allowed to receive virtual assistant responses, then, at 18100, it is determined, via a user identification, whether the user is routed to receive virtual assistant responses. If the user is not routed to receive virtual assistant responses, then at 18104, the meeting audio router adds a provider audio encoder stream for the user identification, group identification and provider identification to the dedicated multiplexer associated with the user identification. If the user is not allowed to receive virtual assistant responses, then, at 18102, it is determined, via a user identification, whether the user was routed to receive virtual assistant responses. If the user was routed to receive virtual assistant responses, then, at 18106, the meeting audio router removes a provider audio encoder for the user identification, group identification and provider identification to the dedicated multiplexer associated with the user identification. From 18104 or 18106, the process loops back to 1802, where the conference proceeds.

At 1872, it is determined, via a user identification and a group identification, whether a user is allowed to speak in a side group, via the group identification. If the user is allowed to speak in the meeting, at 1874, the meeting audio router removes the route for an incoming decoded audio stream associated with the user identification to the audio mixer for the main meeting. At 1876, the meeting audio router routes the incoming decoded audio stream associated with the user identification to the audio mixer for the group identification. If the user is not allowed to speak in the meeting, then at 1878, the meeting audio router removes the route for an incoming decoded audio stream associated with the user identification to the audio mixer for the main meeting. At 1880, the meeting audio router routes the incoming decoded audio stream associated with the user identification to the audio mixer for the group identification.

Figure 19:
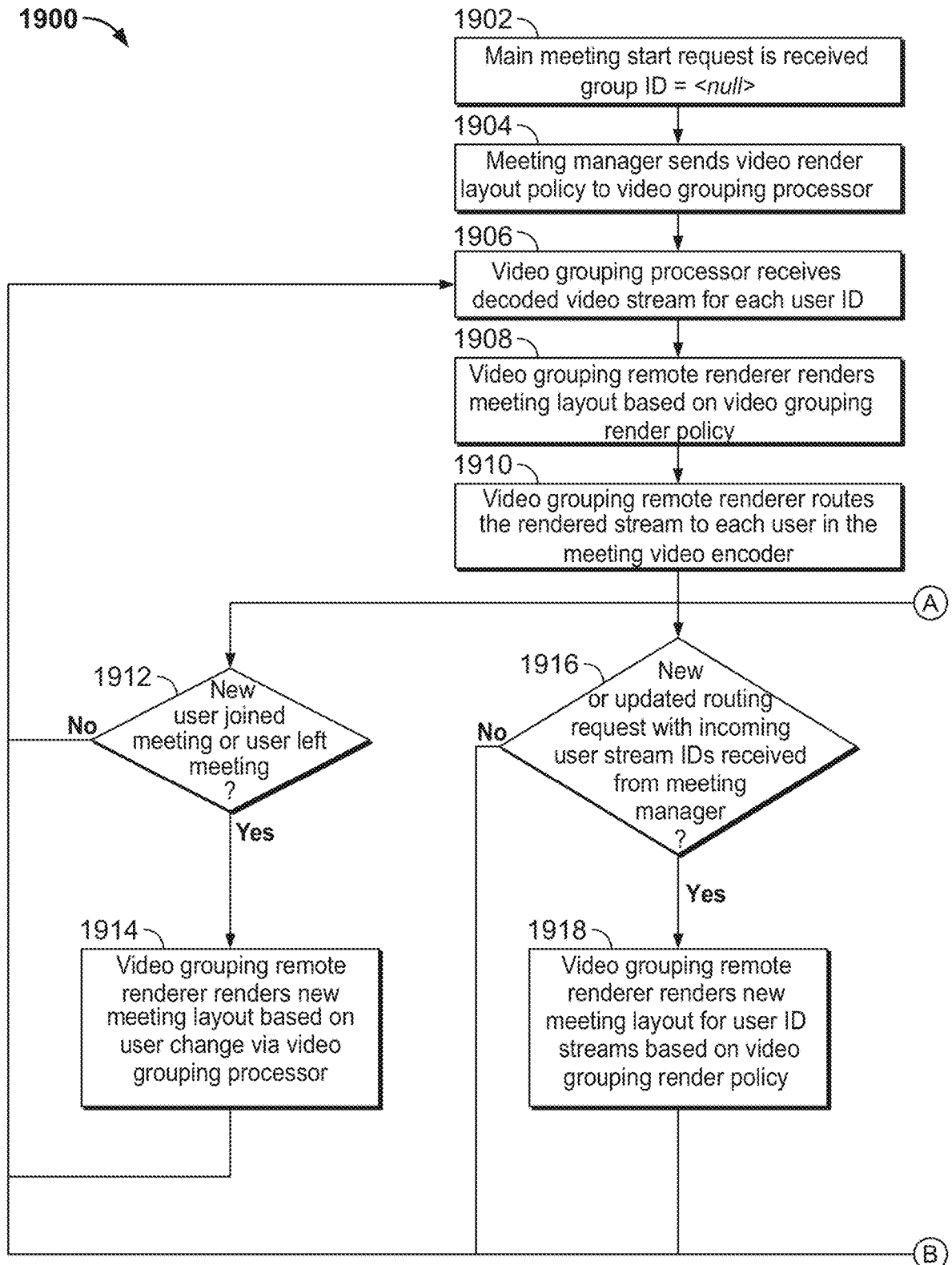
FIG. 19 shows another flowchart of illustrative steps involved in enabling the enhanced management of related conferences, in accordance with some embodiments of the disclosure.
Figure 19:
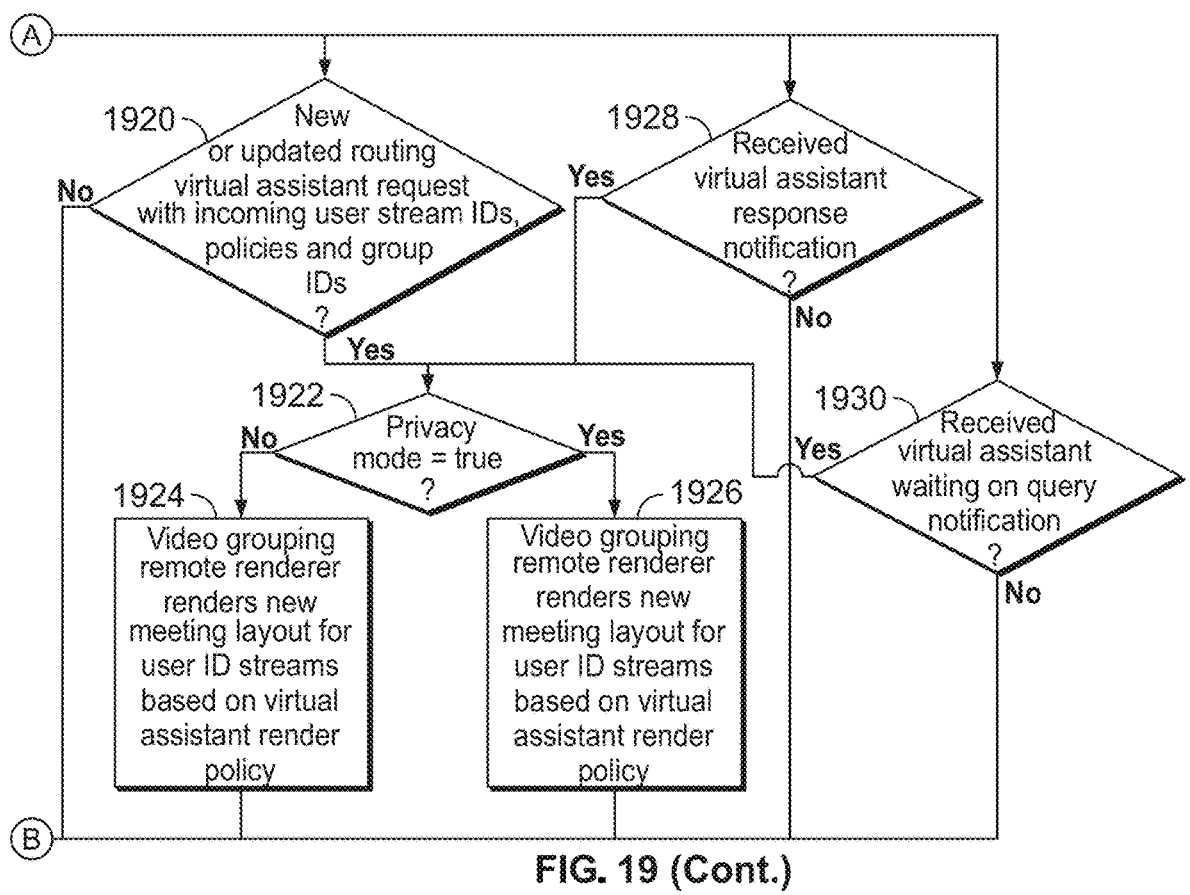

FIG. 19 shows another flowchart of illustrative steps involved in enabling the enhanced management of related conferences, in accordance with some embodiments of the disclosure. Process 1900 may enable support for a video grouping processor and a video grouping remote renderer. Process 1900 may be implemented on any of the aforementioned computing devices (e.g., computing device 802, 902, 1002, 1102, 1106a, 1106, 1110a, 1110b). In addition, one or more actions of the process 1900 may be incorporated into or combined with one or more actions of any other process or embodiments described herein.

At 1902, a request to start a main meeting, or conference, is received. At 1904, a meeting manager sends a video render layout policy to a video grouping processor, such as that discussed above in connection with FIG. 14. At 1906, the video grouping processor receives video streams for each of the conference participants, based on the participant user identification. At 1908, a video grouping remote renderer renders the meeting layout based on a video grouping render policy. At 1910, the video grouping remote renderer routes the rendered stream to each user in the meeting video encoder. Steps 1912, 1916, 1920, 1928, 1930 are actions that may take place during a video conference.

At 1912, it is determined whether a new user has joined, or left, the meeting. If no user has joined, or left, the meeting, the process loops back to step 1906, where the video conference continues. At 1914, if a user has joined, or left, the meeting then the video grouping renderer renders a new meeting layout based on the user change via the video grouping processor, and the process loops back to step 1906, where the video conference continues.

At 1916, it is determined whether a new, or updated routing request has been received from a meeting manager. The request may comprise user stream identifications. If a request has not been received, the process loops back to step 1906, where the video conference continues. If a request has been received then, at 1918, the video grouping remote renderer renders a new meeting layout for each of the incoming streams based on a video grouping render policy.

At 1920, it is determined whether a new, or updated, routing request for a virtual assistant has been received. The request may comprise user stream identifications, policies and group identifications for side groups. If a request has not been received, the process loops back to step 1906, where the video conference continues. If a request has been received, the process proceeds to step 1922.

At 1928, it is determined whether a virtual assistant response notification has been received. If a request has not been received, the process loops back to step 1906, where the video conference continues. If a request has been received, the process proceeds to step 1922.

At 1930, it is determined whether a virtual assistant waiting on a query notification has been received. If a request has not been received, the process loops back to step 1906, where the video conference continues. If a request has been received, the process proceeds to step 1922.

At 1922, it is determined if the privacy mode of the virtual assistant has been set to true. If it has not been set to true, at 1924, the video grouping remote renderer renders new meeting layout for the incoming streams based on a virtual assistant render policy. If it has been set to true, at 1926, the video grouping remote renderer renders new meeting layout for the incoming streams based on a virtual assistant render policy. From step 1924, or step 1926, the process loops back to step 1906, where the video conference continues.

Figure 20:
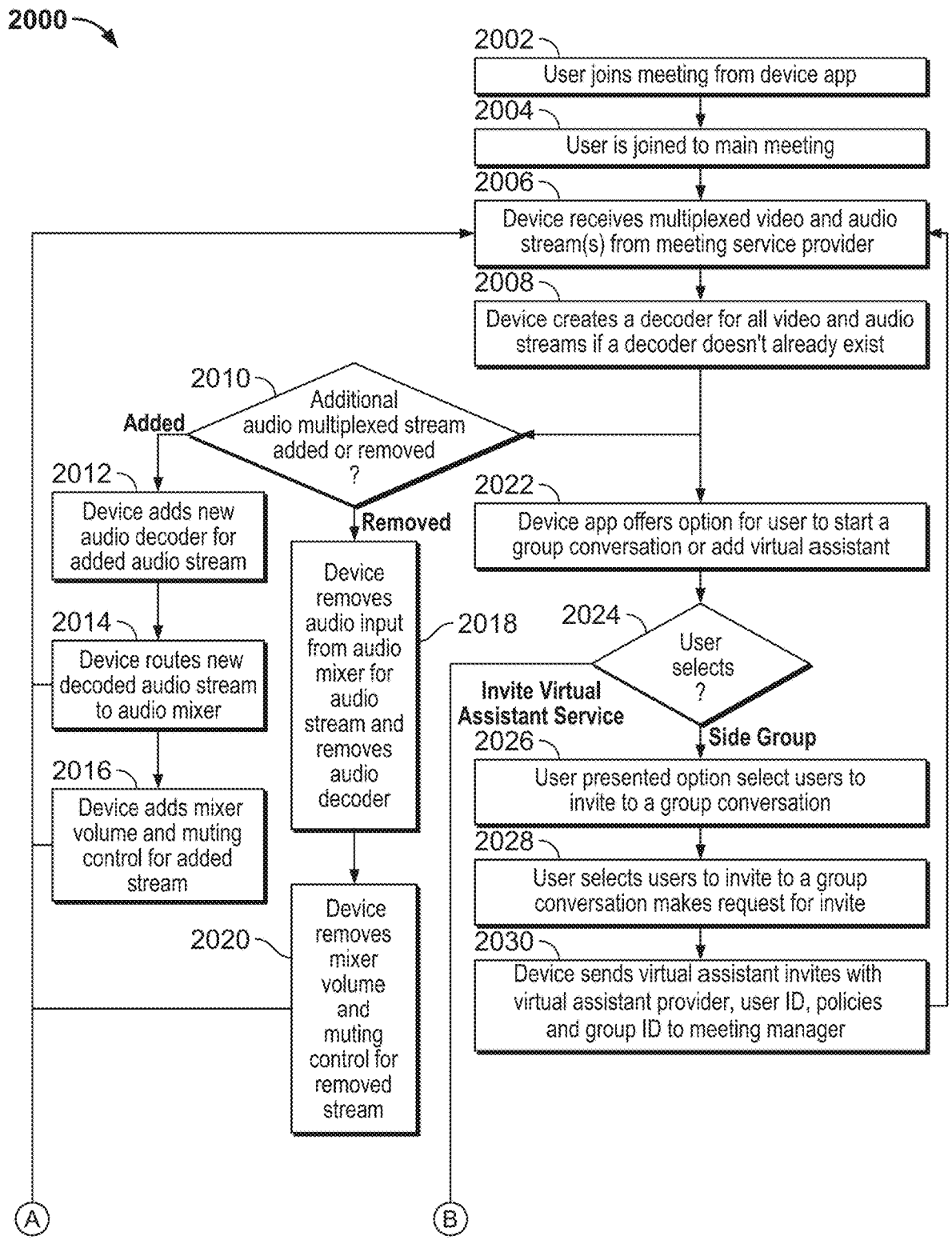
FIG. 20 shows another flowchart of illustrative steps involved in enabling the enhanced management of related conferences, in accordance with some embodiments of the disclosure.
Figure 20:
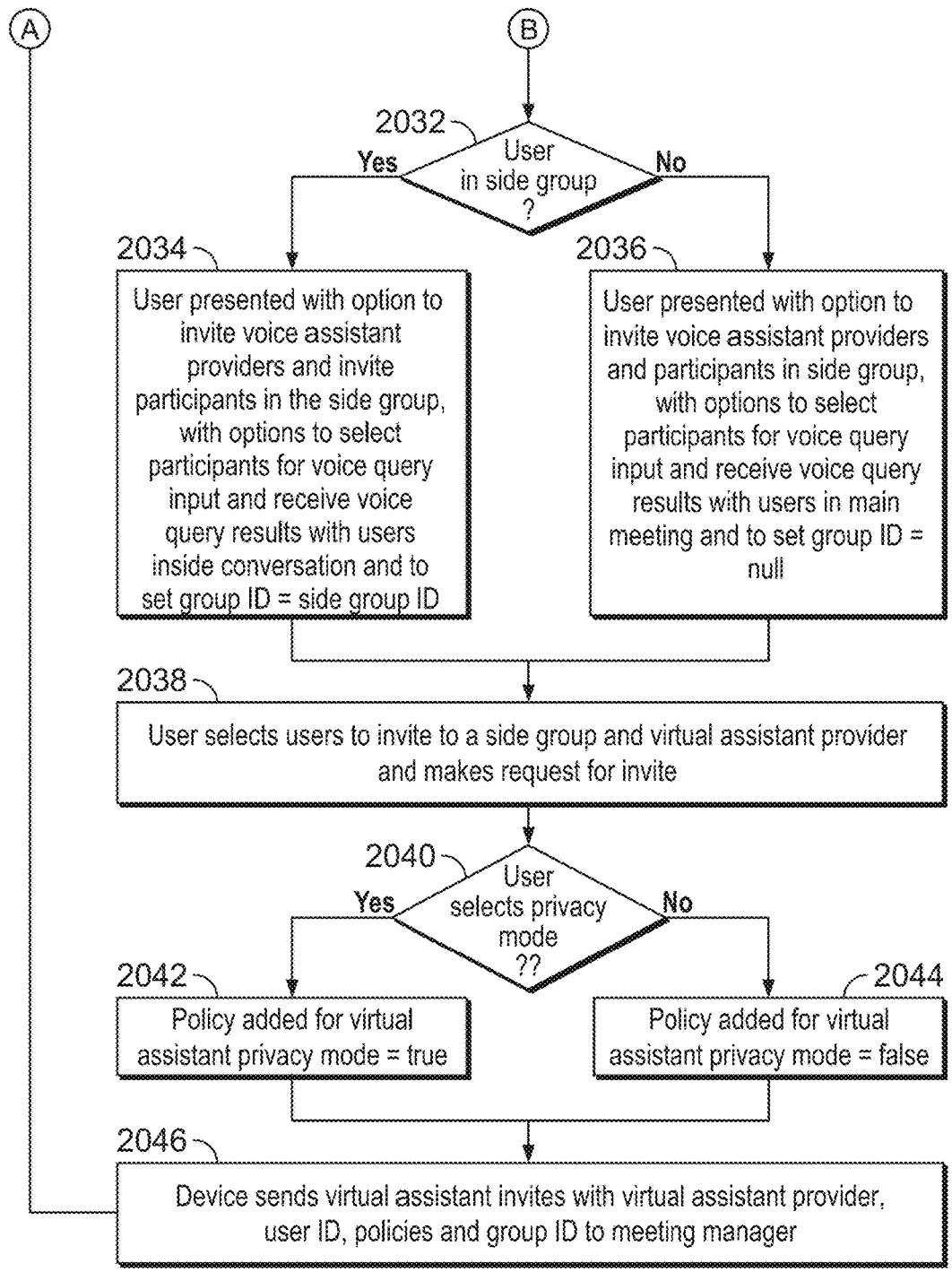

FIG. 20 shows another flowchart of illustrative steps involved in enabling the enhanced management of related conferences, in accordance with some embodiments of the disclosure. Process 2000 may enable device policy setting, inviting conference participants to a side group, inviting a voice assistant service, adding or removing incoming multiplexed audio streams, and controlling audio for each incoming audio stream. Process 2000 may be implemented on any of the aforementioned computing devices (e.g., computing device 802, 902, 1002, 1102, 1106*a*, 1106, 1110*a*, 1110*b*). In addition, one or more actions of the process 2000 may be incorporated into or combined with one or more actions of any other process or embodiments described herein.

At 2002, a user joins a meeting, or conference, from a computing device application. At 2004, the user is joined to a main meeting. At 2006, the computing device receives multiplex video and audio stream(s) from a meeting, or conference, service provider. At 2008, the computing device creates decoders for each of the related video and audio streams, if a decoder does not already exist. At 2010, it is determined whether an additional audio multiplexed stream has been added or removed. If a stream has been added, at 2012, the computing device adds a new audio decoder for the added audio stream. At 2014, the computing device routes a new decoded audio stream to an audio mixer, and the process optionally returns to step 2006. At 2016, the computing device adds mixer volume and muting control for the added stream, and the process returns to step 2006. If, at 2010, an additional audio multiplex stream has been removed, then the process proceeds to step 2018, where the computing device removes audio input from audio mixer for the audio stream and removes an audio decoder for the stream. At 2020, the computing device removes mixer volume and muting control for the removed stream, and the process returns to step 2006.

At 2022, the computing device application offers an option for a user to start a group conversation and/or to add a virtual assistant. At 2024, it is determined which option has been selected. If the option to start a side group, or conversation is selected, then, at 2026, an option to select users to invite to a group conversation is generated for output. At 2028, input is received to indicate the users to invite to the group conversation, and a request to invite those users is generated. At 2030, the computing device transmits virtual assistant invites to the selected users. The computing device also transmits the virtual assistant provider, a user identification, policies and a group identification to a meeting manager, and the process returns to step 2006.

If, at 2024, the option to invite a virtual assistant to the group is selected, at 2032, it is determined whether the user, or computing device, is in a side group. If it is determined that the user, or computing device, is in a side group, then, at 2034, an option is generated for output, wherein the option enables the user to invite virtual assistant providers, and to invite participants, to a side group. There may be additional options to select participants that are allowed to provide voice query input and to select participants that are allowed to receive voice query results, from participants, or users, that are already in the side group. If it is determined that the user, or computing device, is not in a side group, then, at 2036, an option is generated for output, wherein the option enables the user to invite virtual assistant providers, and to invite participants, to a side group. There may be additional options to select participants that are allowed to provide voice query input and to select participants that are allowed to receive voice query results, from participants, or users, that are in the main group. Step 2034, or step 2036, proceeds to step 2038, where a user provides input to select users to invite to a side group conversation and the virtual assistant provider, and the invite is generated.

At 2040, it is determined whether the user has selected privacy mode. If the user has selected privacy mode, then, at 2042, a policy is added indicating that the virtual assistant privacy mode is true. If the user has not selected privacy mode, then at 2044, a policy is added indicating that the virtual assistant privacy mode is false. Step 2042, or step 2044, proceeds to step 2046, where the computing device transmits virtual assistant invites to the meeting manager. The computing device also transmits the virtual assistant provider, a user identification, policies and a group identification to a meeting manager, and the process returns to step 2006.

Figure 21:
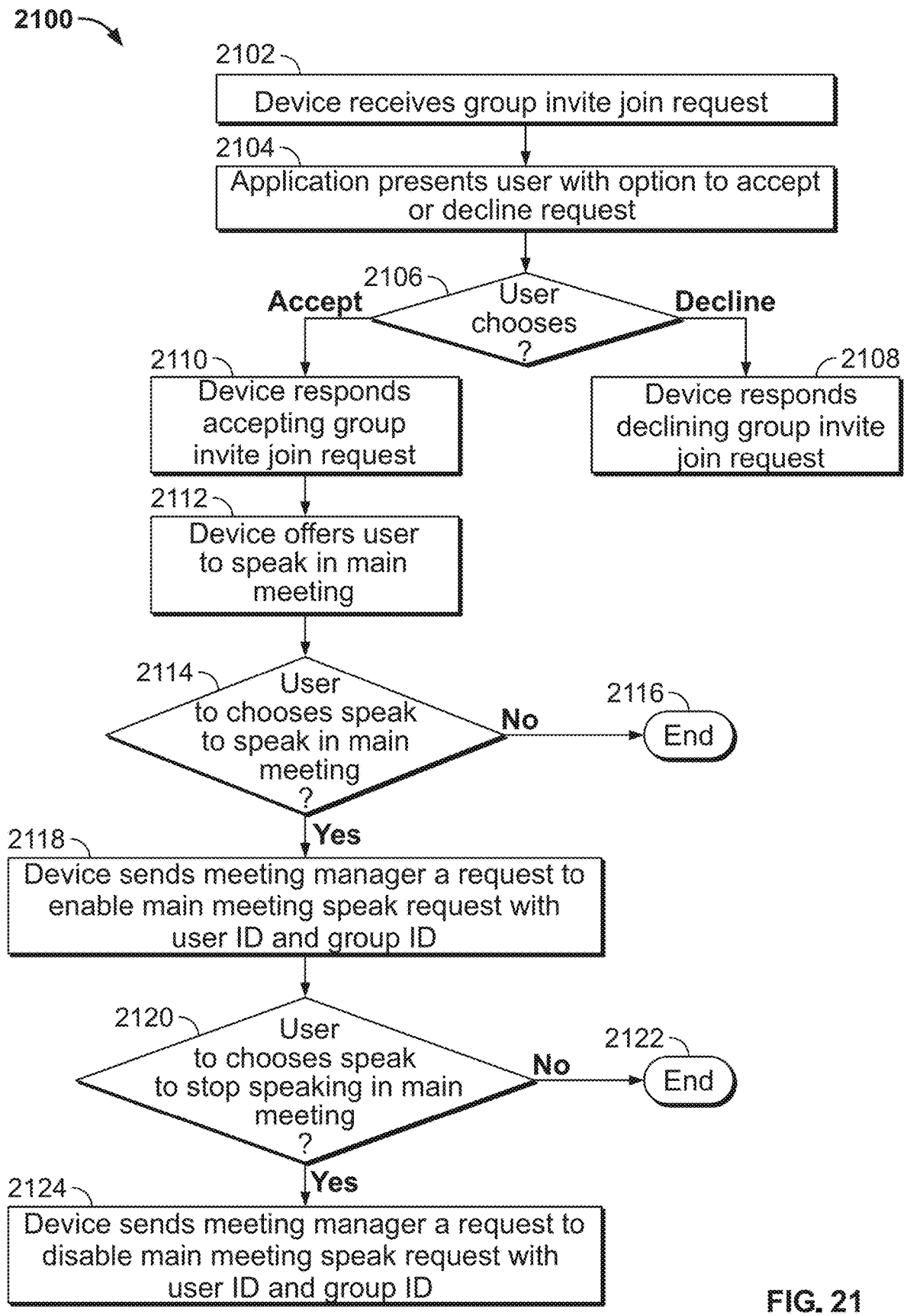
FIG. 21 shows another flowchart of illustrative steps involved in enabling the enhanced management of related conferences, in accordance with some embodiments of the disclosure.

FIG. 21 shows another flowchart of illustrative steps involved in enabling the enhanced management of related conferences, in accordance with some embodiments of the disclosure. Process 2100 may enable a group invite request to be accepted on a computing device application. Process 2100 may be implemented on any of the aforementioned computing devices (e.g., computing device 802, 902, 1002, 1102, 1106*a*, 1106, 1110*a*, 1110*b*). In addition, one or more actions of the process 2100 may be incorporated into or combined with one or more actions of any other process or embodiments described herein.

At 2102, a computing device receives an invite to join a conference group. At 2104, an application running on the computing device generates for output an option to accept or to decline the request. At 2106, the user provides input to accept or to decline the request. If the user declines the request, at 2108, the computing device transmits a decline response. If the user accepts the request, at 2110, the computing device transmits an accept response. At 2112, the computing device generates an option for output that enables the user to speak in the main meeting of a conference. At 2114, the user provides input indicting whether they wish to speak in the main meeting. If the user declines the request, then, at 2116, the process ends. If the user accepts the request, then at 2118, the computing device transmits to the meeting manager a request to enable speaking in the main meeting. The request may comprise an identification associated with the user and an identification associated with the conference group. At 2120, it is determined whether the user wishes to stop speaking in the main meeting. If the user does not wish to stop speaking, then at 2122, the process ends. If the user wishes to stop speaking, the computing device transmits a meeting manager a request to disable speaking in the main meeting. The request may comprise an identification associated with the user and an identification associated with the conference group.

Figure 22:
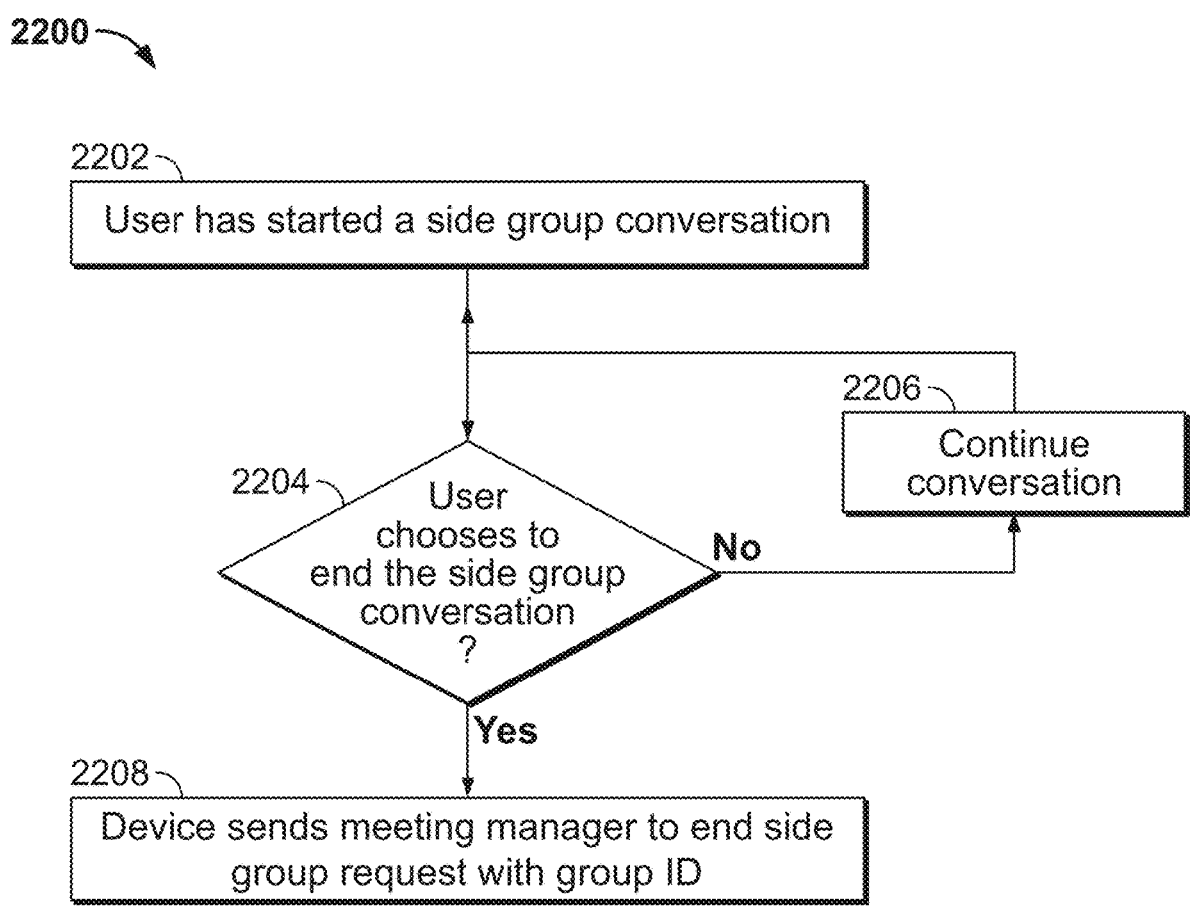
FIG. 22 shows another flowchart of illustrative steps involved in enabling the enhanced management of related conferences, in accordance with some embodiments of the disclosure.

FIG. 22 shows another flowchart of illustrative steps involved in enabling the enhanced management of related conferences, in accordance with some embodiments of the disclosure. Process 2200 may enable the termination of a side group via a computing device application. Process 2200 may be implemented on any of the aforementioned computing devices (e.g., computing device 802, 902, 1002, 1102, 1106a, 1106, 1110a, 1110b). In addition, one or more actions of the process 2200 may be incorporated into or combined with one or more actions of any other process or embodiments described herein.

At 2202, a user initiates a side group conversation, meeting, or huddle. At 2204, it is determined whether the user has ended the side group. If the user has not ended the side group, the process proceeds to 2206, where the conversation continues. The process loops to step 2204. If, at 2204, it is determined that the user has ended the side group, then the process proceeds to step 2208. At 2208, a computing device sends a meeting manager to a request to end the side group. The request may comprise the identification associated with the side group.

Figure 23:
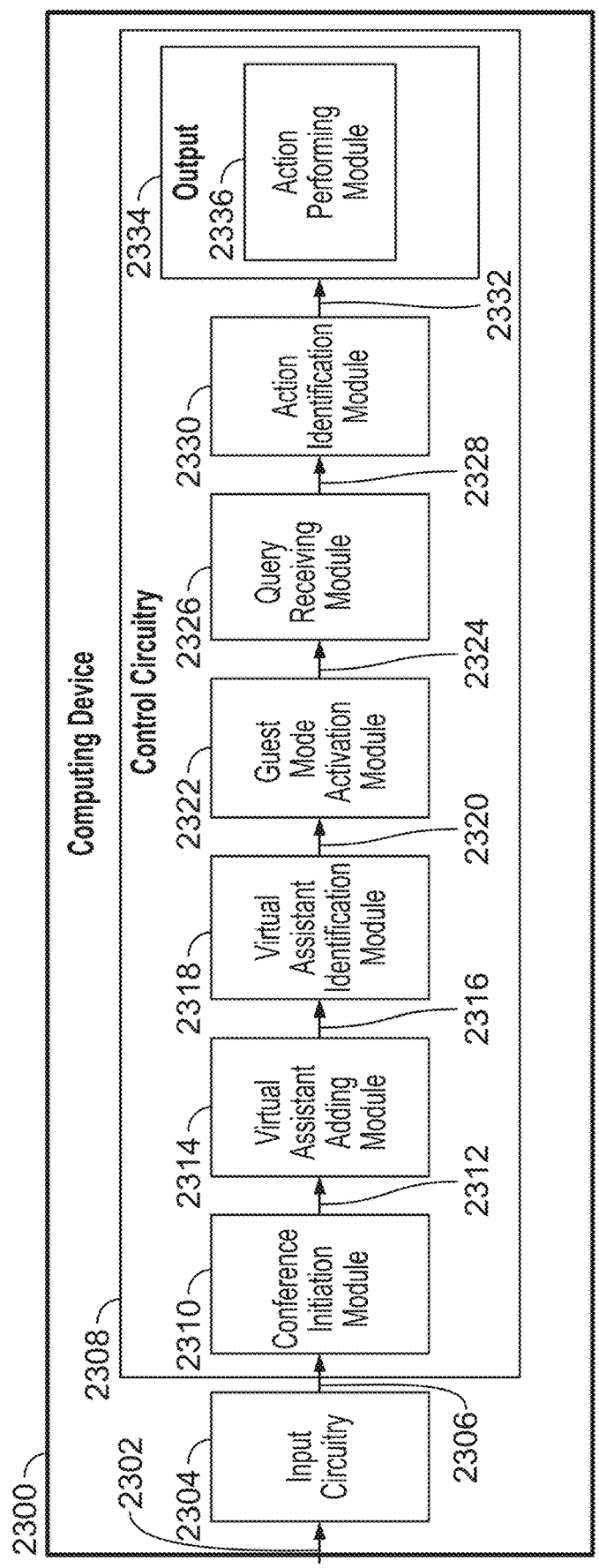
FIG. 23 shows a block diagram representing components of a computing device and dataflow therebetween for enabling the protection of user privacy when adding a virtual assistant to a conference, in accordance with some embodiments of the disclosure.

FIG. 23 shows a block diagram representing components of a computing device and dataflow therebetween for enabling the protection of user privacy when adding a virtual assistant to a conference, in accordance with some embodiments of the disclosure. Computing device 2300 (e.g., computing device 102, 112, 202, 212, 302, 312, 402, 412, 502, 512, 602, 612), as discussed above, comprises input circuitry 2304, control circuitry 2308 and output circuitry 2334. Control circuitry 2308 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received 2302 by the input circuitry 2304. The input circuitry 2302 is configured to received inputs related to a computing device. For example, this may be via a touchscreen, a keyboard, a mouse and/or a microphone in communication with the computing device 2300. In other examples, this may be via a gesture detected via an augmented, mixed and/or virtual reality device. In another example, the input may comprise instructions received via another computing device, for example, a smart speaker. The input circuitry 2304 transmits 2306 the user input to the control circuitry 2308.

The control circuitry 2308 comprises a conference initiation module 2310, a virtual assistant adding module 2314, a virtual assistant identification module 2318, a guest mode activation module 2322, a query receiving module 2326, an action identification module 2330 and an output module 2334 that comprises an action performing module 2336. The input is transmitted 2306 to the conference initiation module 2310, where a conference is initiated. An indication that a conference has been initiated is transmitted 2312 to the virtual assistant adding module 2314, which monitors for input corresponding to the addition of a virtual assistant to the conference. On receiving input for adding a virtual assistant to the conference, an indication is transmitted 2316 to the virtual assistant identification module 2318, where it is identified that a virtual assistant has been added to the conference. An indication of the virtual assistant is transmitted 2320 to the guest mode activation module 2322, which activates the virtual assistant guest mode. An indication is transmitted 2324 to the query receiving module, which receives a query via the virtual assistant. The query is transmitted 2328 to the action identification module, which identifies an action based on the query. The action is transmitted 2332 to the output module 2334, where the action performing module 2336 performs the identified action.

Figure 24:
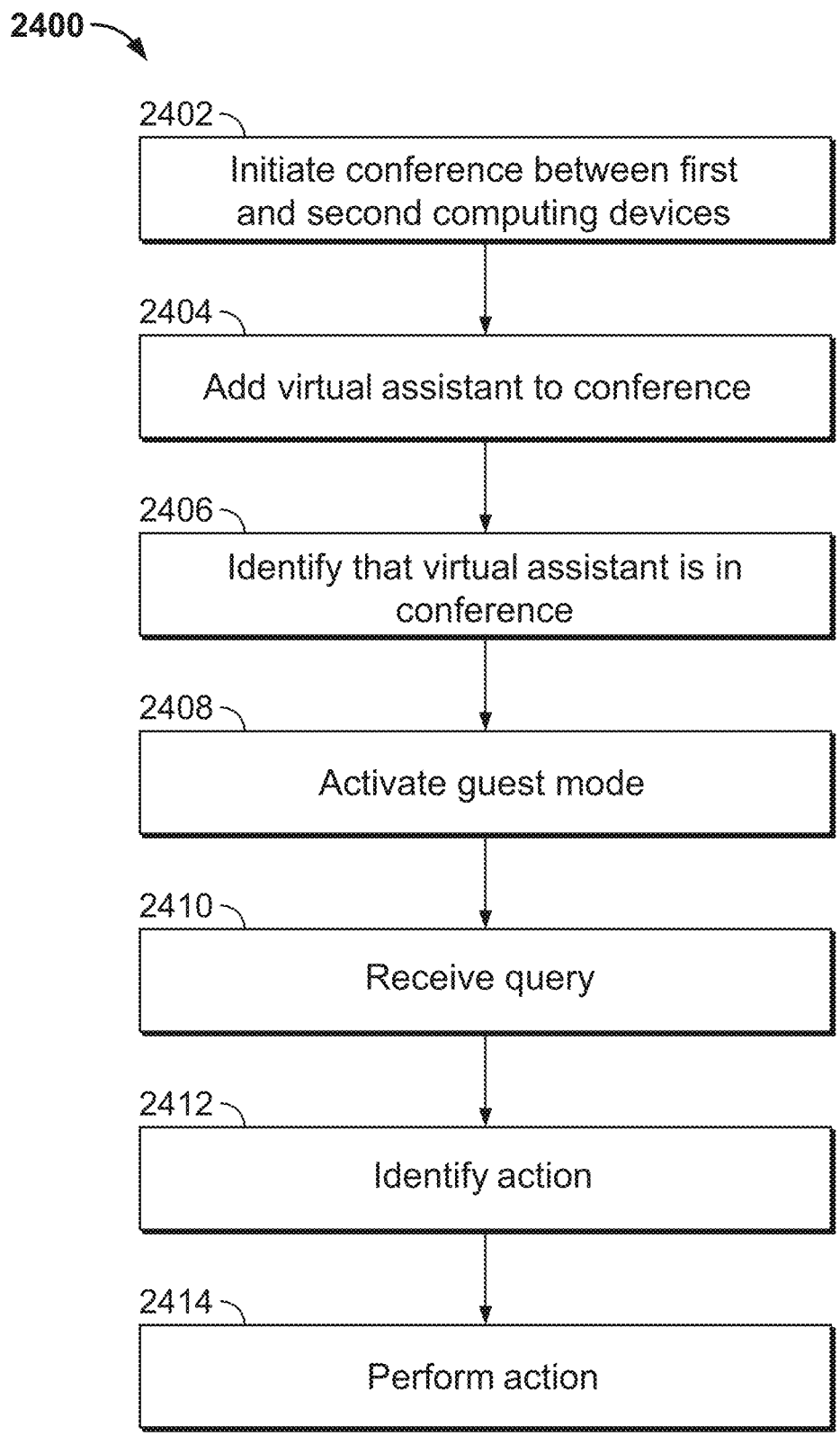
FIG. 24 shows another flowchart of illustrative steps involved in enabling the protection of user privacy when adding a virtual assistant to a conference, in accordance with some embodiments of the disclosure.

FIG. 24 shows another flowchart of illustrative steps involved in enabling the protection of user privacy when adding a virtual assistant to a conference, in accordance with some embodiments of the disclosure. Process 2400 may be implemented on any of the aforementioned computing devices (e.g., computing device 102, 112, 202, 212, 302, 312, 402, 412, 502, 512, 602, 612). In addition, one or more actions of the process 2400 may be incorporated into or combined with one or more actions of any other process or embodiments described herein.

At 2402, a conference is initiated between first and second computing devices. At 2404, a virtual assistant is added to the conference. At 2406, it is identified that the virtual assistant is in the conference. At 2408, guest mode is activated at the virtual assistant. At 2410, a query is received at the virtual assistant. At 2412, an action is identified, based on the query, and at 2414, the action is performed.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   initiating, between a first computing device and a first group of one or more computing devices, a first conference;
   receiving, via a first virtual assistant associated with the first computing device, a first input to join a second conference comprising a gaming session;
   initiating, between the first computing device and a second group of one or more computing devices, the second conference, wherein:
   the first conference is associated with the second conference;

the second group of one or more computing devices comprises the first group of one or more computing devices and at least one additional computing device; and the first computing device and the first group of one or more computing devices are concurrently participants in the first conference and the gaming session;

adding the first virtual assistant to the gaming session;

receiving a request to add a second virtual assistant to the gaming session;

identifying a first provider of the first virtual assistant and a second provider of the second virtual assistant;

determining that the first provider and the second provider are different; and adding, based at least in part on the determination that the first provider and the second provider are different, the second virtual assistant to the gaming session.

2. The method of claim 1, further comprising:
receiving, at the first computing device and the first group of one or more computing devices, an invite for the first conference and the second conference;
receiving, at the at least one additional computing device, an invite for the second conference only; and wherein:
initiating the first conference further comprises initiating the first conference in response to receiving a second input accepting the invite for the first conference at the first computing device.

3. The method of claim 1, wherein associating the first conference with the second conference further comprises:
assigning a first session identification to the first conference; and
assigning a second session identification to the second conference, wherein the first session identification is a child of the second session identification.

4. The method of claim 1, further comprising:
identifying a social media profile associated with the first computing device;
identifying, via the social media profile, one or more friends associated with a game of the gaming session and wherein:
the first group of one or more computing devices comprises computing devices associated with the one or more friends identified via the social media profile.

5. The method of claim 1, wherein:
the first computing device and the first group of one or more computing devices are associated with a first team in the gaming session;
the second group of one or more computing devices comprises a plurality of additional computing devices and the plurality of additional computing devices are associated with a second team in the gaming session; and
the method further comprising:
initiating a third conference, between the plurality of additional computing devices, wherein the third conference is associated with the first and second conferences.

6. The method of claim 1, wherein a plurality of third virtual assistants are associated with at least a subset of the computing devices of the first group of one or more computing devices, the method further comprising:
identifying a provider of each of the plurality of third virtual assistants;
inviting, based at least in part on the identified provider and from the plurality of third virtual assistants, respective virtual assistants of each provider to the gaming session; and
initiating third and additional conferences, between the second group of one or more computing devices, via the invited virtual assistants of each provider.

7. The method of claim 6, further comprising:
receiving a second input, via a user interface element, at one of the computing devices of the first and second groups of computing devices, that enables a volume associated with the invited virtual assistants to be independently controlled from the volume of the first or second conferences.

8. The method of claim 1, further comprising:
transmitting audio from the gaming session to a first audio mixer;
transmitting audio from the first conference to a second audio mixer;
transmitting audio from the second conference to a third audio mixer;
transmitting audio from the first virtual assistant to a fourth audio mixer;
identifying a command for activating the first virtual assistant in an output from one of the first, second, third and fourth audio mixers; and, in response to identifying the command:
transmitting, based at least in part on the identified command, the output from the respective first, second, third or fourth audio mixer to a voice assistant service;
receiving a query;
transmitting the query, via the voice assistant service, to the first virtual assistant; and
performing, based at least in part on the query, an action via the first virtual assistant.

9. The method of claim 1, wherein the method further comprises:
generating, for output at the first computing device, a user interface, wherein the user interface comprises:
a first user interface element for:
selecting one or more computing devices in the second group;
generating an invite, between the selected one or more computing devices and the first computing device, for a third conference, wherein the third conference is associated with the first and second conferences; and
transmitting, from the first computing device to the selected one or more computing devices, the invite;
a second user interface element for accepting or rejecting an invite to a conference; and
a third user interface element for:
adding a third virtual assistant to one of the first, second or third conferences; and
enabling a second input at the third virtual assistant from a sub-selection of the computing devices in the conference associated with the first virtual assistant.

10. The method of claim 1, wherein the request is a first request and the method further comprises:
receiving a second request to add a third virtual assistant to the gaming session;
identifying a third provider of the third virtual assistant;
determining that one of the first provider or the second provider are the same as the third provider;

rejecting, based at least in part on the determination that the one of the first provider or the second provider are the same as the third provider, the second request to add the third virtual assistant to the gaming session; and generating, for output, a notification that the second request has been rejected.

11. A system comprising:

a communication port;

a memory storing instructions; and control circuitry communicably coupled to the memory and the communication port and configured to execute instructions to:

initiate, between a first computing device and a first group of one or more computing devices and via the communication port, a first conference;

receive, via a first virtual assistant associated with the first computing device, a first input to join a second conference comprising a gaming session;

initiate, between the first computing device and a second group of one or more computing devices, the second conference, wherein:

the first conference is associated with the second conference;

the second group of one or more computing devices comprises the first group of one or more computing devices and at least one additional computing device; and the first computing device and the first group of one or more computing devices are concurrently participants in the first conference and the gaming session;

add the first virtual assistant to the gaming session;

receive a request to add a second virtual assistant to the gaming session;

identify a first provider of the first virtual assistant and a second provider of the second virtual assistant;

determine that the first provider and the second provider are different; and add, based at least in part on the determination that the first provider and the second provider are different, the second virtual assistant to the gaming session.

12. The system of claim 11, further comprising control circuitry configured to:

receive, at the first computing device and the first group of one or more computing devices, an invite for the first conference and the second conference;

receive, at the at least one additional computing device, an invite for the second conference only; and wherein:

the control circuitry configured to initiate the first conference is further configured to initiate the first conference in response to receiving a second input accepting the invite for the first conference at the first computing device.

13. The system of claim 11, wherein the control circuitry configured to associate the first conference with the second conference is further configured to:

assign a first session identification to the first conference; and assign a second session identification to the second conference, wherein the second session identification is a child of the first session identification.

14. The system of claim 11, wherein the control circuitry is further configured to:

identify a social media profile associated with the first computing device;

identify, via the social media profile, one or more friends associated with a game of the gaming session and wherein:

the first group of one or more computing devices comprises computing devices associated with the one or more friends identified via the social media profile.

15. The system of claim 11, wherein:

the first computing device and the first group of one or more computing devices are associated with a first team in the gaming session;

the second group of one or more computing devices comprises a plurality of additional computing devices and the plurality of additional computing devices are associated with a second team in the gaming session; and the control circuitry is further configured to:

initiate a third conference, between the plurality of additional computing devices, wherein the third conference is associated with the first and second conferences.

16. The system of claim 11, wherein a plurality of third virtual assistants are associated with at least a subset of the computing devices of the first group of one or more computing devices and the control circuitry is further configured to:

identify a provider of each of the plurality of third virtual assistants;

invite, based at least in part on the identified provider and from the plurality of third virtual assistants, respective virtual assistants of each provider to the gaming session; and initiate third and additional conferences, between the second group of one or more computing devices, via the invited virtual assistants of each provider.

17. The system of claim 16, wherein the control circuitry is further configured to:

receive a second input, via a user interface element, at one of the computing devices of the first and second groups of computing devices, that enables a volume associated with the invited virtual assistants to be independently controlled from the volume of the first or second conferences.

18. The system of claim 11, where the control circuitry is further configured to:

transmit audio from the gaming session to a first audio mixer;

transmit audio from the first conference to a second audio mixer;

transmit audio from the second conference to a third audio mixer;

transmit audio from the first virtual assistant to a fourth audio mixer;

identify a command for activating the first virtual assistant in an output from one of the first, second, third and fourth audio mixers; and, in response to identifying the command, the control circuitry is further configured to:

transmit, based at least in part on the identified command, the output from the respective first, second, third or fourth audio mixer to a voice assistant service;

receive a query;

transmit the query, via the voice assistant service, to the first virtual assistant; and perform, based at least in part on the query, an action via the first virtual assistant.

19. The system of claim 11, wherein the control circuitry is further configured to:
generate, for output at the first computing device, a user interface, wherein the user interface comprises:
a first user interface element for:
selecting one or more computing devices in the second group;
generating an invite, between the selected one or more computing devices and the first computing device, for a third conference, wherein the third conference is associated with the first and second conferences; and
transmitting, from the first computing device to the selected one or more computing devices, the invite;
a second user interface element for accepting or rejecting an invite to a conference; and
a third user interface element for:
adding a third virtual assistant to one of the first, second or third conferences; and
enabling a second input at the third virtual assistant from a sub-selection of the computing devices in the conference associated with the first virtual assistant.

20. The system of claim 11, wherein the request is a first request and the control circuitry is further configured to:
receive a second request to add a third virtual assistant to the gaming session;
identify a third provider of the third virtual assistant;
determine that one of the first provider or the second provider are the same as the third provider;
reject, based at least in part on the determination that the one of the first provider or the second provider are the same as the third provider, the second request to add the third virtual assistant to the gaming session; and
generate, for output, a notification that the second request has been rejected.

* * * * *